US010807680B2

(12) United States Patent
Tsao

(10) Patent No.: US 10,807,680 B2
(45) Date of Patent: Oct. 20, 2020

(54) MOORING SYSTEM AND METHOD FOR POWER GENERATION SYSTEMS AND OTHER PAYLOADS IN WATER FLOWS

(71) Applicant: National Tsing Hua University, Hsinchu (TW)

(72) Inventor: Che-Chih Tsao, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 15/789,368

(22) Filed: Oct. 20, 2017

(65) Prior Publication Data

US 2018/0111665 A1 Apr. 26, 2018

Related U.S. Application Data

(60) Provisional application No. 62/410,881, filed on Oct. 21, 2016.

(51) Int. Cl.
| | | |
|---|---|---|
| *B63B 21/50* | (2006.01) | |
| *F03B 17/06* | (2006.01) | |
| *H02K 7/18* | (2006.01) | |
| *B63G 8/00* | (2006.01) | |

(52) U.S. Cl.
CPC .............. *B63B 21/50* (2013.01); *F03B 17/06* (2013.01); *H02K 7/1823* (2013.01); *B63G 8/001* (2013.01); *F05B 2240/40* (2013.01); *F05B 2240/917* (2013.01); *F05B 2240/95* (2013.01); *Y02E 10/28* (2013.01); *Y02E 10/38* (2013.01)

(58) Field of Classification Search
CPC ....... B63B 21/50; F03B 17/06; H02K 7/1823; B63G 8/001; F05B 2240/40; F05B 2240/917; F05B 2240/95; Y02E 10/28; Y02E 10/38
See application file for complete search history.

(56) References Cited

U.S. PATENT DOCUMENTS

| | | | | |
|---|---|---|---|---|
| 4,730,119 A | * | 3/1988 | Biscomb .................. | F03D 5/04 290/42 |
| 6,200,180 B1 | * | 3/2001 | Hooper ................. | B63B 21/507 114/230.12 |
| 8,246,293 B2 | * | 8/2012 | Landberg ................ | F03B 17/00 290/42 |
| 9,777,709 B2 | * | 10/2017 | Dysarsz .................... | C25B 1/04 |

(Continued)

*Primary Examiner* — Tulsidas C Patel
*Assistant Examiner* — Joseph Ortega
(74) *Attorney, Agent, or Firm* — Wang Law Firm, Inc.

(57) ABSTRACT

A mooring system for deploying flow kinetic power generation systems in a water flow and placing the power generation systems to a position across moving path of the water flow from an anchoring point, the mooring system comprises: a main tether; an anchor means attached to a first end of the main tether and fixed to the anchoring point; and a main sail means attached to a second end of the main tether and immersed in the water flow; wherein the power generation systems is attached to the second end of the main tether; and the relative to the main sail means creates a fluid dynamic lift force on the main sail means and pulls the power generation systems in a lateral direction with respect to the moving path of the water flow. The mooring system may also be applied to moor and deploy other payloads and devices transversely across a water flow.

25 Claims, 49 Drawing Sheets

(56) References Cited

U.S. PATENT DOCUMENTS

| | | | |
|---|---|---|---|
| 2002/0192068 A1* | 12/2002 | Selsam | F03D 9/32 415/3.1 |
| 2008/0267712 A1* | 10/2008 | Jean | F03B 13/148 405/76 |
| 2008/0277492 A1* | 11/2008 | Cannon | A01G 15/00 239/14.1 |
| 2008/0311804 A1* | 12/2008 | Bauduin | B63B 21/50 441/23 |
| 2009/0127860 A1* | 5/2009 | Brown | F03B 13/188 290/53 |
| 2009/0134623 A1* | 5/2009 | Krouse | F03B 13/264 290/43 |
| 2011/0057448 A1* | 3/2011 | Page | F03B 13/20 290/53 |
| 2011/0068729 A1* | 3/2011 | Barber | H02K 7/1869 318/538 |
| 2011/0095530 A1* | 4/2011 | Blumer | F03B 17/061 290/43 |
| 2011/0107951 A1* | 5/2011 | Vandenworm | B63B 39/00 114/125 |
| 2012/0086210 A1* | 4/2012 | Gray | F03D 5/00 290/55 |
| 2013/0106105 A1* | 5/2013 | Dehlsen | F03B 3/04 290/43 |
| 2013/0139499 A1* | 6/2013 | Kerckove | F03B 17/06 60/504 |
| 2013/0307274 A1* | 11/2013 | Sia | F03D 7/06 290/55 |
| 2013/0334823 A1* | 12/2013 | Hopper | F03B 13/264 290/54 |
| 2014/0014199 A1* | 1/2014 | Edwards | F03G 7/05 137/356 |
| 2014/0038479 A1* | 2/2014 | Johnstone | B63B 22/04 441/22 |
| 2014/0059979 A1* | 3/2014 | Szydlowski | B63B 25/12 53/467 |
| 2014/0219799 A1* | 8/2014 | Selsam | F03D 15/20 416/11 |
| 2015/0217837 A1* | 8/2015 | Szydlowski | B63B 25/12 114/74 R |
| 2015/0337515 A1* | 11/2015 | Meggitt | E02D 27/525 405/205 |
| 2016/0047354 A1* | 2/2016 | Bolin | F03B 13/10 290/54 |
| 2016/0229419 A1* | 8/2016 | Bambrogan | B61L 23/002 |
| 2016/0319798 A1* | 11/2016 | Blodgett | H02K 7/1853 |
| 2017/0040926 A1* | 2/2017 | Smadja | H02S 30/10 |
| 2017/0175713 A1* | 6/2017 | Barber | F03D 13/25 |
| 2017/0226984 A1* | 8/2017 | Gregory | F03B 13/1895 |
| 2017/0349243 A1* | 12/2017 | Lisland | B63B 21/10 |
| 2018/0065722 A1* | 3/2018 | Cattano | B64C 3/16 |
| 2018/0141625 A1* | 5/2018 | Peace | E21B 43/121 |
| 2018/0198348 A1* | 7/2018 | Duquette | F03B 13/264 |
| 2018/0213713 A1* | 8/2018 | Zito, Jr. | A01K 61/00 |

\* cited by examiner (a)

(b)

(a)

(a)

(b)

(c)

(b)

(c)

(d)

(e)

(a)

(b)

(a)

(b)

(c)

(a)

(b)

MOORING SYSTEM AND METHOD FOR POWER GENERATION SYSTEMS AND OTHER PAYLOADS IN WATER FLOWS

CROSS-REFERENCE TO RELATED APPLICATION

This application is a non-provisional of U.S. provisional Application No. 62/410,881 filed in the United States Patent and Trademark Office on Oct. 21, 2016, the disclosure of which is incorporated by reference herein in its entirety.

BACKGROUND OF THE INVENTION

1. Field of the Invention

The present disclosure relates to a new concept of a mooring system and method thereof, especially for mooring and anchoring of power generation systems that harnessing kinetic power of water flows.

2. Description of the Related Art

The kinetic power of a body of fluid of density ρ flowing through a cross sectional area A at speed V is $$P = \rho[(AV)]^{-3}/2$$

Flow speeds in the Kuroshio and the Gulf Stream can be over 1-2 m/s. The cross-sectional power of the Kuroshio fluctuates between 4 to 10 GW with an annual mean around 6 GW and that of the Gulf Stream varies between 5 to 25 GW with an annual mean of about 12 GW. However, harnessing the power of ocean current faces many difficulties. Despite the great potential of ocean current power generation, the realization of a practical and cost-effective system faces several major difficulties.

One major issue is the potentially high cost involved in marine construction due to depth of seafloors. In the Kuroshio, most areas the current flows over are deeper than 1000 m, some over 3000 m. Near Taiwan, only at the undersea ridges to the north of Green Island can seafloors less than 400 meters deep be found. However, these ridges are likely of hard andesite and have almost no sediments on their top surfaces. As a result, embedment anchors are not likely to be applicable and piling at this depth will be very expensive. Anchoring difficulties aside, the comparatively shallow hill tops in the undersea ridges have limited areas. This limited footprint cannot moor the large number of turbines needed for a mass scale power system if traditional downstream mooring methods are used. In the case of the Florida Current, the seafloor in the Florida Straits gradually inclines from shore to over 500 m deep under the velocity core of the current at a distance of about 30 km from the shore. 500 m is still very deep by the standard of marine construction, The terrain under the Florida Straits is relatively flat, except for the area of Miami terrace in the southern part, and many areas are covered with mud, sand or sediments. However, anchoring in this area may face a different problem: the axis of the high speed core is actually outside of the areas identified as suitable for anchoring, due to wide presence of corals and deep reefs. FIG. 41 shows averaged tracks of the Florida Current over topographic map of the Florida Straits marked with seafloor characteristics. Areas suitable for anchoring and the issue of coral and deep sea reefs are from Mulcan A, Mitsova D, Hindle T, Hanson H and Coley C, "Marine benthic habitats and seabed suitability mapping for potential ocean current energy siting offshore southeast Florida", Journal of Maine Science and Engineering 2015, 3(2), 276-298. Approximate tracks of the Florida Current are interpolations from measurements reported in Webster F, "The effect of meanders on the kinetic energy balance of the Gulf Stream", Tellus XIII 1961, 3, 392-400 and in Leaman K D, Molinari R L, Vertes PS, "Structure and variability of the Florida Current at 27oN: April 1982-July 1984", Journal of Physical Oceanography 1987, vol. 17, pp. 565, May 1987.

Another issue is the variation of the tracks of current velocity cores (or called meandering), which can impact the efficiency of an ocean current power system. For example, in the Kuroshio near Taiwan, along 23o N, the averaged current axis (flow speed>1.2 m/sec) deviates about 3 km from summer to winter, with the shortest distance to shore of about 21 km. In spring, the axis deviates outward from land by about 16 km. The averaged 0.8 m/s flow speed boundary also deviates by about the same amounts. In the Florida Current, ocean model simulation suggested a seasonal deviation of the current velocity core of about 10 km at 50 m depth near 27oN. This is consistent with measurement results. Considering that power capture is proportional to the cube of flow speed, the ability to accommodate current meandering can increase system capacity factor significantly. Because of the cubic relation, 25% increase in flow speed can almost double kinetic power; while a 5% decrease in flow speed means 15% loss of kinetic power.

In Japan, the issue of the "large meander" of the Kuroshio is especially serious. As shown in FIG. 39, although the band of the 10-year average high power density appears to be close to the shore, actual current paths observed in the past were distributed in much wider ranges in two typical stable types. For most of the time, the current followed the first type, called "non-large meander" (NLM), and flowed close to shore between Osumi Islands and Kii Peninsula. After passing Kii, the current sometimes took a near shore path (nNLM), sometimes an offshore path (oNLM). At other times, the current took the second type of path, called "large meander" LM, which deviated far away from shore after entering south of Shikoku (referring to Kawabe M. Variation of current path, velocity, and volume transport of the Kuroshio in relation with the Large Meander. Journal of Physical Oceanography 1995, vol. 25, p. 3103). The most recent large meander occurred in 2004-2005 and lasted for over one year (referring to Marine Energy Web GIS Dataset, University of Tokyo and JAMSTEC (Japan Agency for Marine-Earth Science and Technology). Available online: http://www.todaiww3.k.u-tokyo.ac p/nedo_p/jp/webgis/ (accessed on 10 Oct. 2016)), which was within the time period of the 10-year average high power density band shown in FIG. 39. In other words, if a power generation system was installed in the band, especially in the eastern regions, the system would have experienced a full year without significant power output. A capacity factor of 0.8-0.9 in annual terms is high for a fluid kinetic power system, but occasional power outage for over a full year is not acceptable for any large scale investment. According to records (Anonymous. The Kuroshio. Japan Metrological Agency website, Dec. 20, 2013. Available online: www.data.jma.go.jp/kaiyou/shindan/sougou/html_vol2/2_2_2_vol2.html (Accessed June 2016)), there have been 10 large meander periods since 1905; each lasted from one year up to a decade and the total length of these time periods is nearly 40 years. During the NLM periods the flow axis flowed roughly 30~50 km off the capes, despite of occasional short term off shore deviations. But during the large meander (LM) periods, the distances increased up to 100~300 km with large swings. Therefore, this is a very serious issue for potential power generation in the Kuroshio south of Japan. Ocean eddies and typhoons could also cause short term change of current flow direction undersea. Because the power generation systems need to be in submerged floating condition, accommodation to such a flow pattern must be considered together with the requirement of large scale implementation and under the condition of deep seas. Still another issue, also associated with geographical locations, is that typhoons or hurricanes occur frequently in these waters.

Various ocean current power system concepts and designs have been proposed by commercial companies as well as in academic researches. Almost all existing designs apply individual anchoring for each individual floating unit. Even in the case of Chen's design (Chen F. The Kuroshio Power Plant. Springer International Publishing Switzerland 2013), the large platforms are still moored by many separated lines. Individual anchoring may be normal for tidal power in shallow waters but will be very expensive for deep sea floating systems. To extract energy from an ocean current in large scale needs a large number of turbines covering large areas. A large number of individual anchoring points distributed over large areas on deep seafloors means complexity of marine constructions and long duration of works. Individual mooring of many floating systems also means that mooring lines should be short and systems should be sparsely distributed in order to avoid interference caused by changing current directions. As a result, seafloor area usage will be inefficient and gravity anchors, if used, will also be inefficient due to short anchor lines. Further, none of the existing designs, except for Kiryu's (Kiryu Y. Toward energy independence of Japan (in Japanese). 2015. Available online: www.sakinavi.net/energy/kurosiol.html (Accessed June 2016). Also see Japan patents no. 5622013 and 5656155 (in Japanese)), considered the issue of ocean current meandering, especially large meanders. The use of individual and short mooring lines means that the generator systems will basically be fixed location systems, unable to make adequate position adjustments to accommodate small, short term change of ocean current path let alone the situation of large meanders. As for Kiryu's "energy boats" concept, the use of surface floating power vessels has system stability issues compared to submerged floating system, especially in storms, and cost issues as well.

SUMMARY OF THE INVENTION

In response to the issues and needs mentioned above, a new concept of Cross-stream Active Mooring (CSAM) of turbine generators for harvesting ocean current energy is devised in this invention. The system includes a mooring mechanism that can deploy turbine generators cross-stream to access the fast currents off anchoring points and maximize energy capture. The system can actively adjust vertical depth as well as horizontal positions to dodge rough sea conditions in storms and to accommodate current track variations. The system also includes new anchoring designs that can provide improved capacity at affordable costs. In accordance with one objective of the present disclosure, a mooring system for capable of deploying a payload (for example, a power generation turbine for harnessing kinetic power of flowing water) in a fluid moving relative to the payload and placing the payload to a target position laterally (in horizontal direction) across moving path of the fluid from an anchoring point is devised. The mooring system comprises: a main tether; an anchor means attached to a first end of the main tether and fixed to the anchoring point; and a main sail means attached to a second end of the main tether and immersed in the fluid. The payload is attached to the second end of the main tether. When the moving fluid flows over the main sail means a fluid dynamic lift force is created on the main sail means and the main sail means pulls the payload in a lateral direction with respect to the moving path of the fluid, that is, horizontally, away from the anchoring point. The mooring system can therefore place the payload to the target position horizontally across moving path of the fluid from an anchoring point.

Preferably, the main sail means may further comprise a lift adjusting means capable of causing changes of magnitude of the fluid dynamic lift force and thereby changing position of the payload laterally with respect to the anchoring point.

Preferably, the mooring system may further comprise a number of adjustable ballast mechanisms on the main sail means, the adjustable ballast mechanism may comprise a winch, a pulley and an endless rope attached with a ballast weight and a set of buoys.

Preferably, the main sail means may further comprise a rib structure comprising an inner frame and a plurality of outer frames for carrying the shape of the main sail means.

When the mooring system is applied in power generation applications, the payload may comprise at least one power generating turbine for conversion of fluid kinetic power; the main sail means may be attached to the main tether by a set of main sail tethers to keep the main sail means at a distance from the power generating turbines to minimize effect of flow wakes behind the sail means on the power generating turbines.

When the mooring system is applied to moor multiple devices, such as sensors, the payload may comprise an array tether and a plurality of devices, each of the devices may be attached to a different location on the array tether.

Preferably, the mooring system may further comprise a plurality of array sail means, each of the array sail means may be attached to a different location on the array tether, fluid dynamic lift force on the array sail means may pull the devices in lateral directions with respect to the moving path of the fluid, thereby the main tether and the array tether can be deployed at different angles with respect to the path of the fluid by adjusting relative magnitudes of the fluid dynamic lift forces on the main sail means and the array sail means.

When the mooring system is applied in large scale power generation applications, multiple power generating turbines can be moored successively on an array tether to become a linear array. Multiple array sail means can be attached along the array tether to pull the linear array in lateral direction such that the linear array can be deployed with an angle relative to the direction of water flow, when viewed from top.

Preferably, the main sail means may be attached to the main tether by a set of main sail tethers; each of the array sail means may be attached to the array tether by a set of array sail tethers, so that effect of flow wakes behind the array sail means on the payload (power generating turbine) is minimized; the main sail means may further comprise multiple main sails connected in tandem by the main sail tethers or connected successively to the main tether by the main sail tethers; each of the array sail means may comprise at least one array sail; each of the array sail means may also comprise a lift adjusting means capable of causing changes of magnitude and direction of the fluid dynamic lift force created by the array sail means in the passing fluid; the lift adjusting means may include a plurality of adjustable control surfaces on the main sails and the array sail.

Preferably, each of the main sail tethers and the array sail tethers may further comprise a rigging system connected to multiple locations on each of the main sails and the array sails so that tension on each of the main sail tethers and the array sail tethers is distributed to different parts of the corresponding sail evenly.

Preferably, each of the main sails and the array sails may comprise separate sail sections that can be assembled on location, each of the sail sections may comprise a spar structure and a rib structure, the rib structure may comprise an inner frame and outer frames carrying shape of sail profile, the sail sections may contain the fluid in their interiors; each of the main sails and the array sails may further comprise a center of mass adjusting means, the center of mass adjusting means may comprise a number of adjustable ballast mechanisms, each of the adjustable ballast mechanism may comprise a winch, a pulley and an endless rope attached with a ballast weight and a set of buoys.

Preferably, the anchoring point may be disposed on a slope facing the direction of flow of the fluid; the anchor means may include a deadweight anchor, the deadweight anchor may comprise a plurality of anchor blocks that can be interlocked and stacked together to form a first group of large deadweight.

Preferably, the deadweight anchor may further comprise a second group of large deadweight comprising a plurality of interlocked anchor blocks, the second group of large deadweight may be oriented with an angle with respect to the first group of large deadweight, the two groups of large deadweights may jointly hold the main tether to accommodate variation of deployment angle of the main tether.

Preferably, the anchoring point may be disposed on a rock surface; the anchor means may include a first deadweight anchor and a first notch structure made to the rock surface, the first deadweight anchor may have a shape with a protrusion designed to match the first notch structure.

Preferably, the anchor means may further comprise a second deadweight anchor and a second notch structure made to the rock surface and oriented with an angle with respect to the first deadweight anchor, the first and second deadweight anchors may jointly hold the main tether to accommodate variation of deployment angle of the main tether.

Preferably, the anchoring point may be disposed on a rock surface with a natural step structure; the anchor means may include an anchor with a collapsible end for conforming to the natural step structure and maximizing contact area.

Preferably, the mooring system may further comprise an auxiliary anchor system for maintaining linear formation of the array of power generating turbines and the array sail means attached on the array tether in situations of significant changes of flow direction, the auxiliary anchor system may comprise a number of auxiliary mooring units distributed at different locations along the array tether, each of the auxiliary mooring units may include an auxiliary anchor line on an auxiliary anchor on solid bottom of the fluid; a retractable auxiliary mooring line may be disposed on one of the different locations along the array tether; and a detachable coupling system may connect the auxiliary anchor line and the retractable auxiliary mooring line.

Preferably, the anchor means may include an anchor fixed to the anchoring point; an anchor line attached to the anchor; an anchor coupler mechanism with a first part and a second part that can be detached and reconnected, the first part being attached to the anchor line and the second part being attached to the first end of the main tether.

Preferably, the mooring system may further comprise a lifting buoy attached to the second end of the main tether to balance forces in the vertical direction, the lifting buoy may further comprise a buoyancy adjustment means to accommodate variations of flow drags.

Preferably, the anchor means may include an anchor fixed to the anchoring point; an anchor line attached to the anchor; an anchor coupler mechanism with a first part and a second part that can be detached and reconnected, the first part being attached to the anchor line and the second part being attached to the first end of the main tether; the mooring system further including a number of additional anchoring points distributed over a distance and a number of additional sets of the anchors with the anchor lines and the first part of the anchor coupler mechanism at the additional anchoring points, thereby extending allowable range of positioning of the payload.

Preferably, the mooring system may further comprise a number of retraining rigging systems along the mooring system to prevent the array sails and the main sails and the power generating turbines from over rotating during periods of undesirable flow pattern, the restraining rigging system may comprise a winch and rigs attached to the corresponding array sails and main sails and power generating turbines.

In accordance with another objective of the present disclosure, a mooring method is disclosed for deploying at least one payload (power generating turbine) in a flowing fluid moving toward the payload and placing the payload to a target position across moving path of the flowing fluid from a first anchoring point, the method including: a step of attaching a first anchor to a first end of a main tether and fixing the first anchor to the first anchoring point; a step of attaching the payload to a second end of the main tether; a step of attaching a fluid dynamic lift generating means to the second end of the main tether; and a step of adjusting the fluid dynamic lift generating means to obtain a lift force from the flowing fluid and make the lift force act in a lateral direction with respect to the flowing path of the flowing fluid to pull the payload to the target position.

When the mooring system is applied in marine or water power generation applications, the water flow may comprise a meandering velocity core. It is then preferred to make the power generating turbines capable of tracking and stay inside the velocity core. Accordingly, the step of adjusting the fluid dynamic lift generating means may further include the steps of (i) setting the target position as a moving target position inside the meandering velocity core; (ii) constantly adjusting the fluid dynamic lift generating means to reposition the payload to the moving target position so that the power generating means is positioned inside the velocity core most of the time.

Preferably, the mooring method may further include a step of setting up a number of additional anchoring points distributed over a distance and fixing an additional anchor to each of the additional anchoring points; a step of transferring the main tether with the payload and the fluid dynamic lift generating means from the first anchoring point to one of the additional anchoring point by detaching the first end of the main tether from the first anchor and moving it to one of the additional anchoring points and attaching it to the additional anchor corresponding to the additional anchoring point; thereby extending range of positioning of the payload.

Preferably, the mooring method may further include a step of towing and holding the payload and the fluid dynamic lift generating means at or near the second end of the main tether to relieve tension on the main tether using at least one power vessel and moving the first end of the main tether using a second power vessel during the step of transferring.

Preferably, the step of transferring the main tether with the payload and the fluid dynamic lift generating means further including a step of towing at or near the first end and the second end of the main tether using a group of power vessels for transferring over long distance.

In summary, the most basic form of this invention in applications in ocean current power generation includes a set of hydro sails and generator turbines (for the power generation purpose), floating in submersion under sea surface, on a long tether anchored at one end. The hydro sail system can pull the turbines away from the anchoring point laterally so that the turbines can be deployed transversely across current flow. For applications in the Kuroshio southeast off Taiwan, this cross-stream arrangement will allow the placing of anchoring points in shallow waters and turbines farther offshore into fast flows over deep seas, thereby easing depth issues. In the case of the Florida Current, available anchoring areas are likely outside of the fast core because of limitations imposed by marine benthic presence on seafloors and applying the CSAM system in similar ways can resolve the problem. By rolling or changing angle of attack, the hydro sails can actively adjust the horizontal locations of the system to accommodate track deviations of the velocity cores and place the power generating turbines always within the fastest streams to run them at maximum capacity at almost all times. During storms, the hydro sails can pull the system down and increase submersion depth to dodge rough sea conditions. The basic form can be linked into linear arrays and linear arrays can form 2D formations. To prevent the disturbance of occasional passing large eddies, an auxiliary anchoring system was designed to maintain the generators in good formation when current flow direction changes. In addition, a method of transferring linear arrays of tethered generators among multiple anchoring points was devised to provide extended lateral displacement (or horizontal displacement) capacity to the CSAM system, in addition to the original tethered-sway actions, to accommodate meanders on various time scales. The construction of linear arrays of this invention also allows the linear arrays to be transported easily in the ocean over long distances. This enables large scale transportation of power generation system from site to site, thereby can solve the large meander problem south of Japan.

DETAILED DESCRIPTION OF THE PREFERRED EMBODIMENTS

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

Basic Analytical Model

Figure 1:
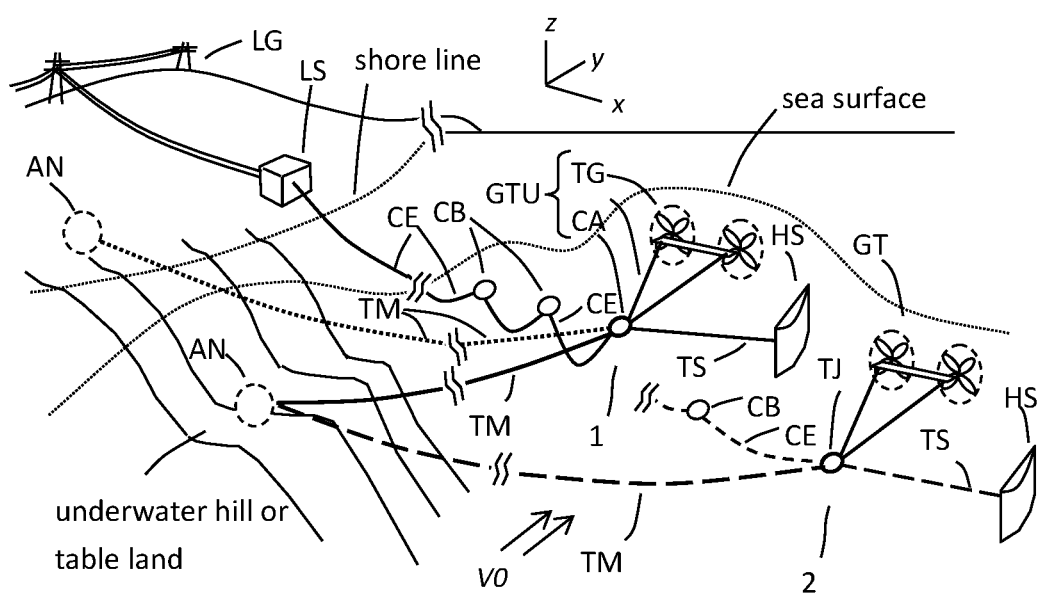
FIG. 1 depicts the perspective according to an embodiment of the present disclosure.

In accordance with an exemplary embodiment of the present disclosure, FIG. 1 illustrates the basic concept of the Cross-stream Active Mooring (CSAM) in perspective view. The mooring system comprises a main tether TM, an anchoring point AN at one end of the main tether TM and a hydro sail HS attached to the other end. The hydro sail HS is basically a wing (or sail) profile with its span oriented roughly in vertical direction. The hydro sail HS and most of the main tether TM are immersed underwater and maintained close to neutral buoyancy. Power generating turbines GTU (which are the payload of the mooring system in this case) are attached to the main tether TM close to the end of the hydro sail HS. The current flow causes a drag on the power generating turbines GTU and the drag pulls the power generating turbines GTU toward the downstream direction. At the same time, when the sea current flows over the body of the hydro sail HS, a lift force is generated, which pulls the main tether TM together with the attached power generating turbines GTU laterally away from the anchoring point AN. The resultant force formed by the lift from the hydro sail HS and the drag from the power generating turbines GTU pulls the main tether TM at an oblique angle with respect to the direction of the current flow. Therefore, the system and the main tether TM can be deployed and moored at this oblique angle with respect to the flow. This allows the anchoring point AN to be placed on underwater table land or hill close to shore and the hydro sail HS and the power generating GTU turbines to be positioned away from shore into the velocity core of the ocean current. The position of the power generating turbines GTU and the hydro sail HS is determined by the relative magnitude of the drag over the power generating turbines GTU with respect to the pull by the hydro sail HS. Adjusting this relative magnitude can adjust the position of the hydro-turbines with respect to the anchoring point AN, for example, between the innermost position 1 and the outermost position 2, as indicated in FIG. 1.

Figure 2:
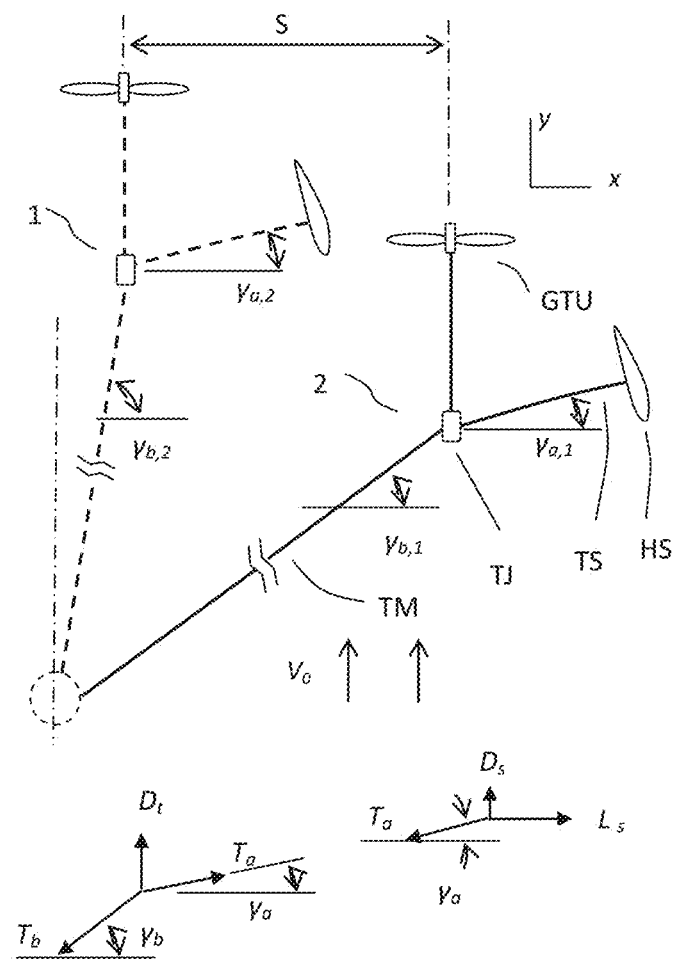
FIG. 2 depicts the force analysis of a simplification of the scenario of FIG. 1 in top view.

FIG. 2 illustrates a simplified top view of the scenario of FIG. 1, with force vectors at the hydro sail HS and at the multi-line joint TJ. For simplicity and clarity, it is assumed that all force components in the z direction are balanced, which can be achieved by proper control of the buoyancies of different subsystems, and all force vectors shown in are horizontal components. Major forces acting on the system are tensions $T_b$ and $T_a$ in the main tether TM and in the sail tether TS respectively, hydrodynamic lift over the hydro sail $L_s$ and drags $D_t$ and $D_s$ over the power generating turbine GTU and the hydro sail HS. Drags over the main tether TM, the sail tether TS and any major buoys used are neglected in this analysis. This approximation is obvious when the mooring lines are short because their small frontal areas will result in very small drags compared to the major drags over the power generating turbine GTU and the hydro sail HS. When the mooring lines are long, streamlined designs can be used to keep the drag low. When the system is in static state, that is, all subsystems staying stationary relative to ground, force balance on the hydro sail HS gives the following relations:

$$T_a \cos \gamma_a = L_s \quad (1)$$

$$T_a \sin \gamma_a = D_s \quad (2)$$

and force balance on the power generating turbine GTU gives:

$$T_b \cos \gamma_b = T_a \cos \gamma_a = L_s \quad (3)$$

$$T_b \sin \gamma_b = D_t + T_a \sin \gamma_a = D_t + D_s \quad (4)$$

The above leads to the following relations of the main deployment angle $\gamma_b$ (main tether) and the sail deployment angle $\gamma_a$ (hydro sail), $$\tan\gamma_a = \frac{D_s}{L_s} \quad (5)$$

$$\tan\gamma_b = \frac{D_t + D_s}{L_s} = \frac{D_t}{L_s} + \tan\gamma_a \quad (6)$$

The lift and the drag over the hydro sail ($L_s$ and $D_s$) can be expressed as $$L_s = C_{Ls} A_s \frac{\rho V_0^2}{2} \quad (7)$$

$$D_s = C_{Ds} A_s \frac{\rho V_0^2}{2} \quad (8)$$

wherein $\rho$ is the density of the flowing fluid, $V_0$ is the flow speed, $C_{Ls}$ is the lift coefficient of the hydro sail HS, $C_{Ds}$ is the drag coefficient of the hydro sail HS, and $A_s$ is the planform area (wing area) of the hydro sail HS. $C_{Ls}$ and $C_{Ds}$ depend on the shape (wing profile) of the hydro sail HS and are both functions of angle of attack ($\alpha$) of the hydro sail HS relative to the current flow, according to the wing theory. The drag over the power generating turbine $D_t$ can be expressed as $$D_t = C_{Dt} A_t \frac{\rho V_0^2}{2} = C_{Dt} \pi R^2 \frac{\rho V_0^2}{2} \quad (9)$$

wherein $C_{Dt}$ is the drag coefficient (or called thrust coefficient) of the power generating turbine GTU, $A_t$ is the rotor swept area of the power generating turbine GTU, and R is the radius of the power generating turbine rotor.

Inserting equations (7)-(9) into equations (5) and (6) gives the following expressions for the deployment angles:

$$\tan\gamma_a = \frac{C_{Ds}(\alpha)}{C_{Ls}(\alpha)} \qquad (10)$$

$$\tan\gamma_b = \frac{C_{Dt}A_t}{C_{Ls}A_s} + \frac{C_{Ds}}{C_{Ls}} = \frac{C_{Dt}A_t}{C_{Ls}(\alpha)A_s} + \tan\gamma_a \qquad (11)$$

So, the geometric layout of the system is determined only by geometric parameters of the system and angle of attack of the hydro sail HS. Accordingly, adjusting the angle of attack of the hydro sail HS can change the geometric formation of the system and change the position of the power generating turbines GTU.

The thrust coefficient $C_{Dt}$ is a function of the blade tip speed ratio ($\lambda=\Omega R/V_o$, $\Omega$ is frequency of rotation) of the rotor and can be estimated by the fundamental Betz theory. When the power generating turbine GTU extracts power at the maximum efficiency, the thrust coefficient $C_{Dt}=8/9$ (~0.89) (Referring to Gasch R et al., "Blade geometry", Chap. 5 of Wind power plants: Fundamentals, Design, Construction and Operation, ed. by Gasch, R. and Twele, J. Berlin, Springer-Verlag, 2012). Therefore, eqn. (11) becomes $$\tan\gamma_b = \frac{0.89A_t}{C_{Ls}(\alpha)A_s} + \tan\gamma_a \qquad (12)$$

Extent of Horizontal Displacement and Deployment Angle

One major performance factor of the proposed system is the extent of horizontal displacement (or lateral displacement) S in FIG. 2. By eqn. (11) or (12), a relation between the main deployment angle $\gamma_b$ and the angle of attack of the hydro sail $\alpha$ can be found once the geometric parameters of the system are given.

Figure 3:
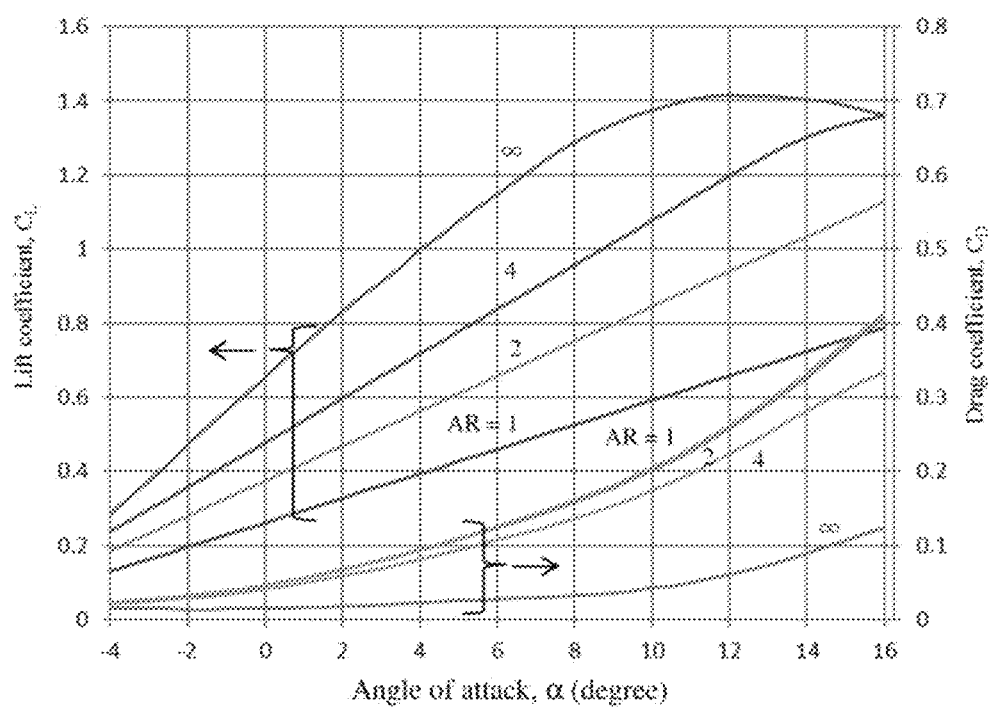
FIG. 3 depicts the lift and drag coefficients of a wing with the Göttingen 624 profile at different aspect ratio.

In order to facilitate estimation and to demonstrate the function of the concept, an analytical model of example power generating turbine GTU was assumed to have a rotor diameter of 40 meters. This sets $A_t=\pi$ (20 m)$^2$=1257 m$^2$. For the hydro sail HS, the Göttingen 624 airfoil profile was selected as an example. FIG. 3 shows the coefficients of lift and drag of the Göttingen 624 airfoil $C_{Ls}$ and $C_{Ds}$ at different wing aspect ratios (ARs). The planform area of the example hydro sail $A_s$ was set to be 1400 m$^2$, roughly comparable to the swept area of a single power generating turbine GTU, or $A_t/A_s=0.9$.

It is worth noting that the drag/lift data of most airfoil profiles can be used in the current analysis. Water has a density roughly 800 times of air (1025/1.29), and viscosity 50 times of air (9×10$^{-4}$/18×10$^{-6}$ (Pa s)). For objects of a same dimension under same flow velocity in water and in air, the corresponding magnitudes of Reynolds number is 16:1, as $$\begin{aligned}Re &= \rho_{air}VD/\mu_{air} \\ &= (\rho_{water}VD/\mu_{water})(\rho_{air}/\rho_{water})(\mu_{water}/\mu_{air}) \\ &= (\rho_{water}VD/\mu_{water})/16\end{aligned} \qquad (13)$$

wherein $\rho$ is the fluid density, $\mu$ is the fluid kinetic viscosity, V is the average flow velocity and D is the tube diameter. In other words, by the principle of similarity based on Reynolds number, the scenario of a hydro sail HS in water current of 1 m/sec is equivalent to the case of the sail flying in air at a speed of 16 m/sec, or a sail of 1/10× size in air flying at a speed of 160 m/sec, or about 580 km/hr. These speeds in air roughly correspond to speeds from an average hang glider to a propeller-powered airplane. Therefore, in general, data from airfoils can be applied to the hydro sail HS in the ocean currents.

Figure 4:
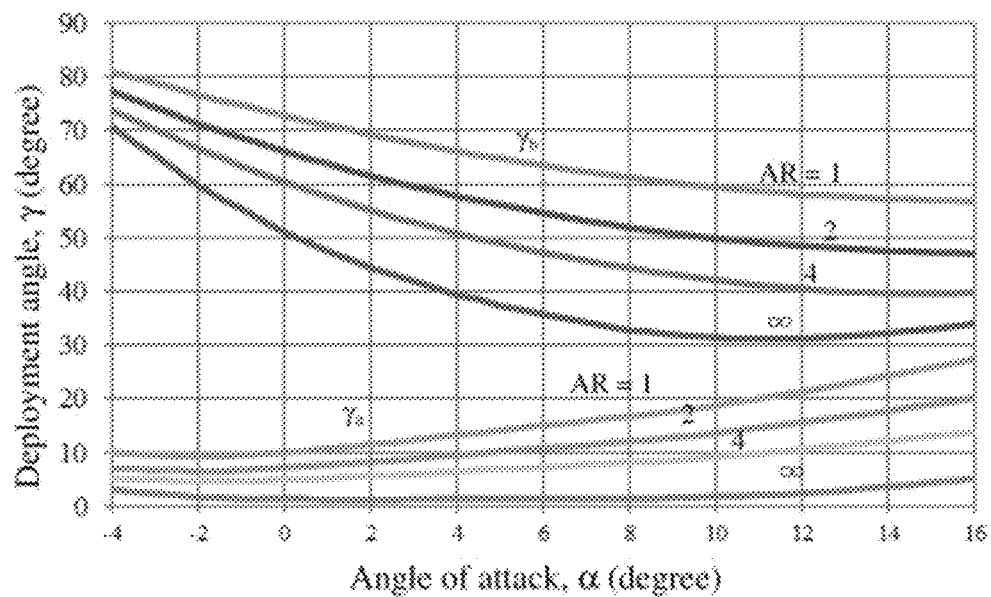
FIG. 4 depicts the deployment angles according to an embodiment of the present disclosure.
Figure 5:
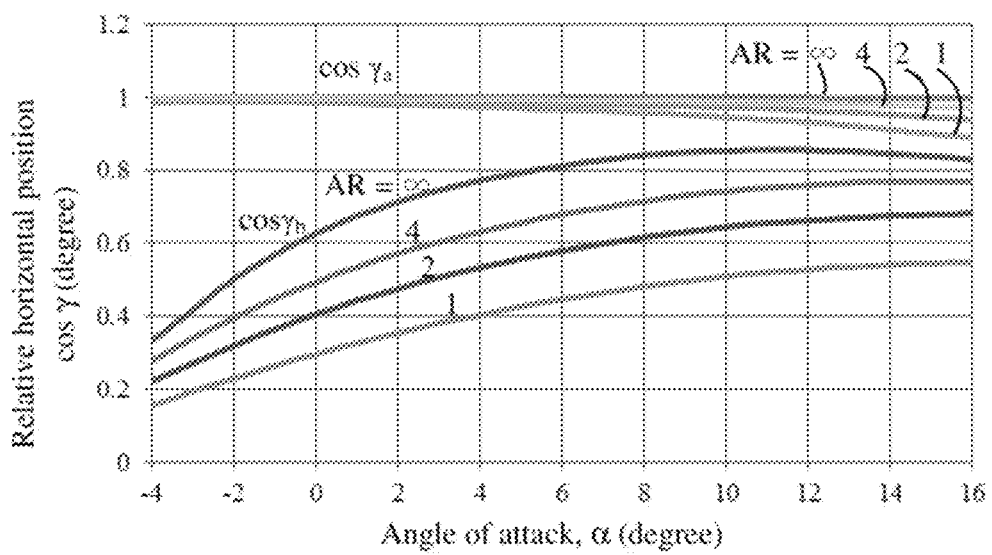
FIG. 5 depicts the relative horizontal positions according to an embodiment of the present disclosure.

In accordance with an exemplary embodiment of the present disclosure, the relation between the main deployment angle $\gamma_b$ and the angle of attack of the hydro sail $\alpha$ can then be solved, from eqns. (10) and (11), for different ARs. The results are shown in FIG. 4 and FIG. 5.

Figure 6:
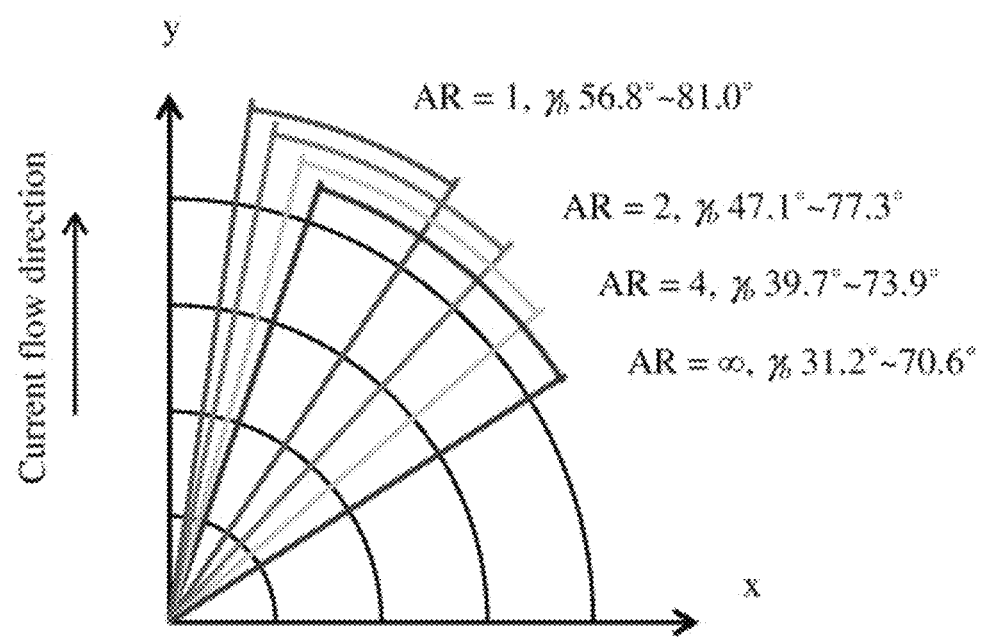
FIG. 6 depicts the 2D illustration of range of the main deployment angle and the horizontal displacement according to an embodiment of the present disclosure.

For a fixed aspect ratio AR, a specific angle of attack of the hydro sail $\alpha$ corresponds to a specific main deployment angle $\gamma_b$. Changing the angle of attack $\alpha$ can change the main deployment angle $\gamma_b$ of the system. In general, increasing the angle of attack of the hydro sail $\alpha$ pulls the system laterally away from the anchoring point AN, i.e. resulting in smaller main deployment angle $\gamma_b$. Reducing the angle of attack of the hydro sail $\alpha$ increases the main deployment angle $\gamma_b$ and the system moves closer to the anchoring point AN. FIG. 6 depicts the range of the main deployment angle $\gamma_b$ and relative horizontal displacement of the example system on x-y plane.

Figure 7:
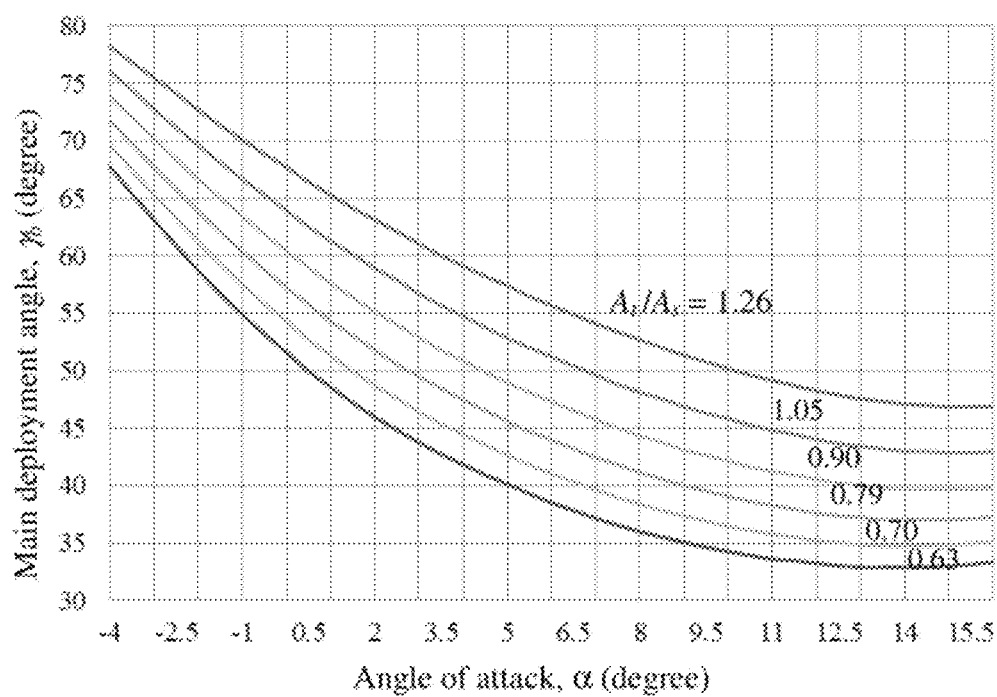
FIG. 7 depicts the main deployment angles according to an embodiment of the present disclosure.
Figure 8:
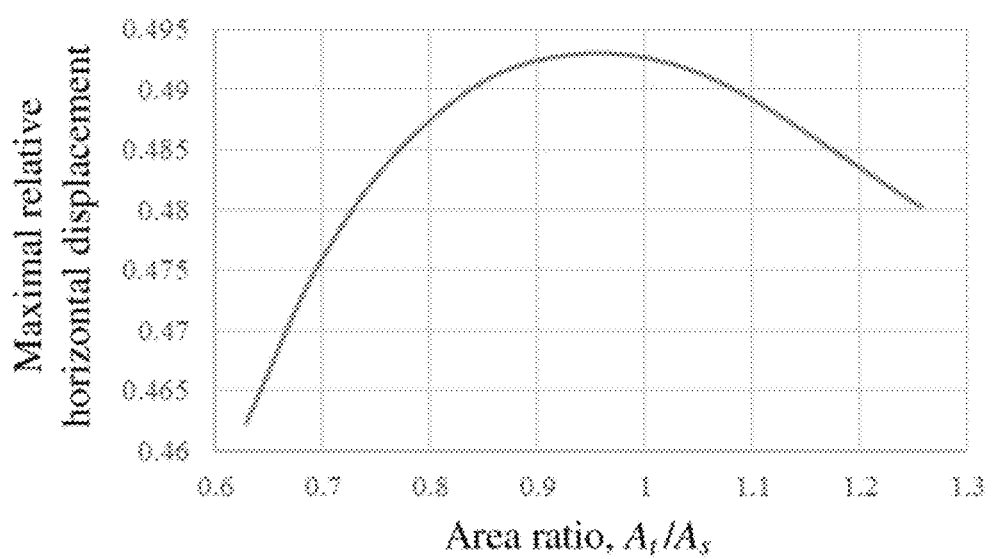
FIG. 8 depicts the maximal relative horizontal displacement according to an embodiment of the present disclosure.

When the planform area $A_s$ of the hydro sail HS is increased relative to the power generating turbine swept area, the main deployment angle $\gamma_b$ is reduced, as shown in the example of FIG. 7. That is, the system can be pulled further away from the anchoring point AN due to increased lift force. However, larger planform areas $A_s$ do not necessarily give larger horizontal displacement S of the system. As shown in FIG. 8, for a hydro sail HS of a fixed aspect ratio AR=4, the maximal relative horizontal displacement, cos $\gamma_b$, appears around $A_t/A_s$=0.97. This provides a guideline for hydro sail HS design.

Conceptual Design of the Hydro Sail System

The design of the hydro sail HS should achieve high lift and low drag but also be simple and easy to construct, so that its cost impact on the whole system can be minimized.

Figure 9:
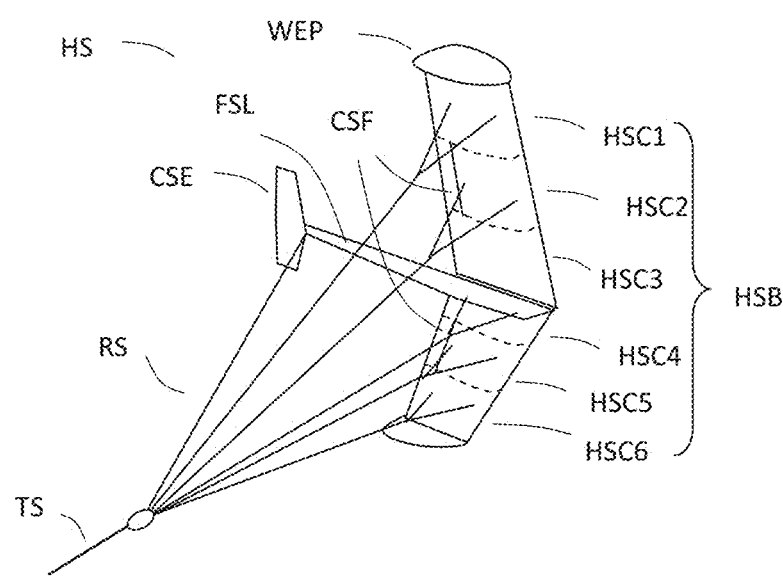
FIG. 9 depicts the conceptual design of the hydro sail according to an embodiment of the present disclosure.

In accordance with an exemplary embodiment of the present disclosure, FIG. 9 depicts an example conceptual design of the hydro sail HS. The hydro sail HS is like a kite (or glider) "flying" in water near 90° roll angle. Like a glider, the sail shape has dihedral and sweepback to provide stability against rolling. Rolling and pitching stabilities are further assisted by the rigging system RS and the control surface at the tail CSE. The control surfaces on the sail CSF and the tail CSE adjust the angle of attack $\alpha$ of the hydro sail HS. End-plates WEP, or similar wingtip devices, help reducing downwash.

To provide high lift and low drag, the sail body HSB takes a structure similar to an airplane wing with spars, ribs and skins, so that desirable airfoil profiles can be used. The sail surfaces at the upper end and the lower end are open to seawater so that the interior of the hydro sail HS is filled with seawater. Buoys are placed inside the sail surfaces in the upper part so that the hydro sail HS can be maintained near neutral buoyancy with its span in vertical direction. The rigging system RS pulls the hydro sail HS at fuselage FSL and at multiple locations distributed over the sail area so that tension on the sail tether TS is distributed to different parts of the sail body evenly. As a result, the requirements on strength, and materials, in the frame structure inside the sail skins can be minimized. The sail body can be divided into a number of separate sections (HSC1-HSC6) that can be assembled one by one on location right before the hydro sail HS is lowered into water. This could significantly reduce transportation and installation costs.

Figure 10:
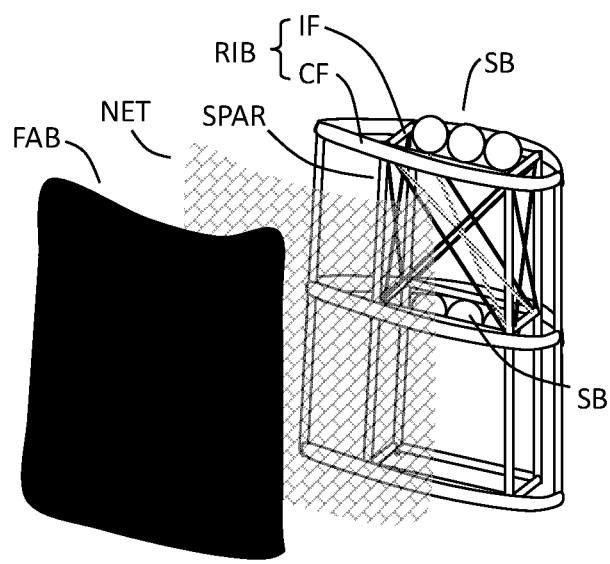
FIG. 10 depicts the structure of a sail body section according to an embodiment of the present disclosure.

In accordance with an exemplary embodiment of the present disclosure, FIG. 10 shows an example design of a section of the sail body HSB. The rib rib structure) RIB is formed by an inner frame IF with curved outer frames CF carrying the shape of the airfoil profile. The spar (spar structure) can be of a metal truss structure SPAR that connects the ribs RIB. The leading and trailing edges of the ribs RIB are also connected with slabs. The open spaces on the surface of the metal structure is covered by a tension net NET and then wrapped with seawater-resistant fabrics FAB as skins. The tension net NET provides backing against surface deformation or impact damage. The fabrics FAB provide smooth sail surface to minimize skin drag. Further, the spar truss SPAR can comprise a tensegrity structure so that the hydro sail HS can have some flexibility to withstand uneven external forces. Nylon, commonly used in marine ropes, can be used to make the tension net NET. Dacron, commonly used for sail cloth for seagoing yachts (referring to Anonymous, "Rope, Running Rigging, Docking & Mooring Line and Rope Care explained", website of Jamestown Distributors of Bristol, R.I., USA, 2008, retrieved February 2015), or PVC coated polyester fabric, which has good resistance to tear, abrasion, salt water and sunlight and is used for coastal inflatable boats (referring to Anonymous, "Korean PVC fabric", website of Coastal Inflatables of Dover, N.H., USA, 2016, retrieved March 2016), can be used as covering fabrics.

The design is therefore a lightweight, modularized, flexible, near-neutral buoyant and mainly tension structured system composed of affordable materials.

Active Mooring Configuration, Linear Formation and Maneuvering by Hydro Sails

Figure 42:
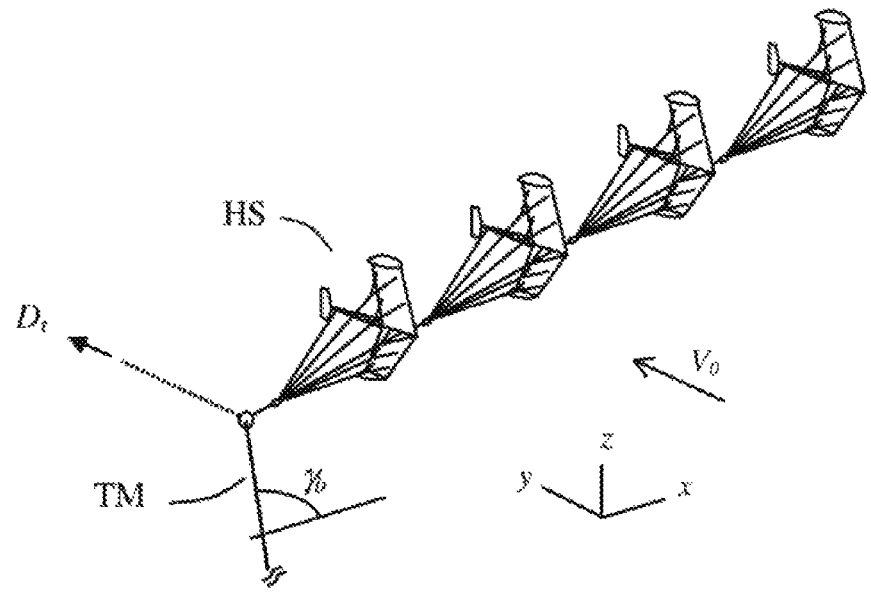
FIG. 42 depicts methods of mounting of multiple hydro sails (a) by connection in tandem (b) by connecting to the main tether successively.
Figure 42:
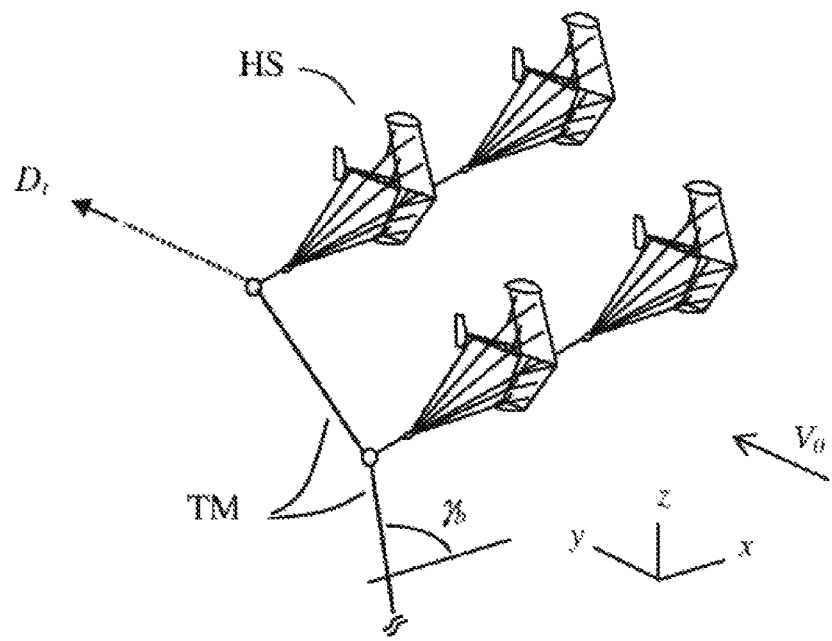

In order to maximize lift, the hydro sails HS should be kept in fast flows and should have large aspect ratios ARs. Because velocity cores of ocean currents generally flow close to sea surface, current velocity starts to decrease below depth of 50-100 m, The span of the hydro sail is practically limited to this range. Adding the requirement of a high aspect ratio AR, the planform area of a single sail is limited. To have enough total sail area, multiple hydro sails HS are needed in practical implementations. In accordance with an exemplary embodiment of the present disclosure, either 4 sails of 40 m×8.75 m each or 2 sails of 70 m×10 m each can be used to give As=1400 m² for the example hydro sail HS. In these cases, multiple sails can be mounted in tandem to a sail tether or connected successively to the main tether TM (or array tether), as depicted in FIGS. 42 (a) and (b).

Figure 11:
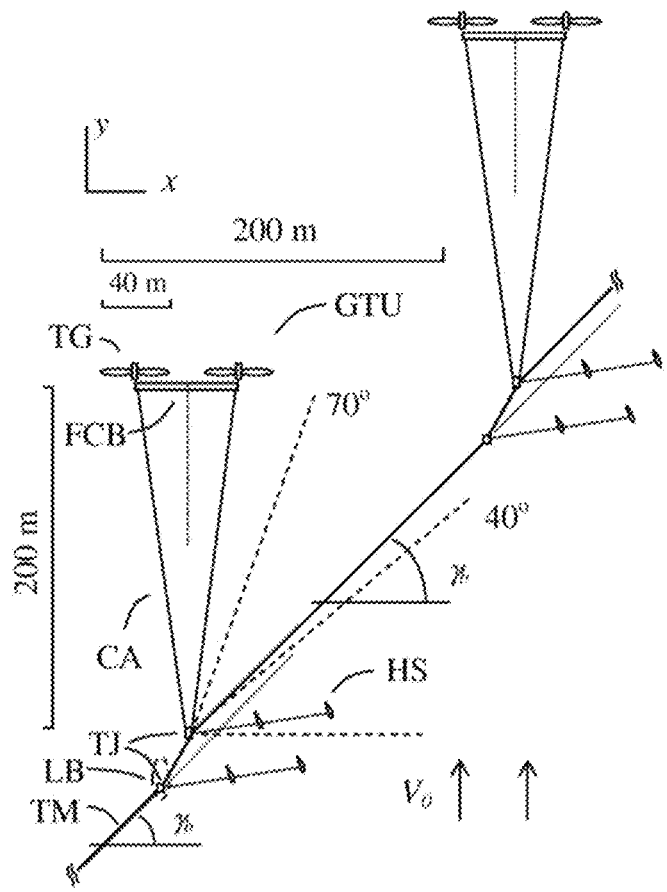
FIG. 11 depicts the configuration of a linear formation according to an embodiment of the present disclosure.
Figure 11:
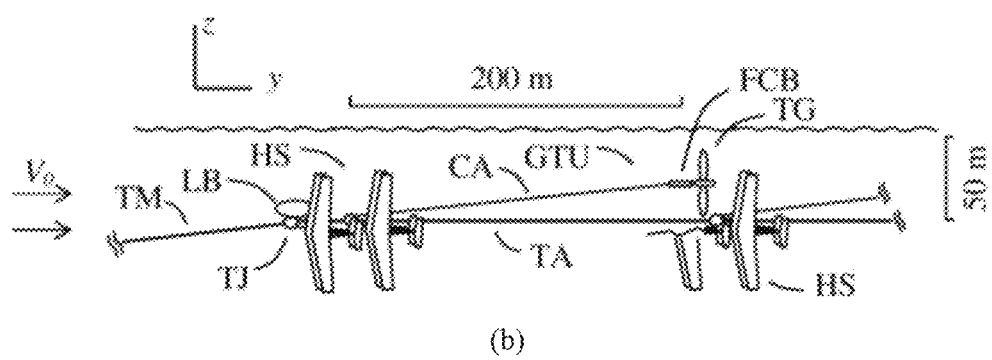

In accordance with an exemplary embodiment of the present disclosure, FIG. 11(a) and FIG. 11(b) illustrate an example configuration of active mooring of the proposed systems in a linear formation. Each power generating turbine system comprises two 40 m-diameter power generating turbines GTU mounted together by a front connecting board FCB. Four hydro sails HS, each of 70 m×10 m area, gives As=2×1400 m² for this 2-turbine example system. The distance from the turbines TG to the multi-line joint TJ on the main tether TM was set to keep the power generating turbines GTU away from the main tether TM for the 40°-70° range of the main deployment angle $\gamma_b$. The distance between two adjacent GTUs was set roughly based on the 4~8 rotor diameters spacing rule used in wind farm layout (referring to Kuhn M, "Offshore Windfarms", Chap. 16 of Wind power plants: Fundamentals, Design, Construction and Operation, ed. by Gasch, R. and Twele, J. Berlin, Springer-Verlag, 2012.). The GTUs in the linear array are basically moored horizontally at the same depth. However, the main tether TM has to extend down to an anchoring point AN at an angle. A lifting buoy LB at the joint TJ is used to balance the downward pull.

By controlling the control surface on the sail CSF (referring to FIG. 9), the hydro sail HS can roll about the main tether TM and thus change the direction of pull. During a storm, the hydro sails HS can pull the systems to greater depth to avoid rough conditions close to sea surface.

Figure 12:
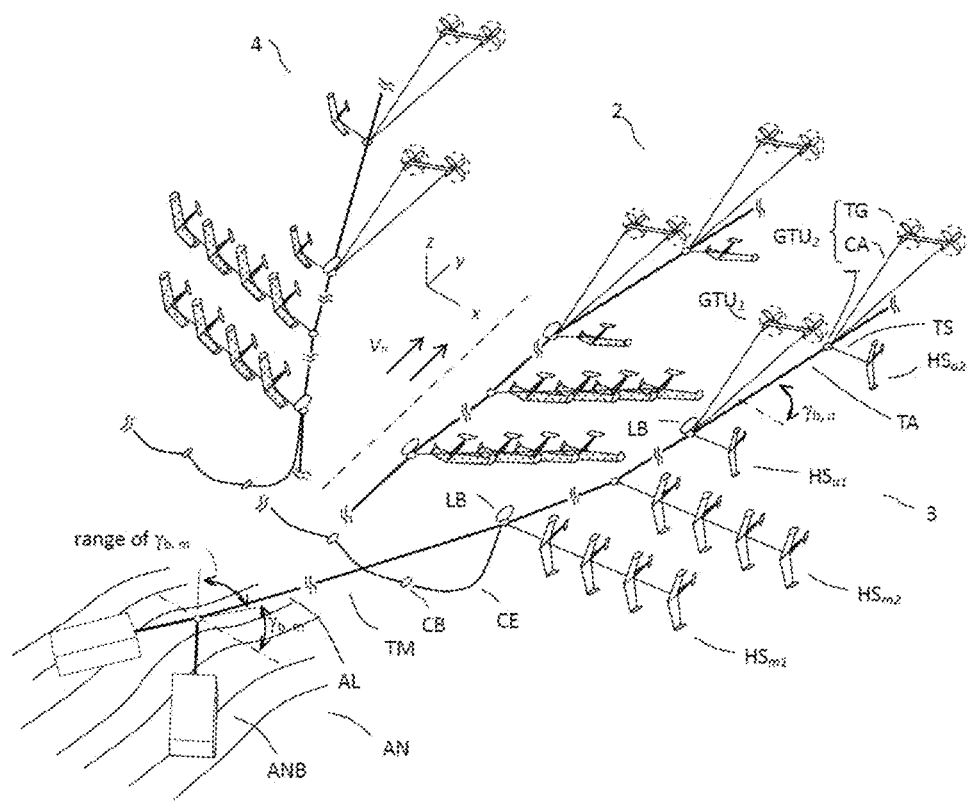
FIG. 12 depicts one linear array structure according to an embodiment of the present disclosure.

In accordance with an exemplary embodiment of the present disclosure, the hydro sails HS can roll about and move pass the main tether TM to reach the other side of the main tether TM, thereby switching the deployment of the system to the opposite side of the anchoring point AN, as illustrated in FIG. 12. In FIG. 12, a linear array of turbines and hydro sails ($HS_{m1}$, $HS_{m2}$, . . . and $HS_{a1}$, $HS_{a2}$, . . . ) can move from right side of the flow (at 3) to the middle (at 2) and to the opposite side (at 4) by rolling the hydro sails. With this side-switching capability, the extent of horizontal displacement can be increased.

The Generator Turbine Unit

The proposed system is not limited to a specific type of power generating turbines GTU. In principle, various types of fluid kinetic power generating machine can be used in the generator-turbine unit with proper mooring and buoyancy design. For current purposes, the example GTU of two example power generating turbines GTU was assumed. As depicted in the side view in FIG. 11 (b), under operating conditions, the power generating turbines GTU can be raised slightly above the depth of the main tether TM, by buoyancy built into the GTU and some lift generated by the front connecting board FCB. This avoids interference between the power generating turbines GTU and the main tether TM during the process of side-switching.

Accessing and Tracking Ocean Current Cores

From FIG. 5, relative lateral displacement away from the anchoring point AN by the example system with AR≥4 can be from ~0.3× to ~0.8× the length of the main tether TM in the operating range of the hydro sail HS. Thus, with a 10 km long main tether TM, the system can move up to ~8 km laterally with a horizontal displacement range of 5 km on one side. If the system is made to have side-switching capability, then it can position itself within 8 km from either side of the anchoring point AN. With this capability, the system will be able to reach to the velocity cores and track its variations from convenient anchoring locations.

Referring to FIG. 2, ignoring flow drags over the tethers, force balance in static state, that is, all subsystems staying stationary relative to shore, gives the relations between the tensions in the tethers and their deployment angles as $$T_b \cos \gamma_b = T_a \cos \gamma_a = L_s \qquad (14)$$

Inserting the lift by the hydro sail HS, $$L_s = C_{Ls}(\alpha) A_s \frac{\rho V_0^2}{2} \qquad (15)$$

into the above equations, the tension in the main tether TM can be expressed as $$T_b = \frac{C_{Ls}(\alpha)}{\cos \gamma_b(\alpha)} \left( \frac{\rho A_s V_0^2}{2} \right) \qquad (16)$$

and the tension in the sail tether TS $$T_a = \frac{C_{Ls}(\alpha)}{\cos \gamma_a(\alpha)} \left( \frac{\rho A_s V_0^2}{2} \right) \quad (17)$$

For a system with given geometric parameters under a given flow speed $V_0$, the tensions are functions of only the angle of attack of the hydro sail a. In accordance with an exemplary embodiment of the present disclosure, an analytical example system, comprising a single power generating turbine GTU of rotor radius R=20 m (turbine swept area $A_t = \Box R^2 = 1257$ m$^2$) and a hydro sail HS of planform area $A_s = 1400$ m$^2$ with a Gottingen 624 wing profile, was assumed and the deployment angles, $\gamma_a(\alpha)$ and $\gamma_b(\alpha)$, with respect to different angle of attack of the hydro sail α were calculated (referring to FIG. 4). From those results, the tensions can be calculated.

Table 1 shows the tensions on the main tether and the sail tether ($T_b$ and $T_a$) of the example system at two extreme positions under different flow speeds $V_0$, calculated per eqn. (16) and (17). The example system has a single power generating turbine GTU of 40 m diameter, with a hydro sail system HS of area $A_s = 1400$ m$^2$ having a Gottingen 624 wing profile and an aspect ratio AR of 4. The two extreme positions are near α=14° and −4° and corresponding values of $C_{Ls}$, $\gamma_b$ and $\gamma_a$ and are from FIG. 3 and FIG. 4. Also listed are corresponding values of flow power density and system power capacity, assuming a power coefficient $C_p$=0.5. Seawater density ρ=1025 kg/m$^3$ is assumed. For a fixed flow speed $V_0$, the tension on the main tether $T_b$ almost doubles when the system moves from the innermost position ($\gamma_b$=74°) to the outermost position ($\gamma_b$=40°). If the system has two power generating turbines GTU as illustrated in FIG. 1, then the loadings double.

TABLE 1

| | Flow speed $V_o$ (m/s) | | | | | | | |
|---|---|---|---|---|---|---|---|---|
| | 0.5 | 0.8 | 1.0 | 1.2 | 1.4 | 1.5 | 1.6 | 1.8 |
| Tension on the main tether $T_b$ (ton) | | | | | | | | |
| α = 14° ($C_{Ls}$ = ~1.3) ($\gamma_b$ = 40°) | 31.1 | 79.5 | 124 | 179 | 244 | 280 | 318 | 403 |
| α = −4° ($C_{Ls}$ = ~0.24) ($\gamma_b$ = 74°) | 15.9 | 40.8 | 63.8 | 91.8 | 125 | 143 | 163 | 207 |
| Tension on the sail tether $T_a$ (ton) | | | | | | | | |
| α = 14° ($C_{Ls}$ = ~1.3) ($\gamma_a$ = 12°) | 24.3 | 62.2 | 97.3 | 140 | 191 | 219 | 249 | 315 |
| α = −4° ($C_{Ls}$ = ~0.24) ($\gamma_a$ = 6°) | 4.42 | 11.3 | 17.7 | 25.4 | 34.6 | 39.7 | 45.2 | 57.2 |
| Flow power density (W/m$^2$) | 64 | 262 | 512 | 886 | 1406 | 1730 | 2099 | 3362 |
| System power capacity (kW) | 40 | 165 | 322 | 556 | 884 | 1087 | 1319 | 1878 |

Tether Construction and Drag Reduction

Cables and mooring lines in marine applications may include wire ropes, chains, polymer ropes of various types and tubular pipes. Galvanized wire ropes are widely used and of least cost per unit loading capacity per unit length. Chains are generally used in short sections at locations where collision and friction are an issue. Polymer ropes such as Dacron (polyester) and Nylon are commonly used in yachts for their lightweight and resistance to corrosion (referring to Product information from website of Jamestown Distributors of Bristol, R.I., USA, at http://www.jamestowndistributors.com/userportal/search_subCategory.do?categoryName=Rope and Running Rigging&category=87&refine=1&page=GRID, 2008, retrieved June 2015). Specifically, high-modulus polyethylene (HMPE) ropes, such as Dyneema or Spectra, have been used as wire rope replacement in oil rigging industry. They are lighter than water and have strength comparable to steel wire ropes at same rope diameters. (Referring to Gilmore J, "HMPE rope technology enables deeper and safer operations", Offshore Engineer 2013, August (digital edition), retrieved June 2015) However, they are quite expensive (referring to Product information from website of Annapolis Performance Sailing of Annapolis, Md., USA, at http://www.apsltd.com/c-1486-single-braids-dyneema-vectran.aspx, 2015, retrieved June 2015.). Tubular pipes are used as tensioned vertical mooring lines in Tension-Leg Platforms for offshore oil rig industry. (Referring to Gerwick B C, Construction of Marine and Offshore Structures, 3rd Edition, CRC Press, 2007.)

The most economic and flexible tension loading mechanical element is wire rope. For example, a standard two inch diameter wire rope has a load capacity of about 51 tons at operating safety factor of 3.5. Using wire ropes of this size, 6 ropes can provide enough tension capacity on the main tether TM for a single turbine system operating in 1.5-1.6 m/s flow speed, according to Tab. 1. For a system with two turbines, at least 12 ropes are required. For the sail tether TS, 4 ropes are needed for a single turbine system operating in 1.5 m/s flow speed, and 8 for a two-turbine system.

In the analytical model derived above, flow drags over the tethers were ignored. The drag over the sail tether TS is small compared to the drag over the power generating turbine GTU because the sail tether TS is not very long. The purpose of the sail tether TS is to allow the hydro sail HS to pull the main tether TM from a proper distance away from the turbine so that the wakes behind the hydro sail HS have minimal effect on the pattern of the flow entering the power generating turbine GTU. This proper distance, for example, if taking 4 to 6 times the diameter of the power generating turbine GTU, following typical spacing between adjacent wind turbines (referring to Kuhn M, "Offshore Windfarms", Chap. 16 in Wind power plants: Fundamentals, Design, Construction and Operation, ed. by Gasch R and Twele J, Berlin: Springer-Verlag, 2012), is only 160 to 240 meters, for turbine rotor diameter of 40 m. The frontal area of the tether is thus small compared to the swept area of the turbine $A_t$.

Because the sail tether TS is comparatively shorts, its weight effect to the whole system is also negligible. Taking the case of $V_o$=1.5 m/s in Tab. 1 for instance, four 240 m long 2-inch diameter wire ropes, each with a loading capacity of 51 ton at safety factor of 3.5, weigh about 10.6 tons, since a standard 2-inch diameter wire rope weighs 11.02 kg per meter (7.39 lb/ft)(referring to McClamrock M, "Wire rope chart—6×37 & 6×19, IWRC, EIPS rope", in Ingersoll-rand website, Jul. 28, 2000, retrieved December 2014). This weight is small compared to the maximal tension 219 ton in the ropes. So the vertical deflection of the sail tether TS will be small.

As for the main tether TM, since it can be several kilometers long, the weight and the effect of the tether's projected frontal area can become significant. Special arrangements and designs can reduce their effects.

The flow drag over a single rope laid out as the main tether TM can be expressed as $$D_c = C_{Dc} A_{cf} \frac{\rho V_0^2}{2} = C_{Dc} (l_c d_c \cos \gamma_b) \frac{\rho V_0^2}{2} \quad (18)$$

wherein $C_{Dc}$ is the drag coefficient of the tether, $A_{cf}$ is the projected frontal area of the rope, $l_c$ is the length of the rope, and $d_c$ is the diameter of the tether. The significance of this drag $D_c$ over the tether rope can be evaluated by comparing it to the drag over the turbine $D_t$, $$D_t = C_{Dt} A_t \frac{\rho V_0^2}{2} \quad (19)$$

wherein $C_{Dt}$ is the drag coefficient (or called thrust coefficient) of the turbine, as $$\frac{D_c}{D_t} = \left( \frac{C_{Dc} l_c d_c}{C_{Dt} A_t} \right) \cos \gamma_b \quad (20)$$

A single rope can be seen as a long slender cylinder oriented at an oblique angle with respect to the direction of current flow. Therefore its cross-sectional profile appears as an ellipse with respect to the flow. And it is so long so that it can be treated as a 2D body. The drag coefficient $C_{Dc}$ of a 2D body with an elliptical profile in a turbulent flow is 0.1~0.2 (referring to Shames I H, Mechanics of Fluids, 2nd edition, Chapter 10 Boundary-Layer Theory, New York: McGraw Hill, 1982.). In accordance with an exemplary embodiment of the present disclosure, with the main deployment angle $\gamma_b$ between 40°~74° and the turbine thrust coefficient $C_{Dt}$=0.89, further assuming a wire rope of $l_c$=1000 m and $d_c$=2 inch=0.0508 m, the ratio of drags from eqn. (20) can be estimated to be $$\left( \frac{D_c}{D_t} \right) 1 \text{ km, single 2'' rope} < 0.35 \sim 0.7\% \quad (21)$$

Figure 13:
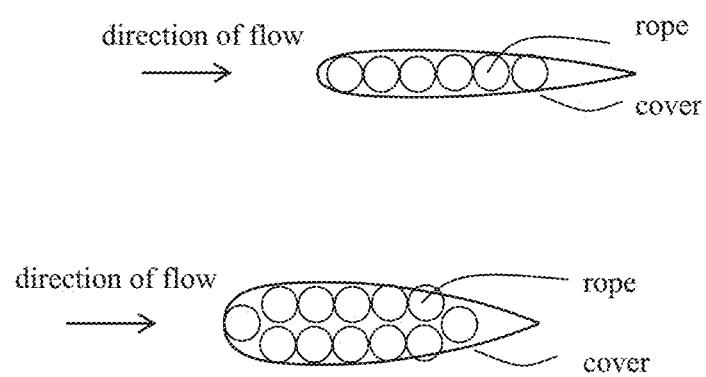
FIG. 13 depicts the tether structure according to an embodiment of the present disclosure.

In the cases of multiple ropes, this ratio can be roughly maintained by aligning ropes in a horizontal array and covering the ropes with streamlined covers to minimize the frontal area and the drag coefficient. In accordance with an exemplary embodiment of the present disclosure, as illustrated in FIG. 13, a streamlined cover over 6 2-inch wire ropes, for tethering a single turbine system in rated flow rate of 1.6 m/s, has an aspect ratio of about 1:10 (thickness to chord length), which can provide a drag coefficient down to 0.1 (referring to Shames I H, Mechanics of Fluids, 2nd edition, Chapter 10 Boundary-Layer Theory, New York: McGraw Hill, 1982.). For a 2-turbine example system, the required 12 ropes can be packed to achieve an aspect ratio of about 1:4, which can have a drag coefficient down to 0.06. Although this arrangement roughly doubles the frontal area, the total turbine swept area $A_t$ in the denominator of eqn. (20) also doubles. As a result, the ratio of drags is $$\left( \frac{D_c}{D_t} \right) 1 \text{ km, single turbine or 2-turbine} < 0.35\% \quad (22)$$

And $$\left( \frac{D_c}{D_t} \right) 10 \text{ km, single turbine or 2-turbine} < 3.5\% \quad (23)$$

Therefore, flow drags over the main tether TM can be ignored in the analytical model.

To tether a 2-turbine example system in a flow of 1.6 m/s, 12 2-inch wire ropes are required. If the length is 10 km (10,000 meters), the main tether TM weight will be about 1322.4 tons in total, based on rope weight data (referring to McClamrock M, "Wire rope chart—6×37 & 6×19, IWRC, EIPS rope", in Ingersollrand website, Jul. 28, 2000, retrieved December 2014). Buoys will be required to keep the tether afloat or near neutral buoyancy so that it will not drag down the system.

The buoy system must be designed with a total frontal area as small as possible, while providing enough buoyancy. An ellipsoid body provides a very small drag coefficient, as similar shapes used on airships and submarines have shown. An ellipsoid with an aspect ratio of 1:4 (minor axis to major axis) in turbulent flow has a drag coefficient $C_{Db}$ as low as 0.06 (referring to Shames I H, Mechanics of Fluids, 2nd edition, Chapter 10 Boundary-Layer Theory, New York: McGraw Hill, 1982.). The buoyancy of an immersed ellipsoid buoy is $$B_b = \rho \left( \frac{4}{3} \pi R_a^2 R_c \right) \quad (24)$$

wherein $R_a$ is the semi-minor axis and $R_c$ is the semi-major axis of the ellipsoid. The drag over the ellipsoid is $$D_b = (C_{Db} \pi R_a^2) \rho V_0^2 / 2 \quad (25)$$

wherein Ra2 is the projected frontal area. Assuming a total amount of buoyancy $B_{b\ tot}$ is needed, the number of buoys required is $$n_b = B_{b\ tot} / [\rho (4/3 \pi R_a^2 R_c)] \quad (26)$$

The total drag from the buoys is then $$D_{b\ tot} = n_b D_b = 3 B_{b\ tot} C_{Db} \rho V_0^2 / (8 R_c) \quad (27)$$

Accordingly, for a fixed amount of total buoyancy, larger size of individual buoys, or less number of buoys, results in less total drag. This is because buoyancy is proportional to the cube of the linear dimension while drag is proportional to the square of it. In summary, buoys of large volume with ellipsoidal shape should be used.

In accordance with an exemplary embodiment of the present disclosure, assuming 20 buoys are used on a 10 km long main tether TM, each buoy needs to carry 500 m, or 66.1 ton, which is equivalent to about 64.5 m³ of seawater. Further assuming the buoy is an ellipsoid with an aspect ratio of 1:4 and has a buoyancy efficiency of 0.9, the volume and the size of the buoy can be found as follows, $$v_b = \frac{4}{3}\pi R_a^2 (4 R_a) = \frac{64.5}{0.9} = 7.17 \text{ (m}^3) \tag{28}$$

wherein $R_a$=1.63 (m), $R_c$=4 Ra=6.52 (m)
The effect of the drag over buoys can be evaluated by comparing it to the drag over the tether without buoys, per eqns. (18) and (25), $$\frac{D_b}{D_{cs}} = \frac{C_{Db} \pi R_a^2}{C_{Dc}(l_{cs} d_c \cos \gamma_b)} \tag{29}$$

wherein $D_{cs}$ is the drag over the 500 m section of the main tether TM and $l_{cs}$=500 m. The two drag coefficients $C_{Db}$ and $C_{Dc}$ are both 0.06 and the deployment angle $\gamma_b$ varies between 40°~74°, as described before. Plugging in these numbers gives the ratio of drags $$\frac{D_b}{D_{cs}} = 0.21 \sim 0.58 \tag{30}$$

Combining eqn. (23) and (30), the combined flow drag over the 10 km tether with buoys, in comparison to the drag over the turbines, is then $$\left(\frac{D_c D_{b\,tot}}{D_t}\right)_{10\,km} < 3.5\% \times 1.6 = 5.6\% \tag{31}$$

Therefore, flow drags over the main tether TM with buoys can be ignored in the analytical model and the tethers appear straight on x-y plane, as depicted in FIG. 2.

In the buoy system design described above, a limited number of large size buoys distributed along the tether are used in order to reduce flow drag. This is essentially hanging long sections of tether on floating buoys spaced over large, variable spans. A tether section between two supporting buoys deflects downward and forms a curve. Therefore, it is necessary to check the effect of these curves on the total length of the main tether TM, which affects the actual location of the system of power generating turbines GTU and hydro sails HS.

The theory of catenary gives the shape of a cable suspended between two supports and the relation between the length of a cable and its span as follows, (Referring to Stahl A W, Transmission of Power by Wire Ropes, 2nd ed., New York: D. Van Nostrand Company, 1889.)

$$y + \frac{T_c}{w} = \frac{T_c}{2w}\left(e^{\frac{wx}{T_c}} + e^{-\frac{wx}{T_c}}\right) \tag{32}$$

$$l = \frac{T_c}{2w}\left(e^{\frac{wx}{T_c}} - e^{-\frac{wx}{T_c}}\right) \tag{33}$$

wherein w is cable weight per unit length, $T_c$ is tension at lowest position (center) of the cable, which is the origin of (x, y), and l is the length of the curve from the origin to a position x. Assuming the length of the tether section suspended between two buoys is $l_{cs}$ and the span is $s_c$, their relation can therefore be expressed as $$l_{cs} = \frac{T_b}{w_{ci}}\left(e^{\frac{w_{ci} s_c}{2 T_b}} - e^{-\frac{w_{ci} s_c}{2 T_b}}\right) \tag{34}$$

Tb is the tension in the main tether TM on horizontal plane, as calculated by eqn. (16). $w_{ci}$ is the net weight per unit length of the main tether TM immersed in seawater, which has the following relation with the tether's weight per unit length in air, $$w_{ci} = w_c - w_c \frac{\rho_{seawater}}{\rho_{steel}} \tag{35}$$

Continuing from the 2-turbine example system of 12 2-inch ropes and $l_{cs}$=500 m discussed earlier, the weight of the main tether TM per unit length, in air, is $w_c$=11.02 kgw/m×12=132.24 kgw/m.

With the above information and using the tension data from Tab. 1, the span between adjacent buoys in a few typical cases were calculated by using eqn. (34) and are shown in Tab. 2. It can be seen that when the system is extended to the outermost position in the rated 1.5 m/s flow, the tether is almost straight. Only when the system moves to the inner positions and are under lower current velocities, the span starts to decrease due to reduced tension. But even in the case of slow flow of 0.5 m/s, the overall loss of effective tether length is only 324 m, out of 10 km, at the outermost position. Only in the innermost position, the loss of effective tether length reaches 10%. But since in this position the system is distributed almost downstream, this loss does not matter much

TABLE 2

| Flow speed $V_o$ (m/s) | 0.5 | 0.8 | 1.5 |
|---|---|---|---|
| Tension on the main tether $T_b$ (ton) | | | |
| α = 14° ($\gamma_b$ = 40°) | 62.2 | | 560 |
| α = −4° ($\gamma_b$ = 74°) | 31.8 | 81.6 | |
| Span between buoys $s_c$ (m) | | | |
| α = 14° ($\gamma_b$ = 40°) | 483.8 | | 499.7 |
| α = −4° ($\gamma_b$ = 74°) | 450.2 | 490.2 | |
| Loss of effective tether length (m) | | | |
| α = 14° ($\gamma_b$ = 40°) | 324 | | 6 |
| α = −4° ($\gamma_b$ = 74°) | 1000 | 196 | |

In summary, within the targeted operating ranges of the system, the effect of tether deflection due to catenary on the capacity of horizontal displacement of the system is very small.

Mooring of Power Cables

There are two ways to connect power transmission cables from the power generating turbine GTU to shore. One way is to lay the cables from the power generating turbines GTU along the main tether TM, by attaching them to the tether, to the location of the anchoring point AN, and then from the anchoring point AN to the shore on the seafloor. The advantage of this approach is that only the part of the power cable attached to the main tether TM requires additional buoys and these additional buoys can be integrated with the buoy system of the main tether TM. However, laying power cables on deep seafloor involves very significant construction costs.

The other way is to lay the cables separately and use a separate buoy system to suspend the cables, as illustrated in FIG. 1. With proper design and material selection, this approach could cost significantly less.

A section of the power cable suspended between two adjacent buoys deflects downward due to its own weight. It also deflects toward the downstream direction of the current flow due to flow drag. The actual span of the power cable is therefore less than the length of the cable. As an approximation, this can be analyzed by applying the catenary equations in the two directions separately.

Assuming the length of a cable section suspended between two buoys is $l_{pcs}$ and the span is $s_{pc}$, their relation can be expressed, similar to eqn. (34), as $$l_{pcs} = \frac{T_b}{w_{pci}}\left(e^{\frac{w_{pci}s_{pc}}{2T_w}} - e^{-\frac{w_{pci}s_{pc}}{2T_w}}\right) \tag{36}$$

wherein $w_{pci}$ is cable weight per unit length in seawater and $T_w$ is tension caused by the weight. It is assumed that the power cable first forms its shape by its weight and then the flow drag shapes its final curve in the horizontal direction, with the horizontal flow drag averaged over the entire cable length, expressed as $w_d$, acting as the parameter of cable specific weight in the above equation. Therefore, the relation between the final total span of the power cable $S_{pct}$ and the span before the application of the flow drag $n_{spc}$ is $$n s_{pc} = \frac{T_d}{w_d}\left(e^{\frac{w_d s_{pct}}{2T_d}} - e^{-\frac{w_d s_{pct}}{2T_d}}\right) \tag{37}$$

wherein $T_d$ is the tension caused by the horizontal flow drag and n is the number of power cable sections. And $w_d$ can be expressed as follows, $$w_d = \frac{n D_{pcs} + n D_{pcb}}{n l_{pcs}} \tag{38}$$

$$= C_{Dpc} d_{pc} \frac{\rho V_c^2}{2} + C_{Dpcb} \frac{\pi R_b^2}{l_{pcs}} \frac{\rho V_c^2}{2}$$

wherein $D_{pcs}$ is the flow drag over a single cable section, $D_{pcb}$ is the flow drag over a single buoy, $d_{pc}$ is the diameter of the power cable, $C_{Dpc}$ is the drag coefficient of the cable, $C_{Dpcb}$ is the drag coefficient of the buoy, $R_b^2$ is the frontal area of the buoy and $V_c$ is the flow speed. The total tension on the cable is therefore $(T_w+T_d)$, which will be taken by steel armor wires that are usually placed on the surface layer of submarine power cables.

Accordingly, design of the mooring system is to use eqns. (36) and (37) to select total power cable length, desired total span, length of cable section between adjacent buoys and span between buoys in order to maintain the total tension in the power cable within the endurance limit of the steel armor wires and to keep the tension small enough compared to the lift force of the hydro sail HS so that the tension in the power cable does not affect the function of the hydro sail HS too much.

In accordance with an exemplary embodiment of the present disclosure, a 2-turbine example system is discussed below.

The 2-turbine example system operating under 1.5 m/s current has a power generation capacity slightly above 2 MW, according to Tab. 1. If the total power transmission capacity is set to 3 MW and the generators use 3-phase delta connection, then a 3-core cable with each core wire having a capacity of 2 MW is enough to meet the requirement. A typical 20 kV 3-core submarine cable capable of carrying 200 A current for off-shore wind turbine connection can be used. For example, one such cable, SAX-W 35, has a total air weight of 19.4 kg/m and an outer diameter of 91 mm, which gave an estimated net weight in seawater $w_{pci}$ of 12.7 kg/m. The cable uses copper cores with steel armor wires of 5 mm diameters around the cable surface layer, which gave an estimate of endurance tensile limit of about 15 ton. The design target was to keep the total tension $(T_w+T_d)$ in the power cable below this endurance tensile limit and small enough compared to the lift force of the hydro sail HS during system operation, which is from 25 to 250 ton in flow speed range of 1.2-1.6 m/s, as per Tab. 1.

Flow drag over the cable must be kept low in order to keep tension in cable low. Both the flow speed $V_c$ and the drag coefficient $C_{Dpc}$ must be reduced to achieve the target. It is desirable to lay the cable in a depth of low current speed. For example, in the Kuroshio southeast of Taiwan, averaged current speed goes down to 0.2-0.0 m/s at a depth of 200 m. Adding streamlined covers to the power cable can further reduce drag coefficient. For example, drag coefficient of a 2D circular profile can be up to 1.2 in slow laminar flow (referring to Shames I H, Mechanics of Fluids, 2nd edition, Chapter 10 Boundary-Layer Theory, New York: McGraw Hill, 1982.). Under a current speed of 0.1 m/s, covering the power cable with streamlined covers with aspect ratio over 4:1 and chord length over 1 meter can maintain the flow in turbulent condition and bring the drag coefficient $C_{Dpc}$ down to 0.1. The 1-meter chord length may appear oversized to a single cable of 91 mm diameter. However, when multiple units of the 2-turbine system are deployed in formation, multiple power cables can be aligned in an array and the over 1 meter wide covers just fit, similar to the situation shown in FIG. 13.

With the above considerations, an example design was made. A cable section length of $l_{pcs}$=250 m was selected. The corresponding buoy to keep the cable near neutral buoyancy has a semi-minor axis $R_b$=0.59 m, assuming 1:4 aspect ratio and 0.9 buoyancy efficiency. It was assumed that the span between adjacent buoys $s_{pc}$ was affected by cable weight only and varied from 175 m to 225 m when the system was at the two extreme positions. The total horizontal span $S_{pct}$, after adding the flow drag effect, was set at 20,000 m and 25,000 m when the system was at the two extreme positions. Thus the cable could extend at least 20 km off shore and have a range of horizontal displacement of 5 km. As a result, the total number of buoys (or cable sections) n=125 and the total cable length was 31,250 m.

The calculated flow drag and tensions in the cable corresponding to the two extreme positions are shown in Tab. 3. Total flow drag over the whole power cable with its buoys can be maintained under a few tons, only a small fraction of the tensions in the main tether under operating conditions, as shown in Tab. 1. Similarly, the total tension in the power cable can also be limited under a few tons, much smaller compared to the operating lift of the hydro sail HS.

In cases when the power cable does exert significant force on the power generating turbine GTU and the hydro sail HS system, either the size of the hydro sail HS should be increased or additional lifting (pulling) mechanisms be added, such as small hydro sails HS attached to the buoys or buoys of shape of sails, to counter this force.

Figure 15:
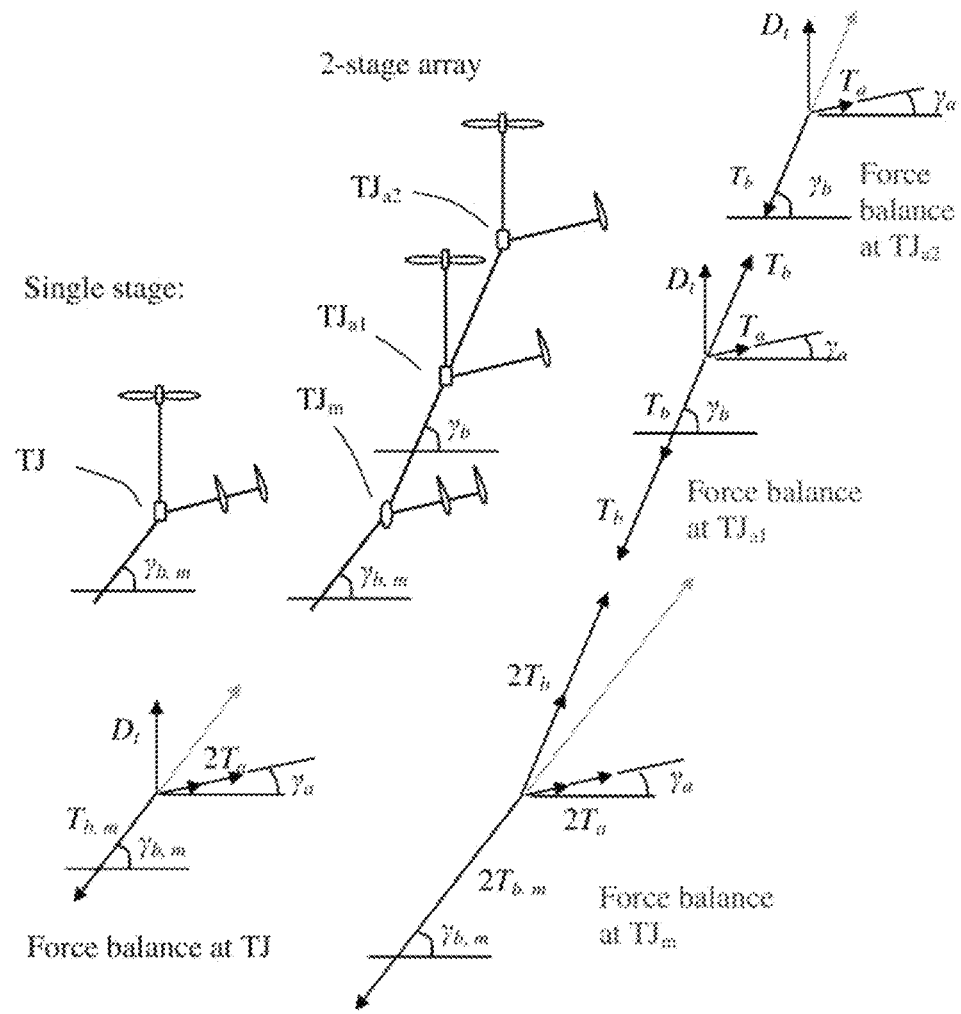
FIG. 15 depicts the force analysis according to an embodiment of the present disclosure.

The power cable should be submerged but suspended in desired depth. This can be done by applying the so-called sub-merged buoyant structure (referring to Gerwick B C, Construction of Marine and Offshore Structures, 3rd ed., pp. 740, CRC Press, 2007), which can be implemented by using buoys of different sizes or by arranging buoys at varying spacing along the cable so that not only the power cable section between any two adjacent buoys has a downward deflection due to catenary, the whole cable and buoys system also has multiple portions of catenary curves. As a result, if any buoys along the cable moves upward, then those buoys will pick up more cable length and the increased cable weight will pull those buoys back down. If any buoys moves downward, then those buoys carry less cable weight and hence will move back up. The depth and the curvature of the whole system can be set by changing magnitude and direction of the tension on the whole cable, by steering the hydro sails HS anchoring point AN at an angle. A lifting buoy LB at the joint TJ balances the downward pull. Also attached to the joints is a set of hydro sails ($HS_{a1}$, $HS_{a2}$ ... ), each sail corresponding to a GTU. A linear array system thus comprises successive stages of GTU and hydro sail set. Based on mechanics (force balance), it can be shown that tensions in the array tether estimated from each stage as an individual system can be added up to obtain the total tension on each section of the tether. And force components in the downstream direction from each stage accumulate toward upstream directions along the linear array. The same is true in the direction perpendicular to the flow direction, that is, in the direction of the lifts of the hydro sails HS. As a result, if flow and geometric conditions are the same in each stage, then the same array deployment angle $\gamma_{b,a}$ can be maintained along the whole array. Force analysis on x-y plane using a simple 2-stage example is depicted in FIG. 15 to illustrate the observations described above.

Figure 16:
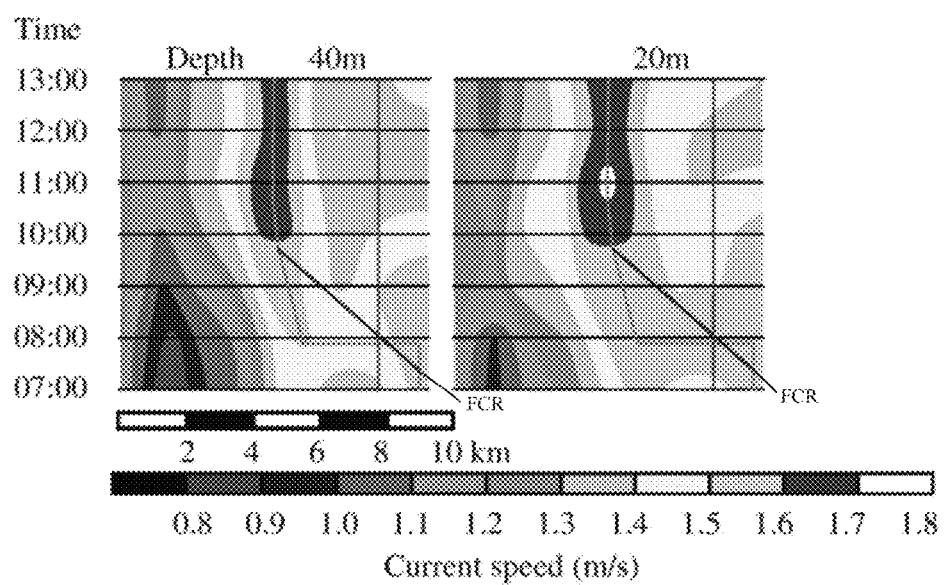
FIG. 16 depicts an example scenario of narrow fast current stream in the Kurishio.

When a linear array system changes its lateral position, i.e., changing the deployment angle $\gamma_{b,m}$ of the main tether TM, to pursue the fast core of the ocean current, it is preferable to keep the deployment angle $\gamma_{b,a}$ of the array tether TA unchanged. Otherwise, the frontal width of the linear array facing the current will change, which may affect energy capture efficiency and can make formation of multiple linear arrays more complicated. This is because, although the overall width of a major ocean current can be up to 100 km, the width of its fastest core or a main branch of it can be as narrow as only a few thousand meters and therefore if a long linear array is deployed at small array angles the frontal width of it could become too large for the fast core to fully cover. FIG. 16 shows an example scenario

TABLE 3

| | Flow speed $V_c$ (m/s) | | | | | |
|---|---|---|---|---|---|---|
| | 0.2 | | 0.1 | | 0.1 | |
| Drag coefficient of cable, $C_{Dpc}$ | $0.3^a$ | | $0.1^b$ | | $0.1^b$ | |
| Flow drag per unit length of cable, $w_d$ (kgw/m), | 0.57 | | 0.19 | | 0.05 | |
| Flow drag over the whole cable (ton) | 17.8 | | 5.94 | | 1.56 | |
| Total horizontal span, $S_{pct}$ (m) | 25000 | 20000 | 25000 | 20000 | 25000 | 20000 |
| Span of a cable section, $s_{pc}$ (m) | 225 | 175 | 225 | 175 | 225 | 175 |
| Total horizontal span (weight only), n $s_{pc}$ (m) | 28125 | 21875 | 28125 | 21875 | 28125 | 21875 |
| Horizontal tension in cable (ton) | | | | | | |
| due to cable weight, $T_w$ | 1.75 | 0.73 | 1.75 | 0.73 | 1.75 | 0.73 |
| due to flow drag, $T_d$ | 8.30 | 7.66 | 2.82 | 2.60 | 0.71 | 0.65 |
| Total, $T_w + T_d$ | 10.05 | 8.39 | 4.57 | 3.33 | 2.46 | 1.38 |

Figure 14:
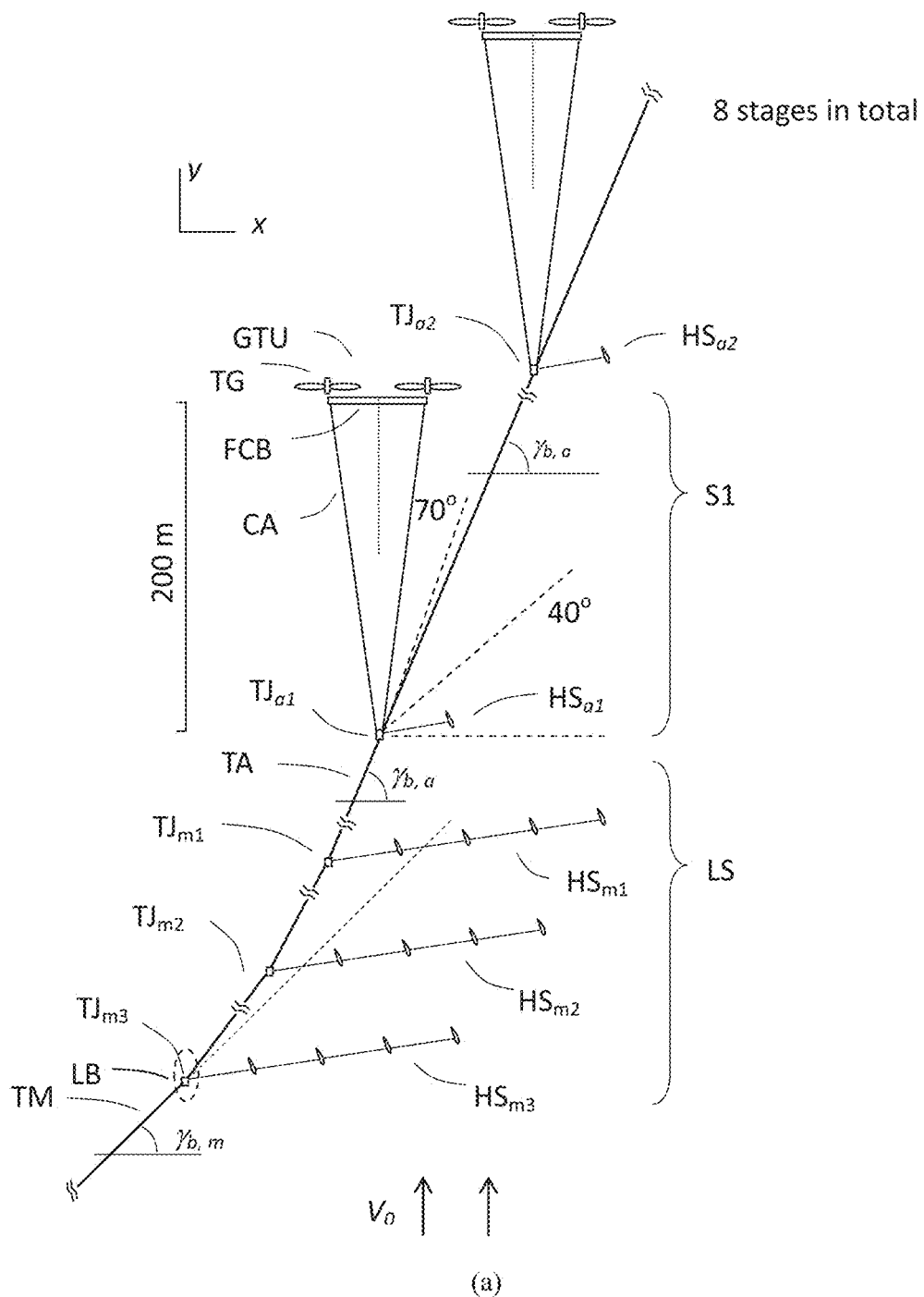
FIG. 14 depicts the configuration according to an embodiment of the present disclose disclosure.
Figure 14:
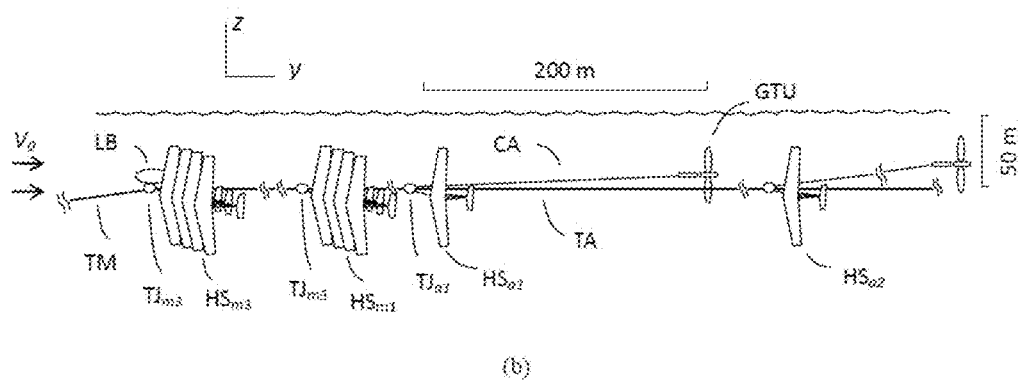
Figure 17:
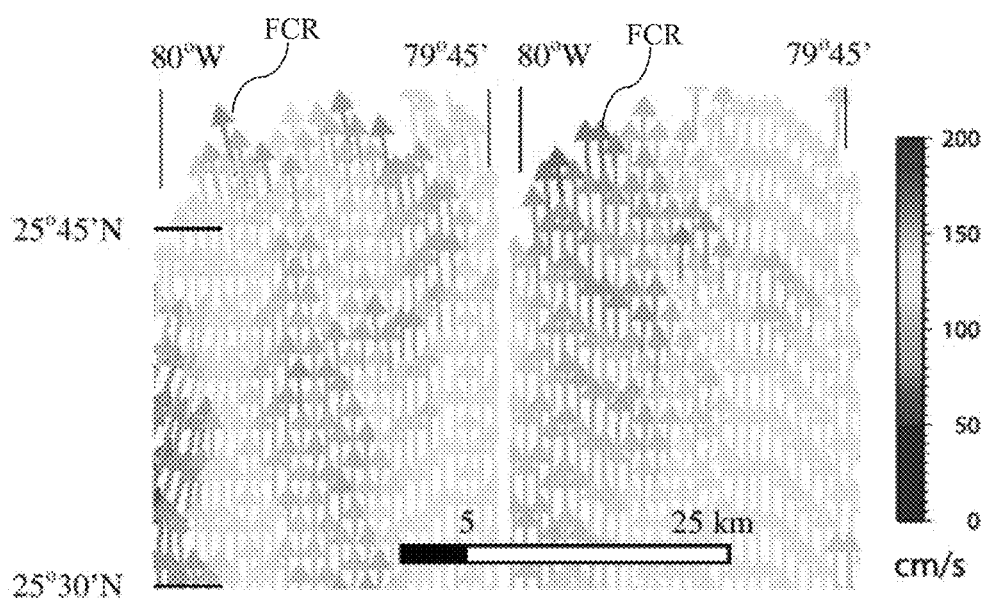
FIG. 17 depicts an example scenario of narrow fast current stream in the Florida Currents.

$^a$2D circular profile in turbulent flow
$^b$2D elliptic profile with aspect ratio over 4:1 in turbulent flow Large Scale Formations In accordance with an exemplary embodiment of the present disclosure, multiple GTUs (power generating turbine units) can be moored together to become a linear array. As illustrated in FIG. 14, the GTUs are attached to an array tether TA on joints ($TJ_{a1}$, $TJ_{a2}$ ... ) successively distributed along the tether, basically moored horizontally at the same depth. The distance from the turbines TG to the joint TJ on the main tether TM was set to keep the rotors away from the main tether TM for the 40°-70° range of deployment angle. The distance between two adjacent GTUs was set roughly based on the 4~8 rotor diameters spacing rule used in wind farm layout. The main tether TM extends down to an of narrow fast current stream in the Kurishio and FIG. 17 shows another example seen in the Florida Currents. It should be noted that because the kinetic energy of a current flow is proportional to the cube of its flow velocity a 5% drop in flow velocity can result in a power loss of almost 15%. By this consideration, the "fast cores FCR" in the two scenarios of FIGS. 16 and 17 are no wider than 2-5 km. Therefore, keeping all generators within the fast core is important. The solution is to separate the hydro sails HS into two groups. The group of stage hydro sails ($HS_{a1}$, $HS_{a2}$ ... ) (or called array sails) includes the hydro sails attached individually to their corresponding stages and its function is to maintain a desired frontal width of the linear array by maintaining array angle $\gamma_{b,\,a}$. The group of main hydro sails ($HS_{m1}$, $HS_{m2}$ . . . ) is mounted before all stages in the leading section LS, i.e., the section before joint $TJ_{m1}$. These sails are used to adjust the deployment angle of the main tether TM, that is, the deployment angle of the whole linear array, $\gamma_{b,\,m}$.

Figure 18:
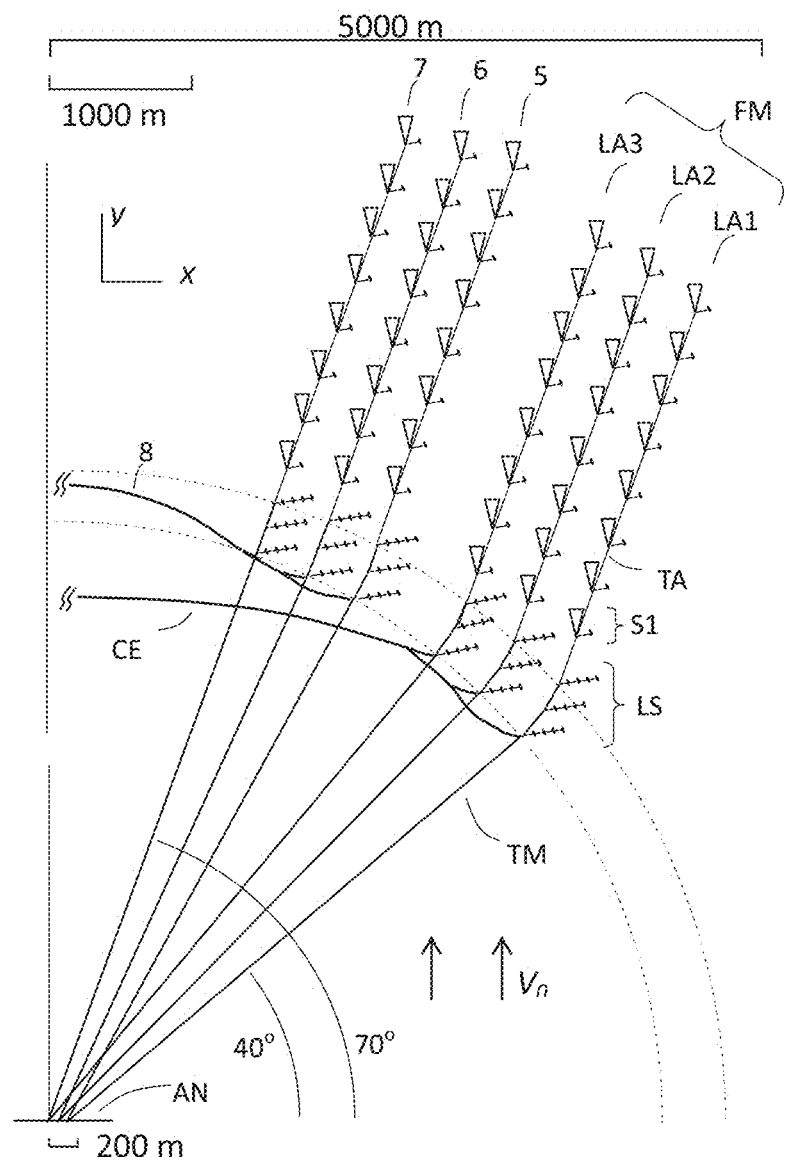
FIG. 18 depicts the 2D formation according to an embodiment of the present disclosure.

The function of this two-group arrangement of hydro sails HS can be further explained using FIG. 18. Assuming LA1 indicates an 8-stage linear array and the stage sails keep the array tether TA at a deployment angle of 70°, the deployment angle of the main tether TM can be kept at 40° by making the main sails at the leading section LS to pull the system at maximally possible force. By easing the pull by these main sails, the whole linear array can be moved to any locations between LA1 and 7 without changing the deployment angle of the array tether, if the conditions of and over the array sails do not change. This is because in this mooring arrangement any force on the tether can only affect the geometric layout of the tether upstream, not downstream.

This two-group arrangement does not increase the total sail area. Numbers from Tab. 1 indicate that maintaining a large array deployment angle $\gamma_{b,\,a}$ needs only a fraction of the maximal pull from the hydro sails HS. Therefore, most of the full sail capacities can be moved away from individual stages and placed into the leading section to achieve this arrangement. As shown in the example design of FIG. 14, the linear array comprises 8 stages. Each stage has two 40-m diameter example turbines and one sail of ~70 m×10 m area, capable of maintaining the array deployment angle $\gamma_{b,a}$ around 70°, based on numbers from Tab. 1. In the leading section, 12 large main sails are used. In total, the averaged sail area per turbine is ~1400 m², capable of moving the whole linear array to main deployment angle $\gamma_{b,m}$ down to 40°, based on the analytical model.

Figure 19:
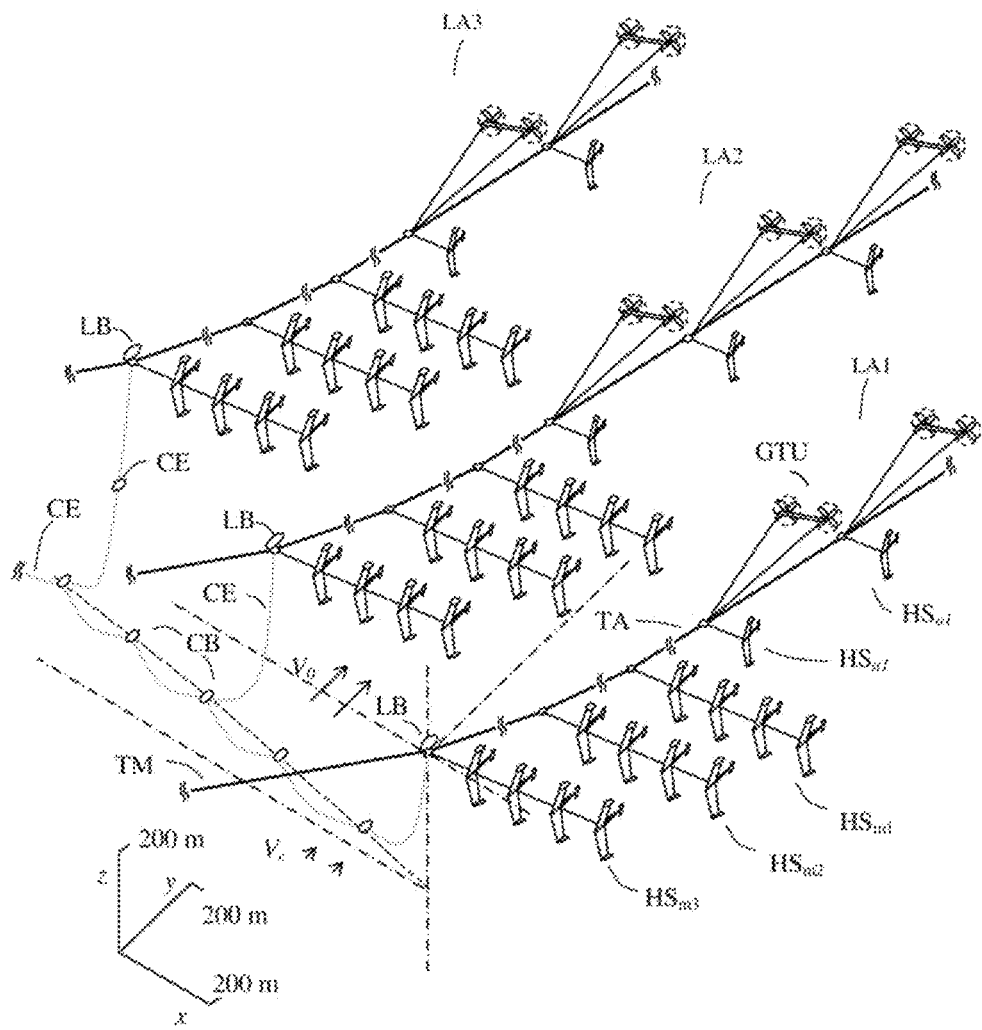
FIG. 19 depicts the perspective view of FIG. 18.

With this two-group arrangement, a 2D formation with a roughly fixed array deployment angle but a variable main deployment angle can be formed by placing multiple linear arrays side by side and mooring them at closely spaced anchoring locations. FIG. 18 illustrates a 2D formation including 3 8-stage linear arrays, comprising 48 turbines with a total power generation capacity of 26.4~52.8 MW, assuming 1.2~1.5 m/s flow speed. The deployment angle of each of the array tethers was set to $\gamma_{b,a}$=70°, which gave a frontal width of each linear array slightly less than 1000 m. The spacing between adjacent linear arrays was selected roughly based on the 4~8 rotor diameter rule used in wind farms (referring to Kuhn M, "Offshore Windfarms", Chap. 16 in Wind power plants: Fundamentals, Design, Construction and Operation, ed. by Gasch R and Twele J, Berlin: Springer-Verlag, 2012). The 2D formation thus occupies an area of approximately 1 by 3 km, with a frontal width of about 1500 m. By using a main tethers TM of about 4.5 km long, the 2D formation has a range of lateral displacement of about 1.5 km if keeping the main deployment angle $\gamma_{b,m}$ of all linear arrays within 40°~70°. If allowing rolling of hydro sails HS about the main tethers TM, then the range of lateral displacement is about 3.5 km on either side of the anchoring area. The spacing between adjacent anchoring points is about 75 meters. FIG. 19 depicts in perspective view the 2D formation of FIG. 18 around the leading sections. Also depicted is part of the power cable with its mooring system.

Figure 20:
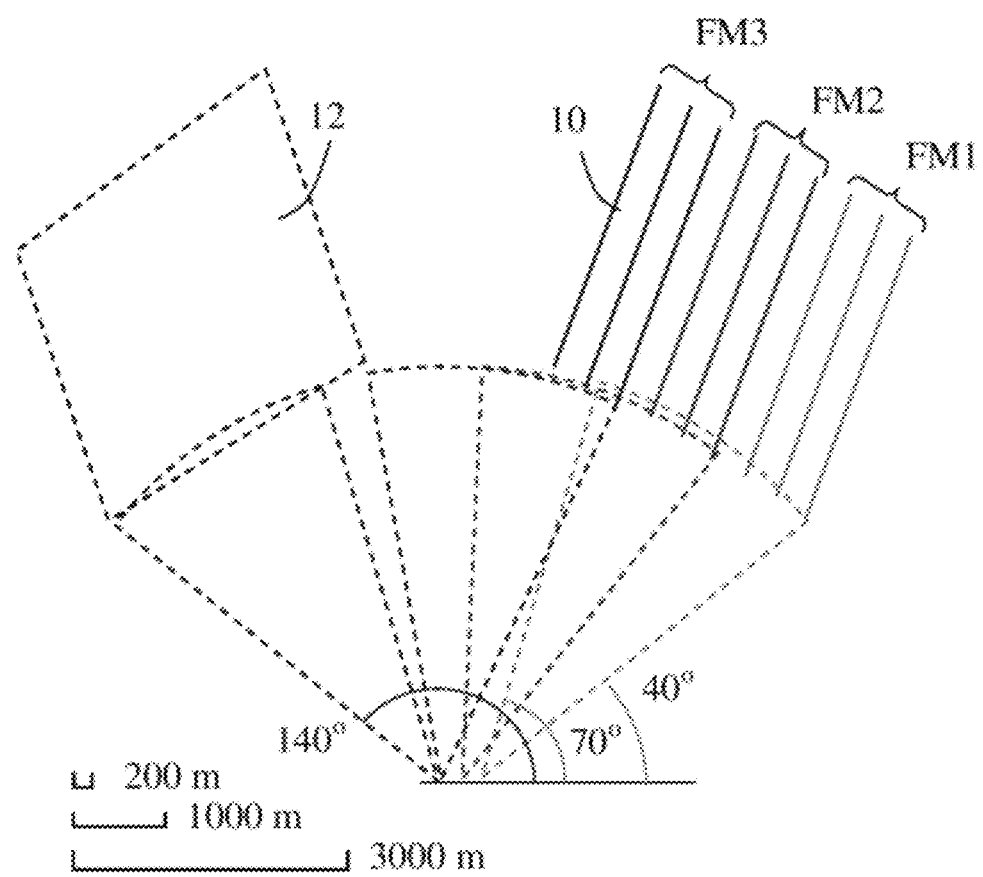
FIG. 20 depicts three 2D formation shown in FIG. 18.

Large scale deployment can be formed by increasing the length and capacity of each linear array in the 2D formation, while maintaining the overall system layout and deployment angles. Multiple 2D formations can also be placed side by side to increase total frontal width of the systems, as illustrated in FIG. 20. FIG. 20 depicts an example layout of 3 2D formations (FM1-3), each of the design of FIG. 18, placed side by side, horizontal position adjustable between 10 and 12.

Mechanism for Adjusting Center of Mass of the Hydro Sail

Figure 21:
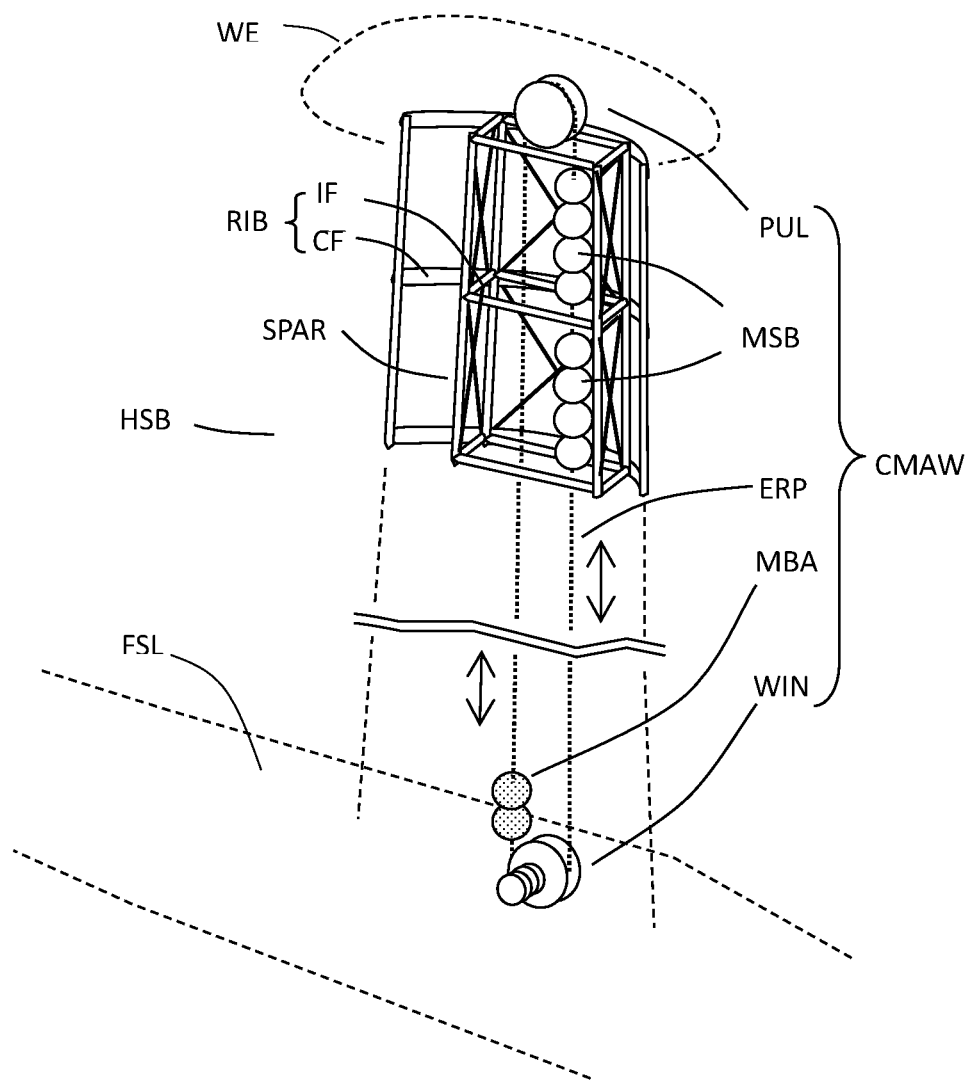
FIG. 21 depicts an adjustable ballast mechanism according to an embodiment of the present disclosure.
Figure 22:
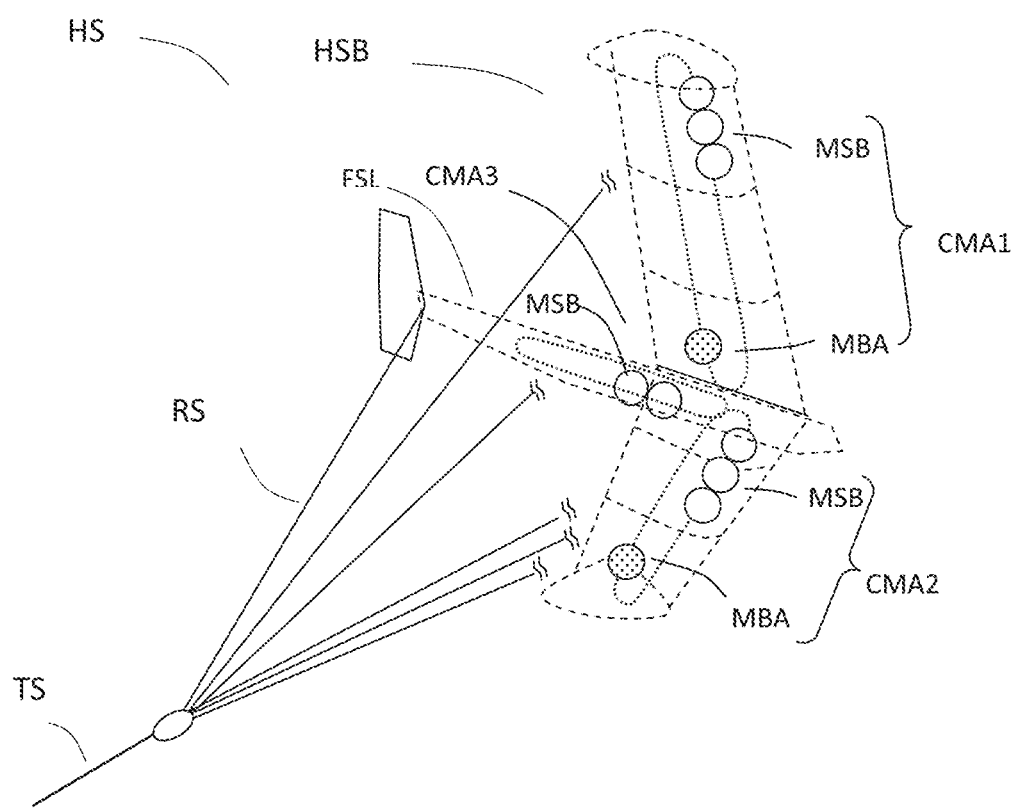
FIG. 22 depicts the structure of the hydro sail according to an embodiment of the present disclosure.

When the hydro sail HS is oriented near vertical position, the buoys near top end and a ballast (or the weight of the frame structure) help to keep the sail stable. For the hydro sail HS to perform a rolling maneuver, as depicted in FIG. 12, the center of mass of the sail should be changed according to sail position and orientation. FIG. 21 depicts an adjustable ballast mechanism (CMAW) comprising a winch WIN, a pulley PUL and an endless rope ERP attached with a ballast weight MBA at one side and a set of buoys MSB at the other side installed inside the sail body. The winch WIN can thus move the ballast and the buoys along the rope but in opposite directions and change their relative positions, thereby changing the center of mass of the sail body. The mechanism can use only a ballast of only buoys MSB as well. Three such mechanisms, two in the sail body HSB (CMA1-CMA2) and one in the fuselage FSL (CMA3), as depicted in FIG. 22, can make effective adjustment of the center of mass of the hydro sail HS for rolling and pitching.

Figure 23:
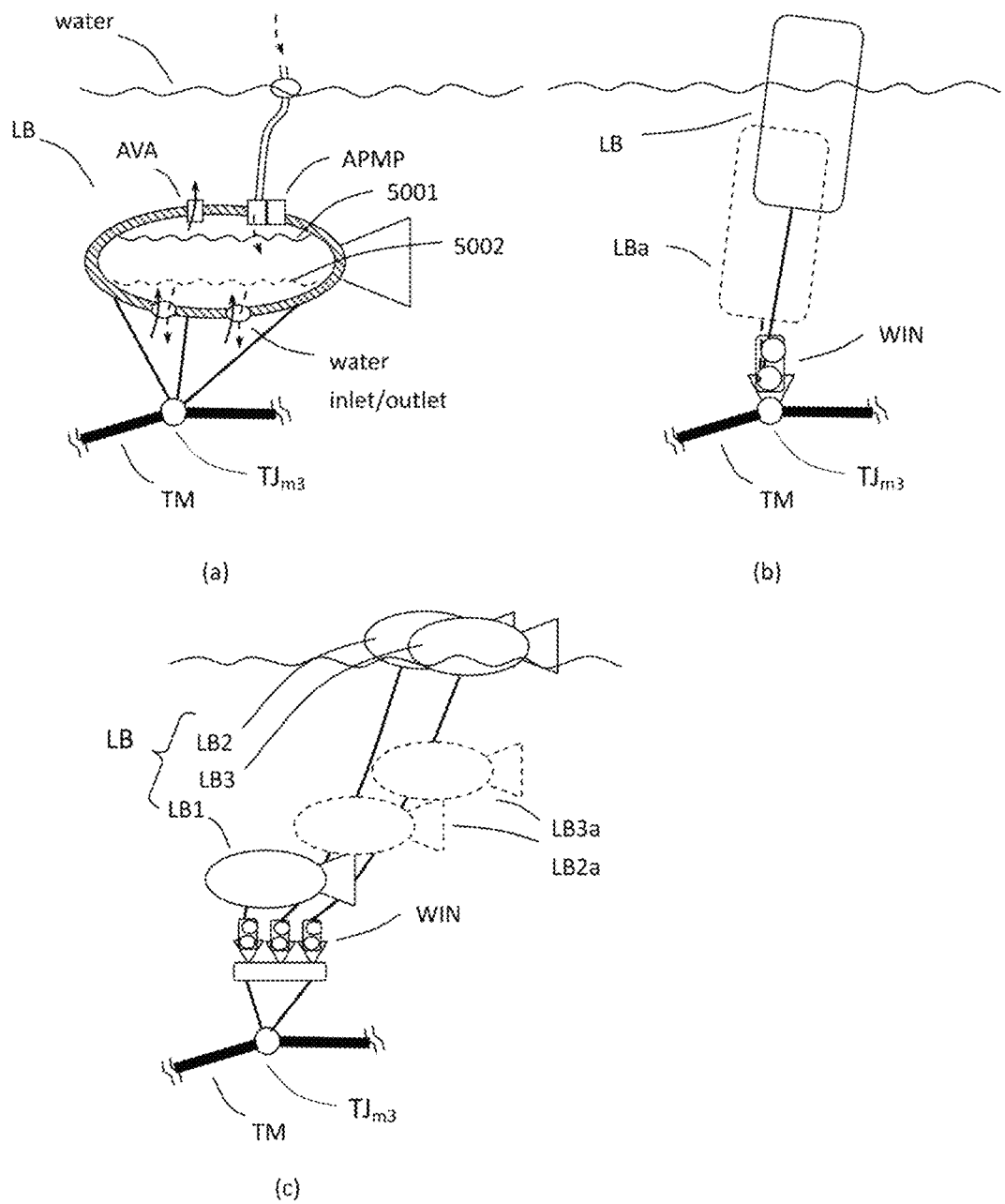
FIG. 23 depicts the structure of the buoy according to an embodiment of the present disclosure.

Regarding ocean current velocity fluctuates, FIG. 23 depicts an exemplary embodiment of the lifting buoy LB. When the current velocity becomes low, the lifting buoy LB at the leading section LS of a linear array, referring to FIG. 14, should reduce its buoyancy. This can be done by several engineering approaches. For example, in FIG. 23(*a*), a mechanism with an air pump APMP and an air releasing valve AVA can be used in the buoy to release air out of or pump air from sea surface into the buoy to regulate its buoyancy. When the buoy contains more water, as the case indicated by water level 5001, it buoyancy is small. Otherwise, as indicated by water level 5002, its buoyancy is large. The buoy can also be of a spar shape so that part of it can float above sea surface to reduce buoyancy, as shown in FIG. 23(*b*). The buoy LB is shown in low-buoyancy position. LBa indicates its high buoyancy position. A winch WIN is used to control the depth of the multi-line joint $TJ_{m3}$. Alternatively, referring to FIG. 23(C), the buoy can be an assembly of smaller buoys (LB1-LB3) each connected to the multi-line joint $TJ_{m3}$ by a line with a winch. Extending selected lines releases some small buoys (e.g. LB2 and LB3) to sea surface and thereby reduces total buoyancy. LB2a and LB3a indicate high buoyancy position of the two buoys LB2 and LB3.

Basic Anchoring Approach 1: Deadweight-On-Slope

Figure 24:
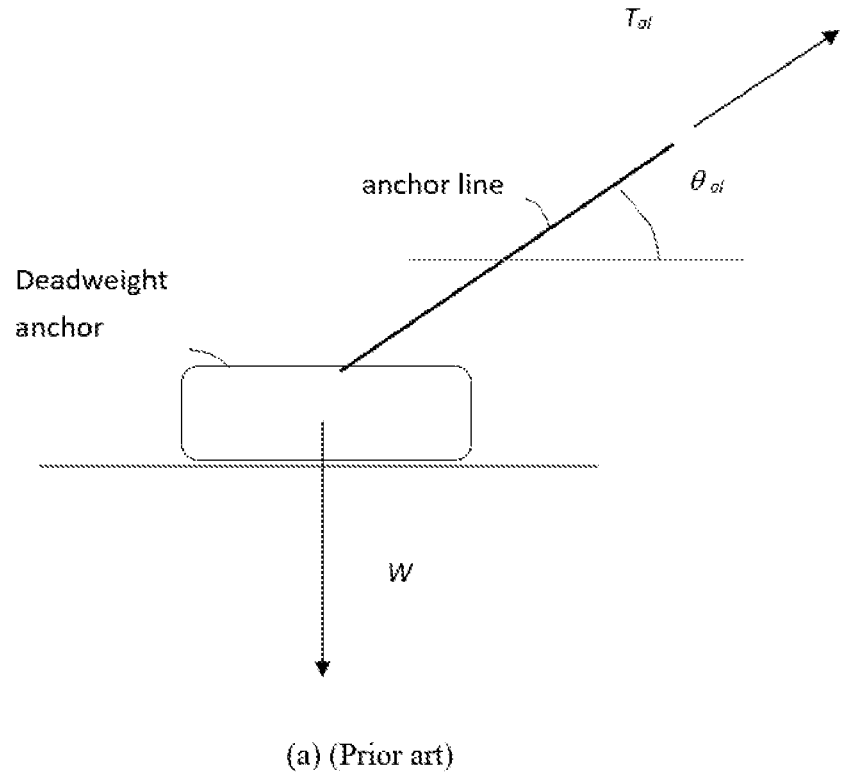
FIG. 24 depicts force analysis of a deadweight anchor on (a) a horizontal surface and (b) on a slope.
Figure 24:
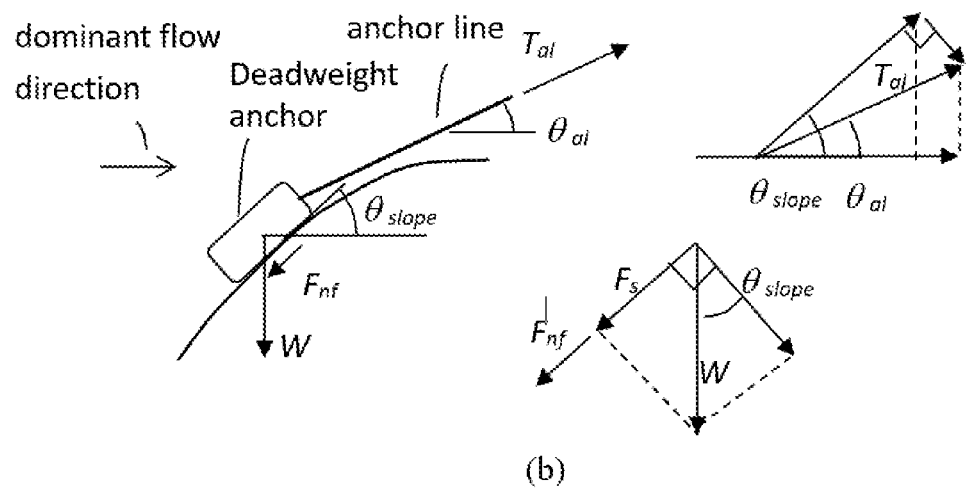

In accordance with an exemplary embodiment of the present disclosure, two methods for anchoring are presented. The basic concept of the first method is to find slopes facing the direction of flow in the undersea terrain to deploy deadweight anchors and make use of gravity on the inclined surface and friction induced by the tension of the anchor line to increase anchor capacity. FIG. 24(*b*) depicts this idea.

In the case of the Deadweight-on-slope anchor, as shown in FIG. 24(*b*), the maximal capacity is found by estimating the tension in the anchor line in the situation when the anchor is just about to be pulled to move up the slope. The friction induced by forces normal to the surface of the slope is $$F_{nf}=f[W\cos\theta_{slope}+T_{al}\sin(\theta_{slope}-\theta_{al})] \quad (41)$$

wherein $\theta_{slope}$ is the angel of the slope and $\theta_{al}$ is the angle of the anchor line. Take note that the term $T_{al}\sin(\theta_{slope}-\theta_{al})$ is the force component from the tension in the anchor line acting at normal direction to the surface of the slope. If $(\theta_{slope}-\theta_{a1})>0$, then this term enhances the friction pull. If $(\theta_{slope}-\theta_{al})<0$, then it decreases the friction pull. Another force component resisting the pull is direct gravitational force from deadweight component pointing down the slope, $$F_s = W \sin \theta_{slope} \qquad (42)$$

When the anchor line tends to pull the deadweight upward the slope, the tension in the anchor line reaches the extent that its component along the surface of the slope equals the total downward pull on the anchor along the slope surface Fnf+Fs, that is, $$T_{al}\cos(\theta_{slope}-\theta_{al})=F_{nf}+F_s \qquad (43)$$

Combining eqns. (41)-(43) and rearranging gives the expression of the effective horizontal capacity of a deadweight anchor on a slope, $$T_{al}\cos\theta_{al}/W=(f+\tan\theta_{slope})/(1+\tan\theta_{al}\tan\theta_{slope}-f\tan\theta_{slope}+f\tan\theta_{al}) \qquad (44)$$

In the special case of $\theta_{slope}=\theta_{al}$, eqn. (44) becomes $$T_{al}\cos\theta_{al}/W=(f+\tan\theta_{al})/[1+(\tan\theta_{al})^2]=f(\cos\theta_{al})^2+\sin\theta_{al}\cos\theta_{al} \qquad (45)$$

Figure 25:
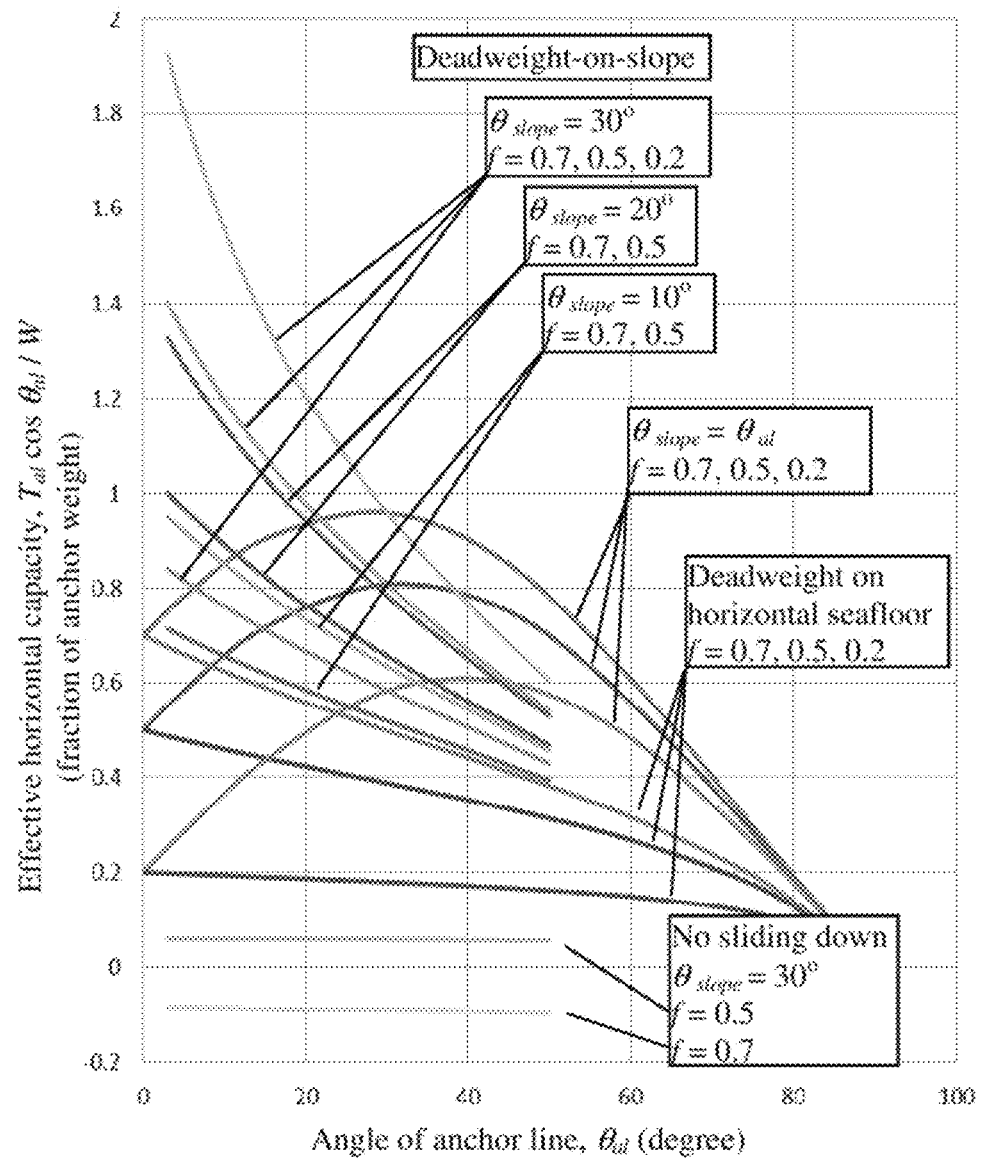
FIG. 25 depict the effective horizontal capacity of the Deadweight-on-slope anchor on slope according to an embodiment of the present disclosure.

FIG. 25 shows the effective anchor efficiency of the Deadweight-on-slope anchor on slopes of different angles with different values of contact friction coefficient f, in comparison with the case of deadweight on a horizontal surface, calculated from eqns. (40), (44) and (45). The Deadweight-on-slope anchor has significantly higher efficiencies than deadweight on a horizontal surface. When the anchor line angle is small and the slope angle is between 10 to 30 degrees, the capacity can be over 0.8 to 1.8, compared to less than 0.5 to 0.7 on horizontal surfaces.

Basic Anchoring Approach 2: Drag-Stop Anchoring

Figure 26:
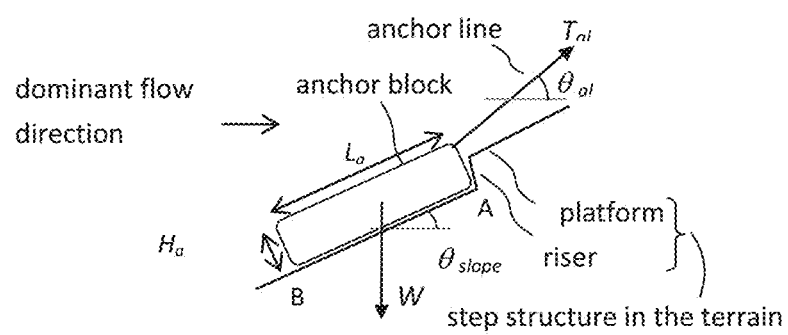
FIG. 26 depicts the concept of the Drag-stop anchor according to an embodiment of the present disclosure.

The second method is called Drag-stop anchoring. This method is to be applied on a firm rock base. It finds on the rock terrain a step-like structure, or a shallow protrusion, with a very steep or almost vertical riser edge facing the direction of the flow and places a deadweight anchor against the riser edge to use the step structure as a stop, or a movement restrictor. By setting the anchor and the anchor line against the stop, the anchor capacity is no longer limited by the contact friction coefficient but depends on the strength of the step structure and the dimension of the anchor. FIG. 26 illustrates the basic idea. As depicted, the deadweight is basically in a form of a block (i.e. an anchor block) for easy analysis. The horizontal capacity of the anchor is limited by two conditions. When the magnitude and the angle of the tension in the anchor line become too large, the anchor can either flip tail up, by rotating clockwise about point A, causing the front end to skid over the step, or can be pulled directly up away from the step (rotation about point B). Force balance according to the two conditions gives the following two equations:

$$T_{al}\cos(\theta_{al}-\theta_{slope})H_a \le \cos\theta_{slope}L_a/2+W\sin\theta_{slope}H_a/2 \qquad (46)$$

$$T_{al}\sin(\theta_{al}-\theta_{slope})L_a \le W\cos\theta_{slope}L_a/2-W\sin\theta_{slope}H_a/2 \qquad (47)$$

wherein La is the length of the anchor block and H,a is the height of the anchor block, eqns (46) and (47) lead to the following two relations limiting the horizontal anchor efficiency:

$$T_{al}\cos\theta_{al}/W \le [\cos\theta_{slope}/(\cos\theta_{slope}+\tan\theta_{al}\sin\theta_{slope})]L_a/(2H_a)+\sin\theta_{slope}/[2(\cos\theta_{slope}+\tan\theta_{al}\sin\theta_{slope})] \qquad (48)$$

$$T_{al}\cos\theta_{al}/W \le \cos\theta_{slope}/[2(\tan\theta_{al}\cos\theta_{slope}-\sin\theta_{slope})]-(\sin\theta_{slope}/[\tan\theta_{al}\cos\theta_{slope}-\sin\theta_{slope}])H_a/(2L_a) \qquad (49)$$

In the case where the seafloor is flat, i.e. $\theta_{slope}=0$, the two relations become $$T_{al}\cos\theta_{al}/W \le 0.5 L_a/H_a \qquad (50)$$

$$T_{al}\cos\theta_{al}/W \le 0.5/\tan\theta_{al} \qquad (51)$$

which indicate that Hal should be small and $L_a/H_a$ should be large in order to have large horizontal capacity.

Figure 27:
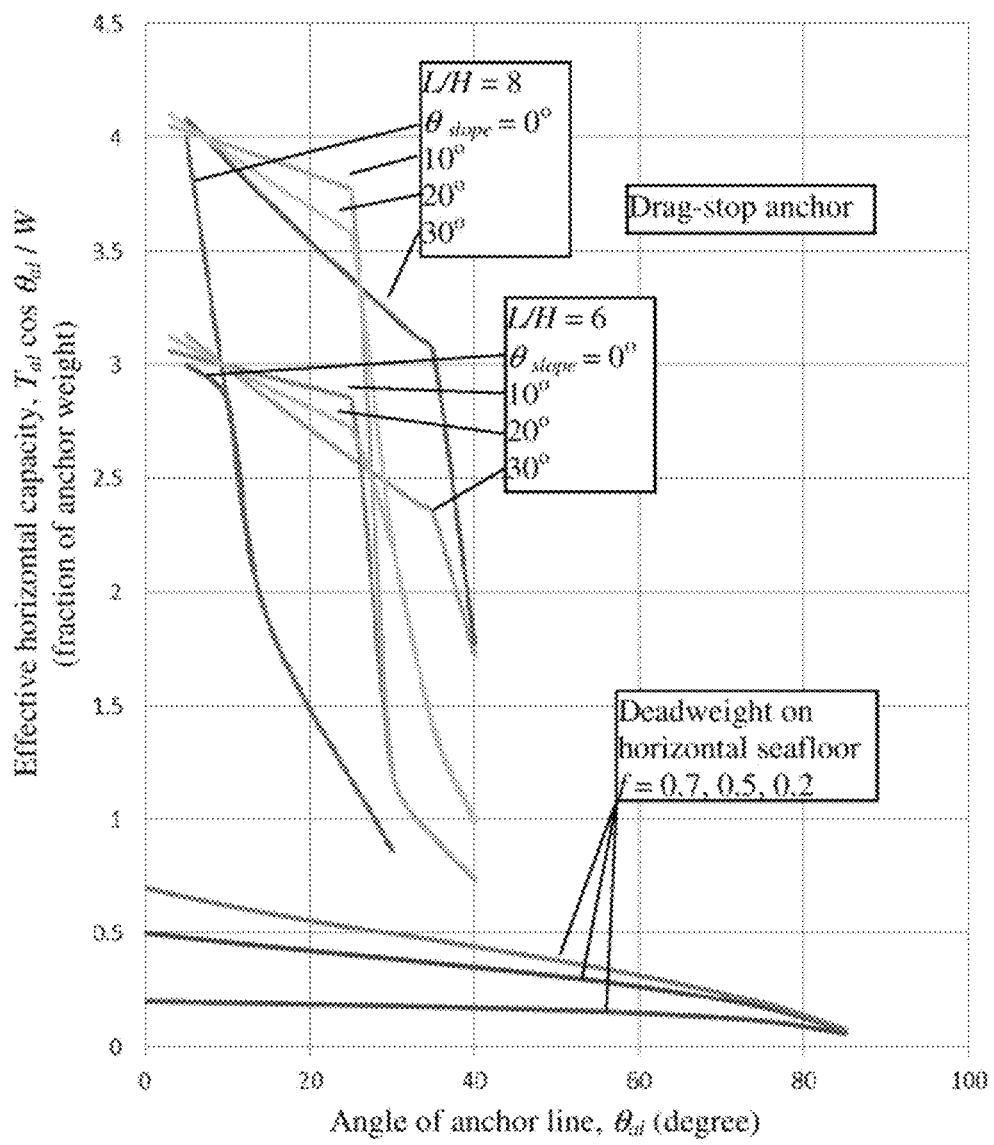
FIG. 27 depicts the effective horizontal capacity of the Drag-stop anchor according to an embodiment of the present disclosure.

FIG. 27 plots effective horizontal capacities of the Drag-stop anchor at different anchor line angles in different cases according to equations (48) and (49). Very significant improvements over traditional deadweight on horizontal surfaces can be seen in all cases when the angle of anchor line is below 30 degree. Higher $L_a/H_a$ values give higher capacities. Higher slope angles result in wider high-capacity range. When the Drag-stop anchor is placed on slopes, high capacities can be obtained up to at least 25-30 degree of anchor line angle.

Total capacity of such a Drag-stop style anchor should further include the weight and friction effect of the anchor block. That is, corresponding capacities from FIG. 25 should be added to the capacities in FIG. 27. Thus, at low anchor line angles, effective anchor capacity of 4 to 6 could be achieved, under the specifications shown in the FIG. 25, nearly 10 times improvement over traditional deadweight anchors on a horizontal surface.

The tension in the anchor line varies in response to flow speed, turbine loading and change of the main tether deployment angle $\gamma_b$. When the tension in the anchor line decreases, it is necessary to prevent the deadweight anchor from sliding down the slope and dragging the system into the deep. This can be dealt with in several ways. First of all, the static friction between the anchor and the slope reverses its direction when the anchor tends to slide downward and is found to be able to prevent downward sliding in most cases. The following condition will prevent the anchor from actually sliding down, $$T_{al}\cos(\theta_{al}-\theta_{slope}) \pm F_{nf} \ge F_s$$

Inserting eqns. (41) and (42) gives $$T_{al}\cos\theta_{al}/W \le (-f+\tan\theta_{slope})/(1+\tan\theta_{al}\tan\theta_{slope}+f\tan\theta_{slope}-f\tan\theta_{al})$$

This is the minimal horizontal tension on the anchor line, expressed as a fraction of the net deadweight, needed to prevent the anchor from sliding downward. Calculations using the conditions and design parameters of FIG. 25 show that only when $\theta_{slope}$ is larger than 30° and f is smaller than 0.5 this required minimal tension becomes positive, as shown in FIG. 25.

If static friction alone is not enough to prevent downward sliding, then additional upward forces can be generated by adding traditional deadweights for reverse directions, since the required minimal tension is small, as shown in FIG. 25. Another sure way is to use a natural stop. For example, if the slope flattens not far below the operation position of the deadweight, then the terrain can be a natural "stop" and the anchor can be "parked" there.

Anchor Construction, Implementation and Deployment

In accordance with an exemplary embodiment of the present disclosure, an example power generating turbine GTU of 40 m diameter and an example hydro sail system HS of planform area 1400 m² using Gottingen 624 airfoil profile were used for analysis. Assuming an example generator-turbine unit GTU comprises 2 such turbines and a set of hydro sails HS of twice the above planform area, the corresponding maximal tension on the main tether TM in a current flow of 1.5-1.6 m/s will be about 600 tons.

Assuming the length of the main tether TM is 5~10 km and the depth of the anchoring point AN is 200~500 meters, the corresponding anchor line angle $\theta_{al}$ will be about 1°~6°. Applying the Deadweight-on-slope method under the best conditions, an anchor capacity of 0.8~2 can be obtained, per FIG. 25. This corresponds to 750~300 tons of deadweight in order to get the 600 tons of anchoring force. If the Drag-stop anchor is used, a total anchor capacity of 4~6 can be obtained, per the sum of FIG. 25 and FIG. 27, and an anchor block weighing 150-100 tons will be enough for the example GTU. Drag-stop anchoring is the preferred approach whenever possible.

In practical implementations, the most ideal situation is that suitable natural step structures can be found on bedrocks in preferred sites. Drag-stop anchors can be used and submarine engineering can be kept to the minimum. High resolution side scan sonar may be applied for searching such locations. Anchor blocks can be in the form of prefabricated caissons. They can be towed to locations floating on water by tugs and then flooded and lowered into positions on the seabed.

Figure 28:
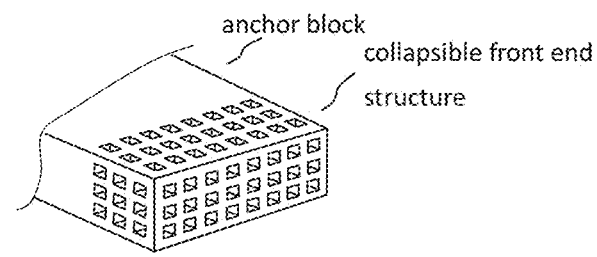
FIG. 28 depicts designs of the Drag-stop anchor based on the concept of anchor block with a collapsible front end according to the present invention.
Figure 28:
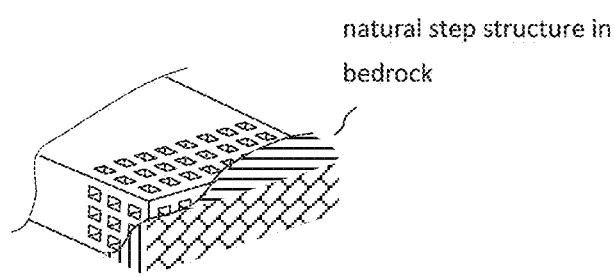
Figure 28:
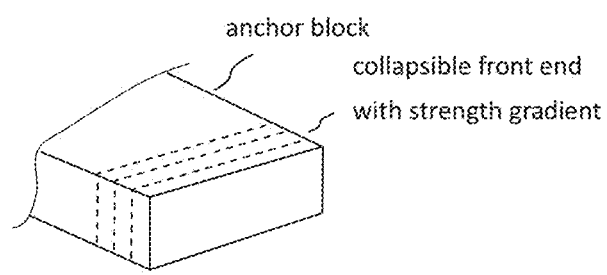

A natural step structure on unmodified bedrock surface is most likely to have irregular shapes. Therefore, it is desirable to make an anchor block capable of conforming to the shape in order to have maximal contact area. In accordance with an exemplary embodiment of the present disclosure, one approach is to make the front end of the anchor block collapsible, such as one design example of concrete with a built-in structure with voids as shown in FIG. 28(a), such that local high compressions can cause local material breakaway and result in overall shape change of the front end, as illustrated in FIG. 28(b). An alternative design is to cast the anchor block with a gradual variation of concrete composition so that the compressive strength toward the front end decreases gradually, which can provide a similar function as the void structure, as depicted in FIG. 28(c).

Figure 29:
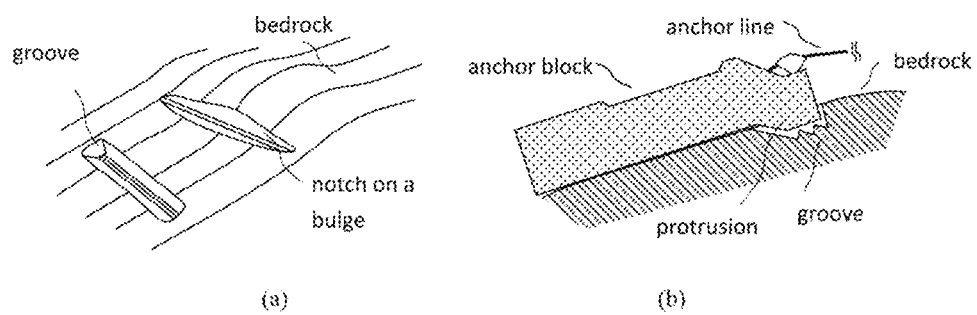
FIG. 29 depicts the concept of the Drag-stop anchor making use of grooves or notches cut out of a rock surface according to the present invention.

If ideal step structures cannot be found on natural bedrock surfaces, then they can be made by modifying natural bedrock surfaces by cutting or controlled expositions. For example, subsea abrasive water jet cutting technology can now operate at depth to 3000 m and cut steel up to 250 mm thick (referring to Maslin E, "Subsea waterjet cutting goes ultra-deep and ultra-high pressure", OE:2013/October (Digital Edition), retrieved January 2016) or highly reinforced concrete up to 1200 mm thick (referring to Anonymous, "UHP Abrasive Water Jet Cutting", in company website of the DECO nv of Brugge, Belgium, retrieved February 2016). By cutting multiple slits of different orientation on a bulge of a rock surface, a notch can be made and can be used as a step structure, as illustrated in FIG. 29(a). On a flat surface, a groove can be made by similar cutting procedure. The anchor block can be made to comprise a protrusion at bottom that can match the groove and become a recessed Drag-stop configuration, as illustrated in FIG. 29(b).

Figure 30:
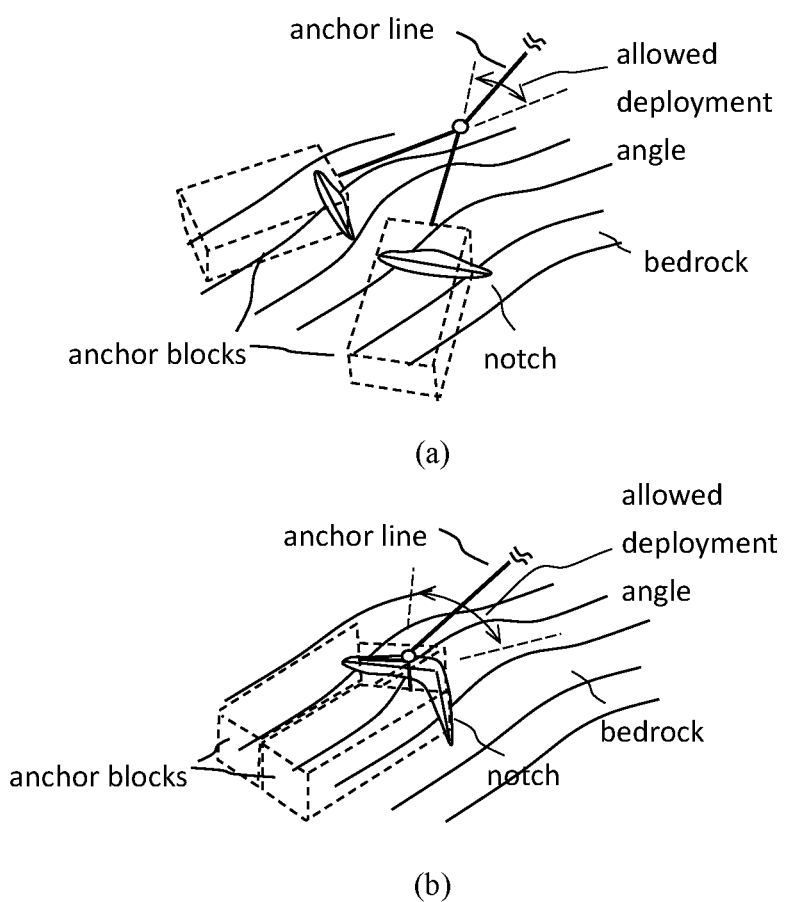
FIG. 30 depicts the concept of the Drag-stop anchor making use of grooves or notches cut out of a rock surface according to the present invention.

In accordance with an exemplary embodiment of the present disclosure, two sets of step structures for two sets of anchors can be oriented with a relative angle and jointly hold the main tether TM to accommodate the variation of the main deployment angle of the system $\gamma_b$, as illustrated in FIG. 30.

Cutting step structures out of bedrocks still involves subsea operations. However, the operation cost is expected to be much lower than drilling or piling because only materials in the slits indicated in FIG. 29(a) need to be removed, while in piling or drilling, much more materials must be removed to create many holes.

On the other hand, applying Deadweight-on-slope anchors basically does not require any difficult subsea operation. But it needs more anchor mass due to lower anchor efficiency, and more anchor mass means more transportations and operations by surface vessels, compared to using Drag-stop anchors. The selection will likely depend on actual situation and detailed cost analysis.

Usual materials for anchors include steel and concrete. Concrete, based on density of 2,400 kg/m$^3$ (referring to Anonymous, "Concrete in Practice: what, why and how?" CIP 31, pub. by National Ready Mixed Concrete Association, 2000, retrieved February 2016), has a net weight of 1,400 kgw per cubic meter in water. The retail price (ready to pour) is about US$75~150 per cubic yard (0.765 m$^3$), which corresponds to a cost of US$70~140 per ton of net weight in water. Steel, on the other hand, costs about US$470~820 per ton of net weight in water. Using concrete is obviously the more economical way.

The compressive strength of concrete can be over 25 MPa (referring to Anonymous, "Concrete in Practice: what, why and how?" CIP 31, pub. by National Ready Mixed Concrete Association, 2000, retrieved February 2016). At a compressive strength of 25 MPa, an apparent contact area of only 0.25 m$^2$ is enough to withstand the 600 tons of maximal anchoring pull generated by one example GTU. A few square meters of contact area in a Drag-stop anchor setup can anchor a linear array of tens of GTUs.

An anchor block weighing 150 ton, capable of anchoring one example GTU, should have an apparent volume over 150 m$^3$, e.g., a dimension of 12 m long by 6.25 m wide by 2 m high, giving $L_a/H_a=6$, in order to float as a caisson.

Figure 31:
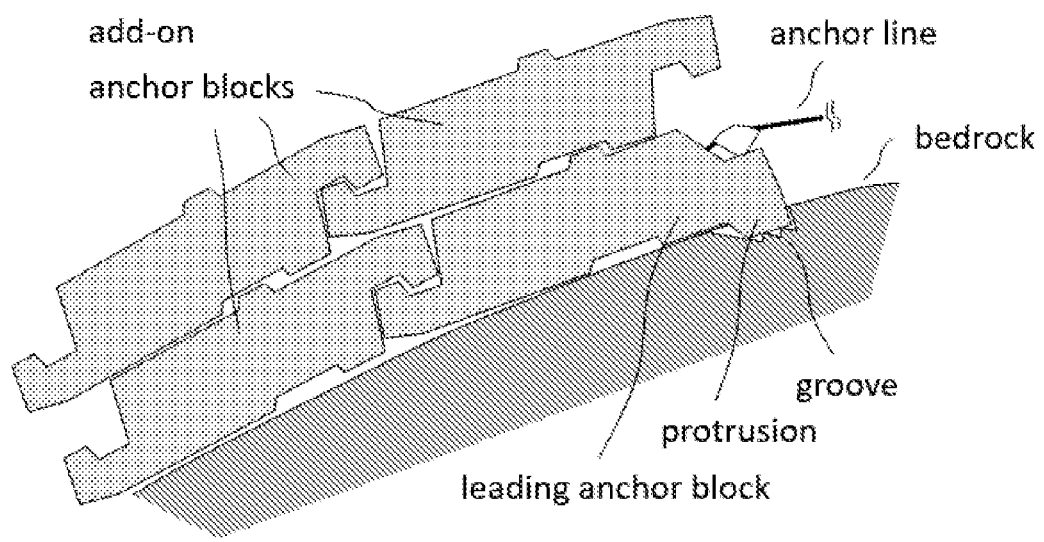
FIG. 31 depicts the concept of stacking up anchor blocks that can be interlocked to increase weight of an anchor.

By making the anchor blocks into shapes that can be loosely interlocked and stacked up, as illustrated in an example design in FIG. 31, total anchor weight can be increased in a concentrated and stable fashion. For example, 8 such anchor blocks, at least, can anchor one linear array of 8 example GTUs, with a total power generation capacity of 8.8~17.6 MW (1.2~1.5 m/s flow). The blocks will occupy an area less than 30 m by 20 m. In a Drag-stop anchor setup, the required contact area in the step structure for the 8-stage array will be only 2 m$^2$. Therefore, only 1 or 2 small grooves need to be cut. And only 1 or 2 leading blocks need to engage the grooves and the rest can be "add-on" blocks.

System Failure Mode Designs

Preferably, to prevent the system from damage or loss, the turbine blades should have pitch control capability so that they can be put to feather positions to reduce thrust drag in cases of sudden current velocity increase or flow direction change into non-dominant directions.

Possible mooring failures include scenarios such as tether breaking or, in the case of Drag-stop anchor, step structure breaking or anchor skidding off the step, for example in a very severe earthquake. One safeguard to step structure failure is to cut parallel redundant grooves and make redundant protruding features at the bottom of the leading anchor block so that if the block is pulled and moved, a new stop configuration can form.

The system should be made to be close to neutral buoyancy but still capable of floating. In operations, the hydro sails and the horizontal front connecting board connecting the two turbines pull the system down to operation depth. In case of mooring failure, the system can float up and will not be lost in sea.

Speed Adjustment Schemes

Adjusting the angle of attack of the hydro sail HS can control its outward movement speed. To move fast, the hydro sail HS can pitch to an angle of attack larger than the value required by static balancing at the destination, that is, overshooting the pitch, and the system can obtain a larger pull and a higher average speed. When the system moves near the final position, the hydro sail HS can then pitch back to the target angle. If the flow variation is slow, then the hydro sail HS can also pitch to a smaller angle of attack.

If the turbine continue to generate power at the maximal Betz efficiency during the process of system movement, the turbine takes very strong thrust, which limits the speed of system movement. However, if the turbine blades are pitched toward feather, thrust over the turbine can be reduced significantly and higher motion speed can be achieved.

As for system speeds in an inward movement, it can be deduced that the initial inward speed cannot be faster than the drifting speed, which is explained below. In an inward movement, regardless of the final destination, the hydro sail HS can pitch to a small angle of attack at the beginning phase so that the tension in the sail tether becomes minimal during most time of the process of movement. Because of the loss of strong outward pull from the hydro sail HS, the main tether TM and the cables between the multi-line joint TJ also lose tensions in the beginning phase. As a result, the system drifts and current flows carry the turbine downstream and inwards, tethered only by the main tether TM. These are the limits of the initial inward speed of the example system. Increasing the angle of attack of the hydro sail HS can increase outward pull and thereby slow down the inward movement. When $\gamma_b$ approaches the desired final angle, the hydro sail HS can pitch to the desired angle of attack to brake and let the system settle to the final destination.

Extended Lateral Displacement of the CSAM System for Possible Large Meanders

From previous descriptions, regarding to FIG. 5 and FIG. 12, the full extent of horizontal displacement of the CSAM system can be slightly over the length of the main tether. In cases when the meander of the velocity core is large, it is preferred for the CSAM system to have a large horizontal displacement capacity. One way to increase the full extent of horizontal displacement is to use a very long main tether. However, making a very long main tether involves significant costs, because the tether must be made to endure the maximally possible tensile forces during operation and therefore a lot of materials is needed.

An alternative and cost-effective approach for a linear array to obtain large capacity of lateral displacement is to use a comparatively short main tether TM and transfer the linear array among multiple anchoring points, while the system can still sway laterally when anchored to an anchoring point. In this way, the range of horizontal displacement of the linear array is only limited by the number and spans of anchoring points. If an efficient and economic method can be designed and developed, this approach of lateral transfer of anchoring location can have significant cost advantage over the use of long tethers because anchors account for only a small component in the cost structure of the CSAM system. Considering that the need to accommodate LM effects is primarily a precaution for a long term alternative rather than a short term handling, the combination of shorter tethers with additional anchoring points probably makes more sense. The feature of allowing concentrated anchoring of long linear arrays of the CSAM concept is also advantageous for this approach.

Figure 32:
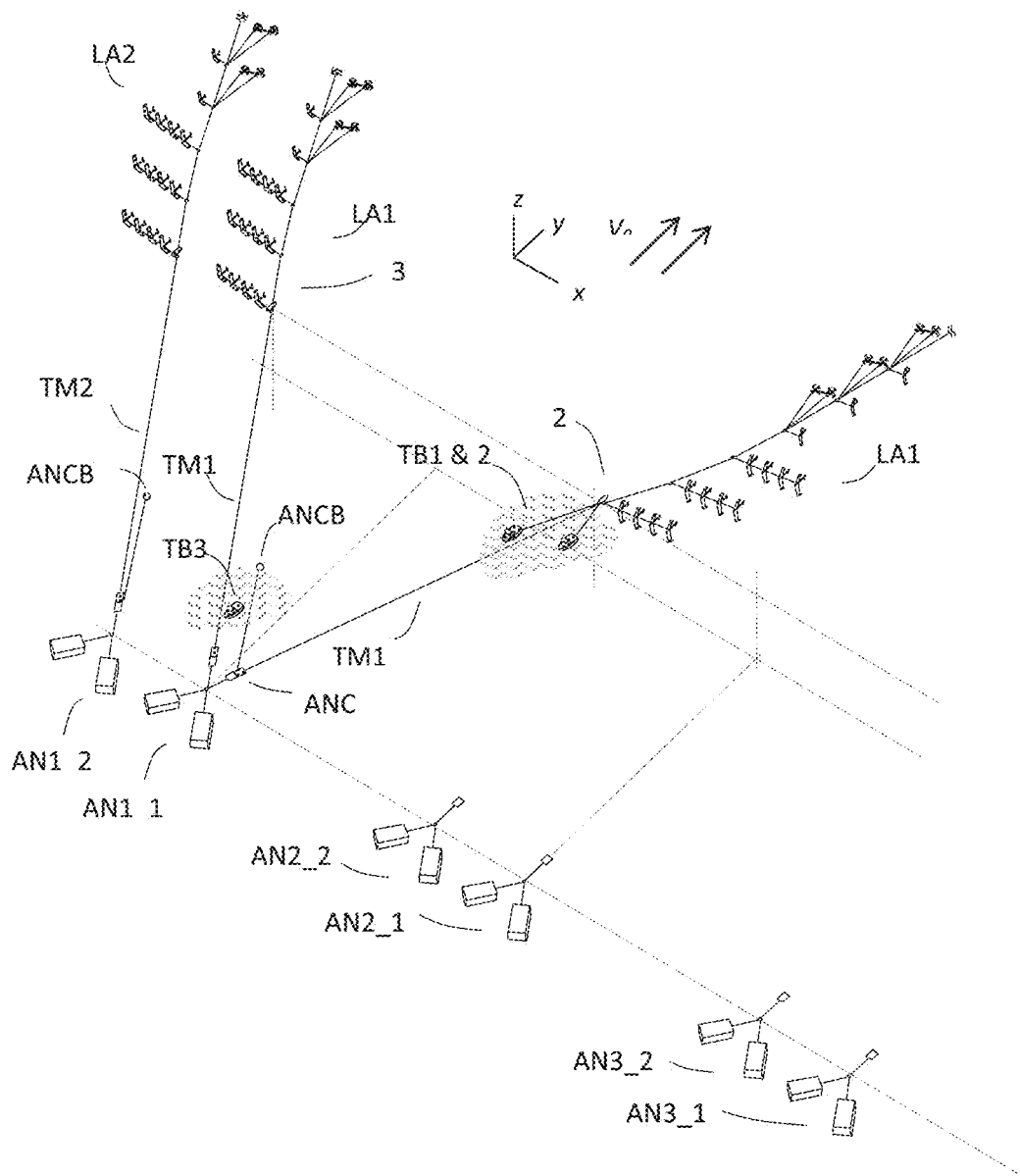
FIG. 32 depicts the concept for moving the mooring system according to an embodiment of the present disclosure.
Figure 32:
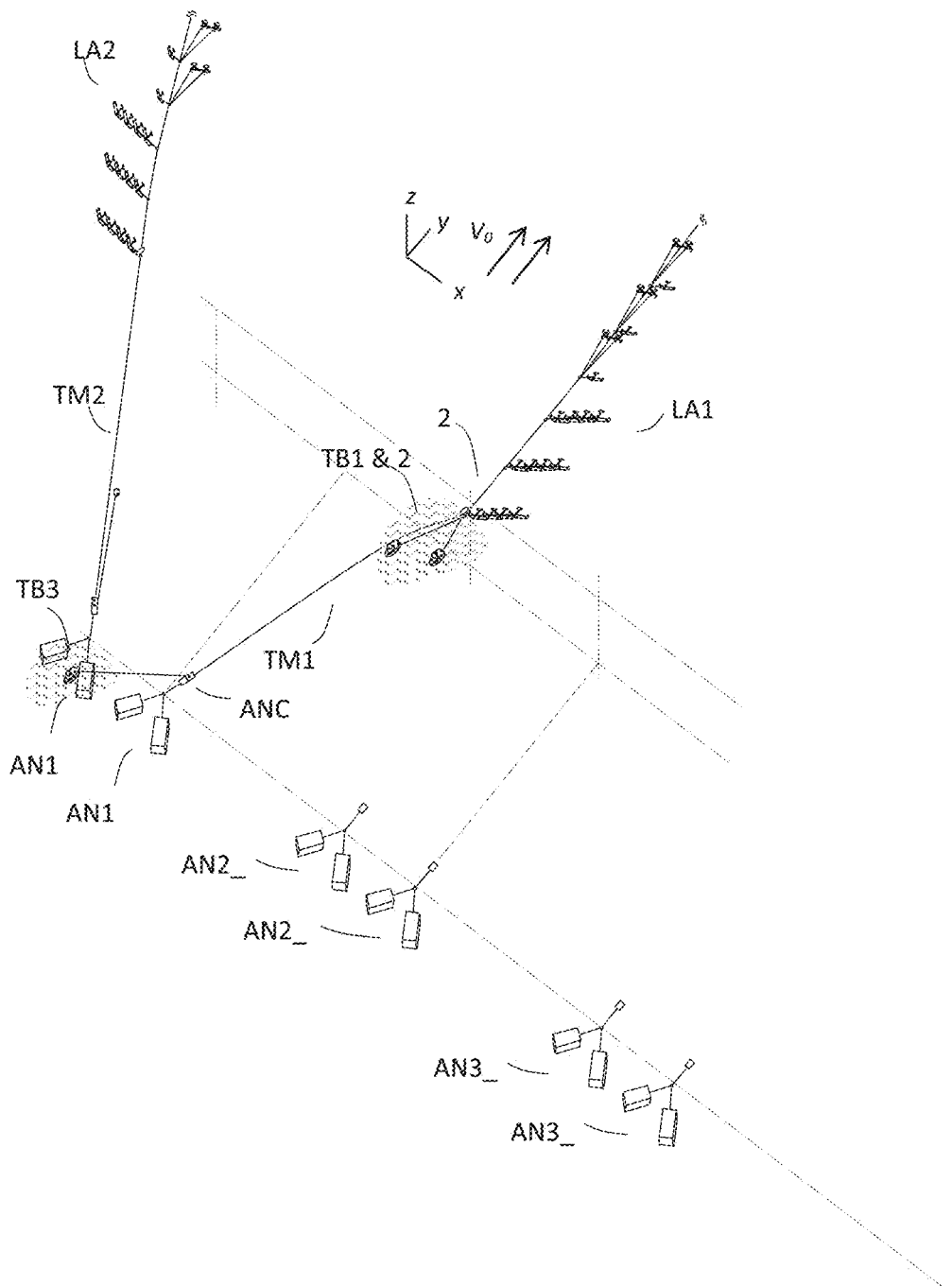
Figure 32:
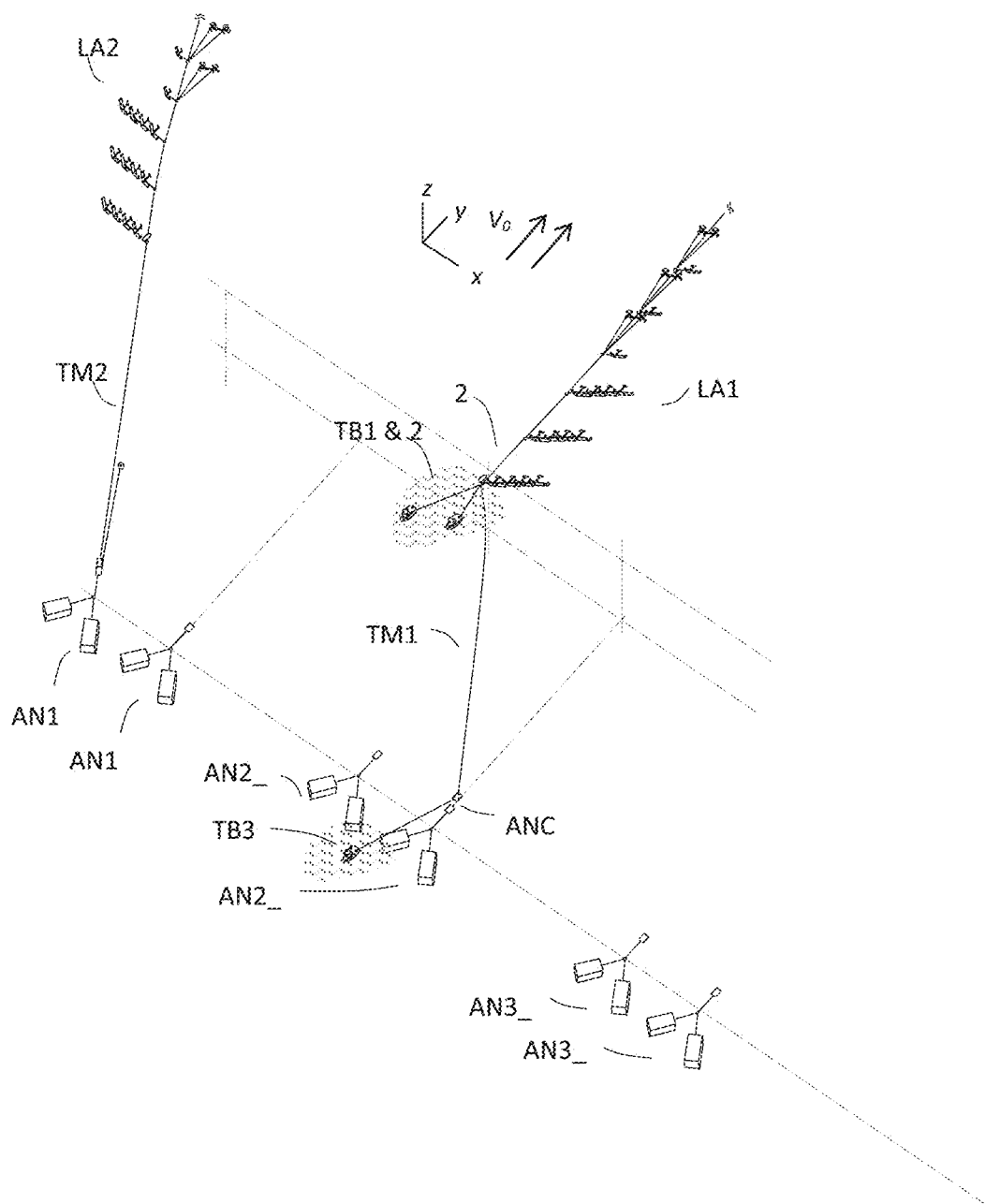
Figure 32:
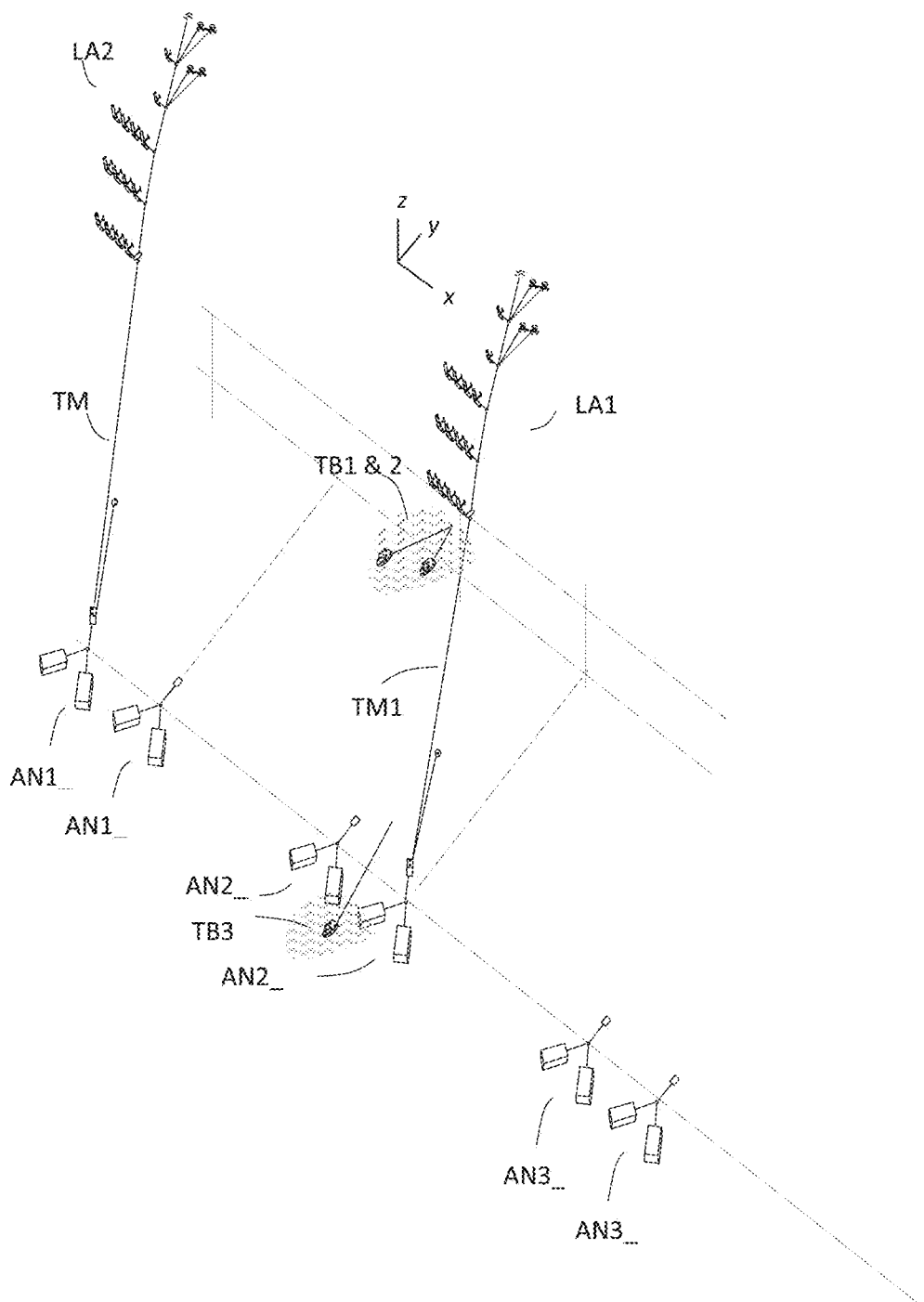
Figure 32:
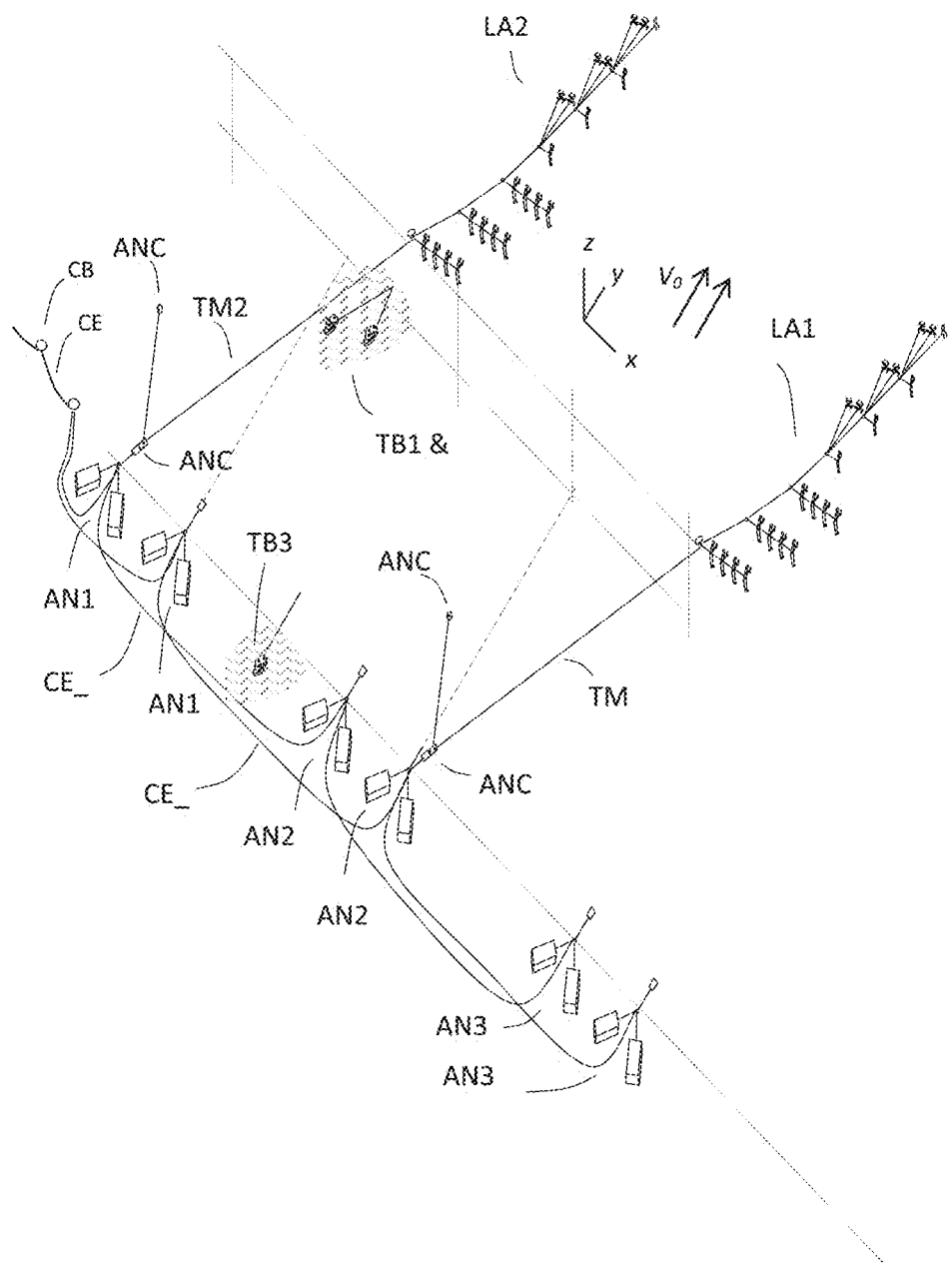

In the approach of transferring among multiple anchoring points, a tug boat, or a group of tugboats, can be used to tow at the tether after it is detached from an anchor and move a whole linear array to another anchoring point. FIG. 32 depicts a procedure of moving one linear array, in a formation of many arrays, from one anchoring point to another by using tugboats. In step 1 (FIG. 32(a)), the linear array LA1 sways and moves toward the desired direction of displacement to the farthest position (position 2). Main tugboats (TB1 and TB2) then make tow connections to the array at the shallow end of the main tether TM1 while another tugboat TB3 makes connection to the anchor coupler ANC at the deep end of the main tether TM. In general, tow connection points are marked by buoys, such as ANCB, on sea surface so that the tugboats can retrieve the buoy lines and make tow line connection. In step 2 (FIG. 32(b)), all turbines and hydro sails HS in the linear array are put to feathered position so that flow drag over the system is reduced. Main tugboats (TB1 and TB2) are then able to tow the system upstream by a small distance to relieve the tension on the main tether TM and allow tugboat TB3 to disconnect the anchor coupler. Next, in step 3 (FIG. 32(c)), tugboat TB3 tows the deep end of the main tether TM with the coupler to the next anchoring point and connects it to the next anchor, while the main tugboats (TB1 and TB2) basically hold the linear array at a proper position to give the main tether TM enough slackness with minimal tension. Once the tether and the new anchor are connected, in step 4 (FIG. 32(d)), the hydro sails HS resume their function of holding and positioning the linear array and take over from the main tugboats. Because the linear array is now on the left side of the new anchoring point, it should sway to the left to maintain its initial position at the new anchoring point. All tugboats can then release their tow cable connections. In step 5 (FIG. 32(e)), the second linear array (LA2) sways to its farthest position toward the desired direction of displacement while the tugboats reposition themselves to prepare to work on it. In the above procedure, most lateral movement is done by the CSAM system. The main tugboats do not travel long distance when towing the linear array. They basically hold the array or move it only by a short distance just enough to let the tugboat TB3 and the anchor coupler reach the next anchoring point. Therefore, the main tugboats do not need to travel fast when in tow. On the other hand, tugboat TB3 should and can travel fast when in tow because it basically tows only the main tether and the flow drag over which is less than a fraction of the total drag.

Figure 33:
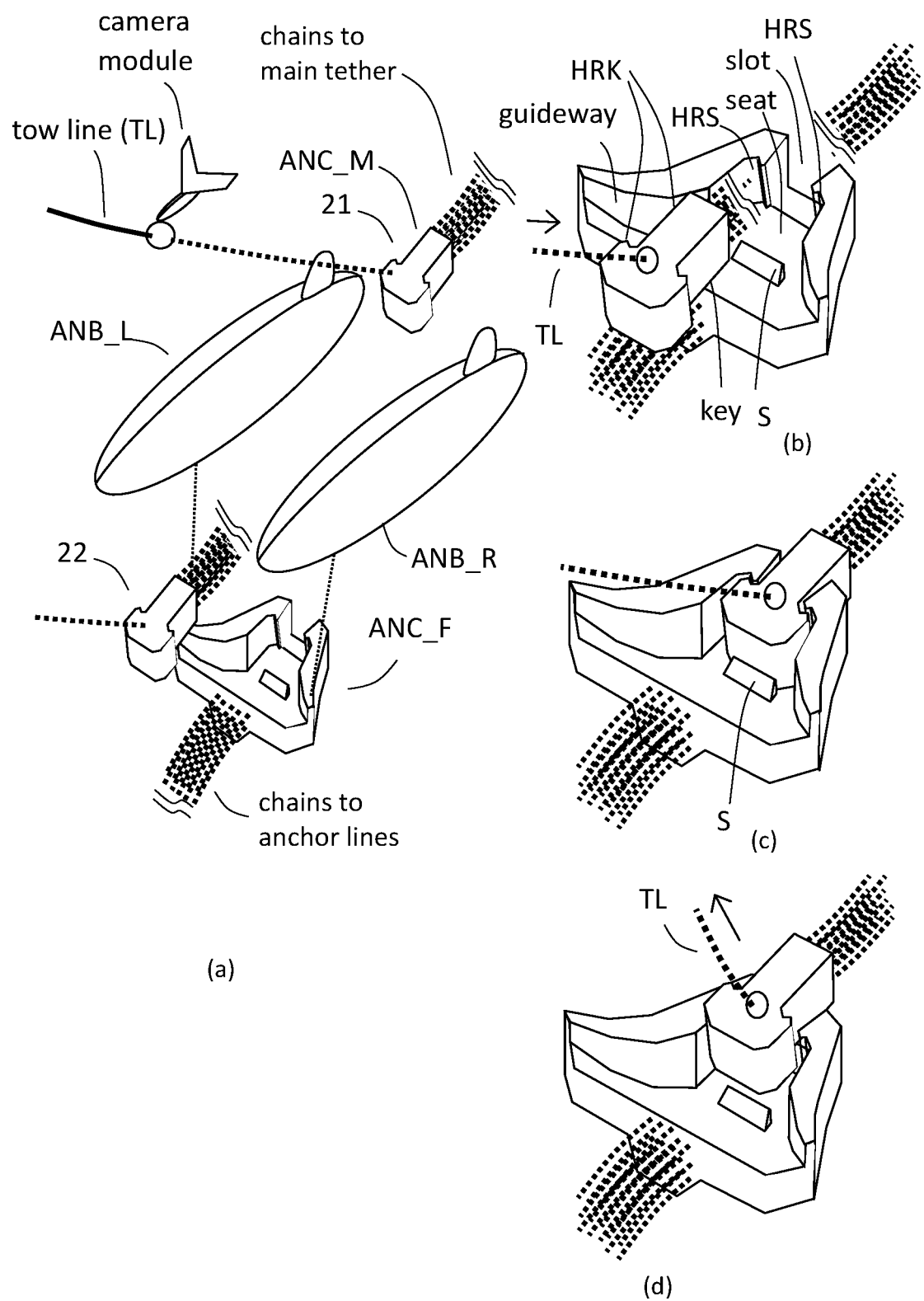
FIG. 33 depicts the structure of the anchor coupling mechanism according to an embodiment of the present disclosure.

FIG. 33 illustrates a conceptual design of the anchor coupling mechanism and its operation. The coupling comprises a male part ANC_M attached at the deep end of the main tether and a female part attached to the anchor line, which connects to the anchor (not shown). When engaged, the key of the male part slides through the open guideway into the slot of the female part ANC_F so that the hook rims (HRK and HRS) of the two parts engage. The hook rims are slightly inclined so that the male part will be set downward into the seat under the pull of the tether (FIG. 33(b)). A short protruding stop structure S prevents the seated male part from backing away from the hook rims (FIG. 33(c)). Only when the load on the main tether is relieved, an upward pull by the tow line can unseat the male part and the coupling can be disengaged (FIG. 33(d)). One important issue in the operation of tugboat TB3 is to make swift and precise engagement. For this purpose, two buoys (ANB_L and ANB_R) suspend the female coupler in water and also mark the position of the coupler. An underwater camera module attached near the end of the tow line looks downward along the tow line to help guide the towing. The male coupler with the main tether is towed to approach the female coupler from downstream and move between the two buoys (at position 21) first. Once the camera fixes the position of the female part, the tugboat tows the male part upstream passing the slot (to position 22) and then gradually loosens the tow to let the male coupler move down into the female part to make the coupling. (FIG. 33(a))

The technical feasibility of this tugboat-based transfer system can be illustrated by a preliminary analysis on tugboat requirements and system transfer speed.

Figure 34:
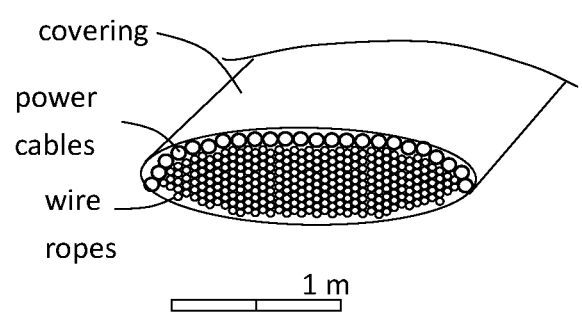
FIG. 34 depicts the structure of the main tether according to an embodiment of the present disclosure.

First, the tugboats need to have enough bollard pull capacity to tow a whole linear array, which is to overcome the flow drag over the whole linear array. Using the previously mentioned example turbine as example, under a current flow of 1.5-1.6 m/s, a power generating turbine unit (GTU) comprising 2 example turbines needs a system of the aforementioned hydro sails with a total planform area of 2×1400 m² to form a CSAM stage and a main tether comprising 12 2-inch steel wire ropes (or tension members of similar capacity) to endure the corresponding maximal operating tension of 600 ton. For an example long linear array comprising 3×8 (24) example GTUs, its main tether will need 24×12 2-inch steel wire ropes, which can be aligned and packaged in parallel into a formation as shown in FIG. 34. The cross-sectional shape of the formation allows streamlined smooth covering to be placed over the tether to reduce flow drag. The drag (or thrust) over all turbines when operating in full load can be expressed as $$D_{tt} = C_{Dt} A_{tt} \frac{\rho V_0^2}{2} \tag{52}$$

wherein $C_{Dt}$ is drag coefficient (=0.89 by Betz theory) of a turbine and $A_{tt}$ is total swept area of all turbines. In a flow of constant speed, $D_{tt}$ is constant. Therefore, it is convenient to discuss flow drags of other parts of the system or under different operating conditions with respect to $D_{tt}$.

When the whole example linear array is in operation and the deployment angle $\gamma_b$, m is small, the current flows across the tether, as shown in position 3 of FIG. 12. This cross flow drag can be expressed as $$D_{cc} = C_{Dcc} A_{cf} \frac{\rho V_0^2}{2} \tag{53}$$

wherein $C_{Dcc}$ is the cross flow drag coefficient and $A_{cf}$ the projected frontal area of the tether. The significance of this drag $D_{cc}$ over the tether can be evaluated by comparing it to the drag over all turbines $D_{tt}$, as $$\frac{D_{cc}}{D_{tt}} = \left( \frac{C_{Dc} A_{cf}}{C_{Dt} A_{tt}} \right) \tag{54}$$

Because of its length, the tether can be treated as a 2D body and its cross-sectional profile still appears elliptical with respect to the flow. The drag coefficient $C_{Dc}$ of a 2D body with an elliptical profile in a turbulent flow is 0.1~0.2 (referring to Shames I.H. Mechanics of Fluids, 2nd edition, Chapter 10: Boundary-Layer Theory. New York: McGraw Hill, 1982). The projected frontal area of the tether can be expressed as $$A_{cf} = l_c t_c \cos \gamma_b \tag{55}$$

wherein $l_c$ and $t_c$ are length and thickness of the tether. For the example long linear system, with the deployment angle $\gamma_b$ between 40°~74°, $t_c \approx 0.5$ m from FIG. 34, further assuming $l_c = 10$ km as a reference, the averaged ratio of drags from eqn. (54) can be estimated to be $$\left( \frac{D_{cc}}{D_{tt}} \right) 10 \text{ km}, 3 \times 8 GTUs < 0.5 \sim 1.0\% \tag{56}$$

When the linear array is off operational mode and ready to be towed, the turbine blades should be feathered and the hydro sails HS should also be placed at an angle of attack that induces minimal drag and lift in order to reduce the drag over the detached linear array in the tow. The total drag over the whole linear array includes the flow drag over the turbines $D_{tf}$, the hydro sails $D_{sf}$, tethers $D_{cl}$ and the buoys that suspend the tethers $D_b$, that is, $$D_{total,10 \text{ km},3 \times 8 \text{ GTUs}} = D_{tf} + D_{sf} + D_{cl} + D_b \tag{57}$$

In eqn. (57), $D_{cl}$ is the drag caused by longitudinal flow along the tethers because both the main tether and the array tether now lay in the downstream direction. To estimate $D_{cl}$, the elliptic cross-sectional profile of the covering of the tether can be approximated as segments of a circle and the results of longitudinal drag by flow along a cylinder can be applied. That is, $$D_{cl} = C_{Dcl} A_{cs} \frac{\rho V_0^2}{2} \tag{58}$$

wherein $A_{cs}$ is the total surface area of the tether and $C_{Dcl}$ is between 0.002 and 0.02, depending on surface roughness, referring to Reid R. O.; Wilson B. W. Boundary Flow along a Circular Cylinder. National Engineering and Science Company, TR 204-4 (March 1962). For the example linear array of 3×8 GTUs with a 10 km long tether of a construction same as FIG. 34, $A_{cs}$ is about 4×10000 m². The corresponding longitudinal drag on the tether expressed as a fraction of $D_{tt}$ is $$\left( \frac{D_{cl}}{D_{tt}} \right) 10 \text{ km}, 3 \times 8 GTUs = \left( \frac{C_{Dcl} A_{cs}}{C_{Dt} A_{tt}} \right) = 0.15 \sim 1.5\% \tag{59}$$

Buoys are attached along the tethers to keep the tethers near neutral buoyancy so that the weights of the tethers do not sink the system to the bottom of sea. For a fixed amount of total buoyancy, larger size of individual buoys, or less number of buoys, results in less total drag. This is because buoyancy is proportional to the cube of a linear dimension while drag is proportional to the square of it. Therefore, buoys of large volume with ellipsoidal shape should be used. For example, assuming 20 buoys are used on the 10 km long main tether of the example linear array, each buoy needs to carry 500 m of the tether. Based on the construction shown in FIG. 34, with each 2 inch wire rope weighing 11.02 kg/m and a power cable 19.4 kg/m, the weight of a 500 meter section for the main tether with the power cables is 1435 tons in seawater and can be suspended by a spheroid buoy of semi-axes lengths of 4.7 m by 18.8 m with a buoy efficiency of 0.85. This spheroid of aspect ratio 1:4 has a drag coefficient $C_{Db}$ as low as 0.06 in turbulent flow (referring to Shames I.H. Mechanics of Fluids, 2nd edition, Chapter 10: Boundary-Layer Theory. New York: McGraw Hill, 1982). The drag on the buoys can be compared to the longitudinal drag on the tether as $$\frac{D_b}{D_{cl}} = \frac{C_{Db} n_b \pi R_a^2}{C_{Dcl} A_{cs}} \qquad (60)$$

with $n_b=20$ and $R_a=4.7$ m. For $C_{Dcl}$ from 0.002 to 0.02, the ratio $D_b/D_{cl}$ is from 1.0 to 0.1. With eqn. (59), this leads to $$\left(\frac{D_b}{D_{tt}}\right) 10 \text{ km, } 3 \times 8 GTUs = 0.15\% \qquad (61)$$

The flow drag over the feathered turbines $D_{ttf}$ can also be estimated relative to the full load drag $D_{tt}$ as $$\frac{D_{ttf}}{D_{tt}} = \frac{D_{tf}}{D_t} = \left(\frac{C_{Dtf} A_{tf}}{C_{Dt} A_t}\right) \qquad (62)$$

wherein $D_{tf}$ is drag over a single turbine under feathered condition, $A_{tf}$ is the planform area of the non-rotating turbine blades and $C_{Dtf}$ is the drag coefficient of the turbine under feathered condition, which is the drag coefficient of the turbine blade as a wing profile. The ratio $A_{tf}/A_t$ is basically the degree of solidity of the rotor, which is roughly 10% for turbine blades of a tip speed ratio around 5. The rotor blade as a wing profile generally has a drag coefficient less than 0.02. Therefore, the ratio $D_{ttf}/D_{tt}$ is less than 0.22%.

As for the hydro sail, when the angle of attack is set to minimum, $\alpha=4°$, the drag coefficient of the example hydro sail $C_{Ds}$ is about 0.02 (per FIG. 3). The drag of all sails in this "feathered" status as a fraction of $D_{tt}$ is $$\frac{D_{stf}}{D_{tt}} = \frac{D_s}{D_t} = \left(\frac{C_{Ds} A_s}{C_{Dt} A_t}\right) = \frac{0.02 \times 1400}{0.89 \times 1257} = 0.025 \qquad (63)$$

wherein $D_s$ is drag over a hydro sail.

Putting all the above results into eqn. (57) gives the total flow drag over the example linear array as $$\frac{D_{total,10 \text{ km},3 \times 8 GTUs}}{D_{tt}} = \qquad (64)$$
$$0.22\% + 2.5\% + 0.15 \sim 1.5\% + 0.15\% = 3.0 \sim 4.4\%$$

Thus, under a flow speed of 1 m/s, $D_{tt}=2,750$ ton of force and the total flow drag is about 83~121 ton. Most drag comes from the hydro sails, because they have most of the surface areas that are causing drags. This drag can be reduced by submerging the system into a larger depth where current flows slower, making use of the quadratic relation of drag to flow speed. For example, if the flow speed is reduced to 0.7 m/s, then the drag can be reduced to less than 50%, or 40~60 ton. A tugboat of over 7,000-10,000 hp (5220-7460 kW) generally have a bollard pull of over 100 ton. Regular harbor tugboats of over 3~4000 hp have about 50~60 ton of bollard pull (referring to For example, see data from http://www.sunmachinery.com/tug_boats_for_sale.html (Accessed September 2016)). Therefore, several tugboats of such capacities working together will be able to hold the long linear array still in a current flow of about 0.7~1.0 m/s or move the linear array at a slightly faster speed, which is sufficient for the towing and repositioning operations described in FIG. 32.

The rate of lateral movement by this tugboat based transfer system can be estimated based on service speeds of typical tugboats, about 10 to 15 knot (5-7.5 m/s, or 18-27 km/hr). Assuming a spacing of 10 km between adjacent anchoring points, the traveling time of a round trip between two adjacent anchoring points can be under 1 hour. Further assuming reasonably swift connection/disconnection of towing lines and coupling/decoupling of anchor lines (tethers) and power transmission lines, lateral transfer of 1 linear array over one anchoring point step of 10 km should be able to be completed in 2 hours. Thus, in one work day of 12 hours, 6 linear arrays can be transferred for 10 km, or 3 linear arrays for 20 km, by one small group of tugboats. With multiple shifts and/or automation, the rate of transfer could be doubled.

In the transfer of anchoring positions, power transmission cable connections must also be considered. When a linear array is anchored to a fixed anchoring point and lateral displacements are performed only by the sway of the CSAM system, a suspended but fixed power cable connection system can be applied, as depicted in FIG. 12. The basic design parameters of this approach were discussed and analyzed (referring to Tsao C. C. Marine Current Power with Cross-stream Active Mooring: Part II. Submitted to Renewable Energy in May 2016.). However, applying this arrangement in the current anchoring position transferring system likely needs additional hydro sails to counter additional pull on the linear array due to additional flow drag over the long power cable. Alternatively, power cables from the GTUs in a linear array can run along the tethers down to the anchors and then get connected to power transmission cables leading to shore. In this approach, the long power transmission cable from land will be connected to each anchoring position, as illustrated in FIG. 32(e), and a separate suspension and anchoring system will support the power cable so that the linear array will not be affected by it. An electric coupling system that can be conveniently connected and disconnected for many times undersea will be needed between power cables from the linear array and the power transmission cable leading to the anchoring point. There are at least two basic electric coupling methods: by direct electric contact (plug & receptacle) or by electromagnetic induction (transformer structure). A contact type coupling can be developed based on the concept of controlled environment. For example, the SpecTRON subsea mateable connector made by Siemens uses retractable plug pins with double redundancy dielectric oil flooded and pressure-balanced sealing to isolate the contacts from seawater during mating and un-mating (referring to Siemens AG product brochure. SpecTRON: Siemens subsea medium and high power electrical connector systems for the oil and gas industry. Siemens energy business website, 2016. http://www.energy.siemens.com/mx/pool/hq/industries-utilities/oil-gas/applications/subsea/products/connectors/SpecTRON_July_2013.pdf (Accessed October 2016)). The induction type coupling is basically making the primary winding coils and the secondary winding coils into separate but matetable parts with corrosion and electricity resisting shields. The subsea electric coupling system can be installed alongside the mechanical anchoring coupler and can be actuated after the engagement of the anchor couplers (and deactivated before the disengagement).

Because the physical size and weight of the power cable corresponding to the example turbine is comparatively much smaller than the corresponding tether, the inclusion of the power cable size to the tethers does not significantly change the numbers of flow drags obtained from the previous analysis. FIG. 34 illustrates an arrangement of the power cables along the main tether.

Auxiliary Anchoring Against Eddies Disturbances

The layout of the proposed CSAM system features power generating turbines amounted on long tethers in linear arrays anchored to limited and concentrated locations. The formation works best in the ability to follow the flow streams of the current in large longitudinal distances. However, in the pass of a circular flow pattern, which could be caused by a passing ocean eddy or a typhoon, or other undesirable temporary flow patterns, additional anchoring features will be needed to prevent disruption of the system, especially in a large scale implementation.

In principle, a whole linear array of turbines with the CSAM system can be made to follow and rotate with the change of flow direction, since the system is anchored basically to one point. However, the rotation mechanism at the anchoring point can be complicated and the rotation of power transmission cables also needs to be considered, especially when multiple linear arrays are considered.

Figure 35:
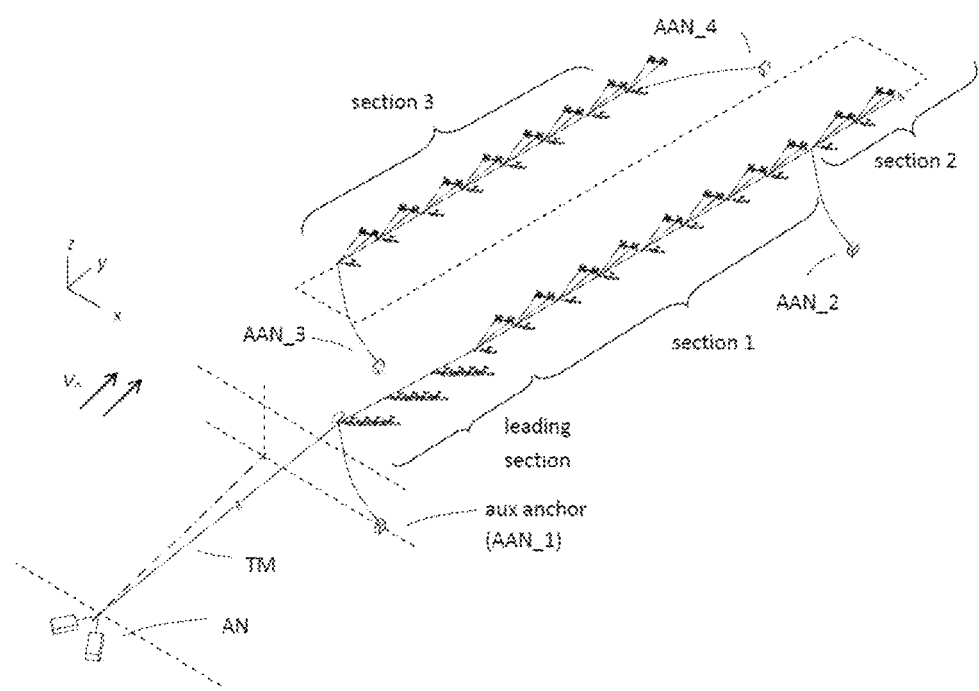
FIG. 35 depicts the concept of the auxiliary anchoring system according to an embodiment of the present disclosure.

A simpler approach is to moor the linear array using auxiliary anchors along the array tether to maintain the orientation of the linear array during the pass of an unsteady flow pattern. The flow speed inside an ocean eddy is usually slow. Therefore, during this temporary cyclonic flow pattern, the main goals should be maintaining system formation and preventing damage, rather than continuing power generation. Therefore, the turbines and the hydro sails can be feathered to reduce drag whenever needed. Further, slower flow corresponds to smaller flow drag over the system. As a result, a small number of anchors of lower capacity at strategic locations will be able to maintain the linear array in position. In accordance with an exemplary embodiment of the present disclosure, FIG. 35 illustrates the idea with the example linear array of 3×8 stages. The example linear array includes 3 sections with each section having 8 stages of turbines (8 2-turbine units). Four auxiliary anchors (AAN_1 to AAN_4) are used to moor the two ends of each section. The total flow drag over such a system under feathered conditions has been estimated in the previous section. Whether under cross flows or longitudinal flows, previous estimates indicate that the total drag is less than 5% of $D_{tt}$, the total full-loading thrust over all turbines in the system. Under a flow speed of 0.7 m/s, this corresponds to about 63 tons of total drag. Thus each auxiliary anchor only needs to take less than 16 tons of horizontal force, which can be handled by an anchor line of a single 1.5 inch wire rope with a concrete gravity anchor of about 32 ton, assuming a traditional anchor capacity of 0.5.

Figure 36:
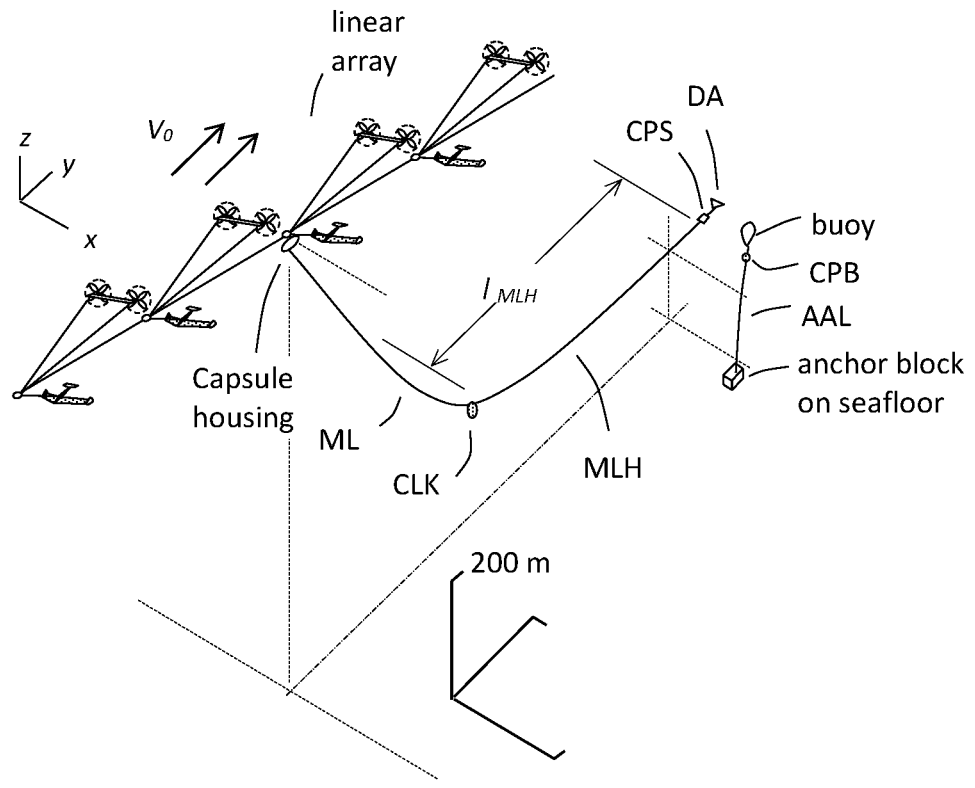
FIG. 36 depicts the concept of the search-and-locate mechanism for the auxiliary anchoring system shown in FIG. 35.
Figure 36:
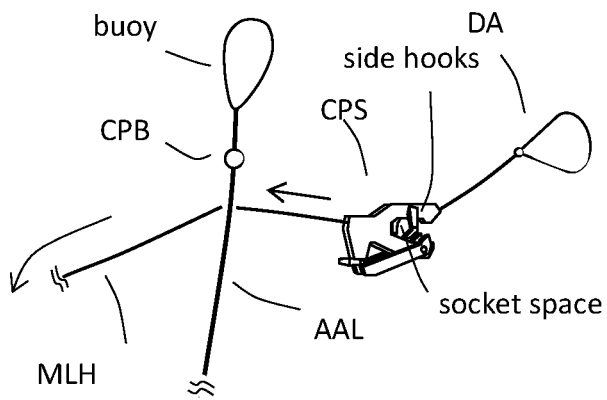

In order not to affect the functions of lateral sway of the CSAM system and the anchoring position transfer system, the auxiliary anchors should be retractable and detachable so that they can be engaged or disengaged when needed. A detachable mooring system can be achieved by deploying from the linear array a retractable mooring line with an auxiliary anchor coupling mechanism at its tip down to the seafloor to hook onto a corresponding anchoring point pre-installed on the seafloor. A remote controlled electric winch can deploy or retract the mooring line. The auxiliary anchor coupling mechanism can also be actuated by electricity drawn from the system and be controlled remotely or automatically. One issue of this detachable mooring system is how to make sure that the deployed mooring line finds and then engages the pre-installed anchoring point. In accordance with an exemplary embodiment of the present disclosure, FIG. 36(a) illustrates a design concept of a search-and-locate mechanism to handle this issue. From a capsule housing, a mooring line ML is lowered into the deep. A drift anchor DA is attached to its end and a coupler mechanism CPS is attached slightly before the drift anchor. The mooring line and the attachments are made to have neutral buoyancy so that the line stretches downstream under the drag effect of the drift anchor in the current flow. A clump weight CLK is added to a selected position along the mooring line and pulls the line down to a predetermined depth so that the section of the line between the clump weight and the drift anchor stretches horizontally downstream at the predetermined depth. Pulling up or lowering down the line from the capsule can adjust the depth of the horizontal section of the line MLH. On the seafloor, an anchor line AAL is attached to the anchor block on one end and has a coupler ball CPB on the other end. A buoy lifts the coupler ball and the anchor line up and sticking off the seafloor. To engage the anchor is to couple the coupler mechanism CPS with the coupler ball CPB. This is done by swaying the linear array laterally so that the horizontal section of the mooring line MLH sweeps across the vicinity of the location of the anchor line and eventually touches and brushes across the anchor line AAL, as depicted in FIG. 36(b). The coupler mechanism at the end of the mooring line will then hook onto the anchor line with one of its hooks and slide up the anchor line until it hits the coupler ball and couples to the ball in the socket space. The horizontal section of the mooring line MLH increases allowable location error of the anchor on the seafloor relative to the capsule in the direction of the flow. In this process, it is important to keep the floating stiffness of the anchor line much higher than the form stiffness of the horizontal section of the mooring line so that the latter will brush over the former instead of the other way round. In general, this can be achieved by using a large buoy on the anchor line, a large clump weight CLK and a not-too-strong drift anchor. Once the socket and the ball are coupled, the winch in the capsule can then pull up the line to maintain a desired line length.

Figure 37:
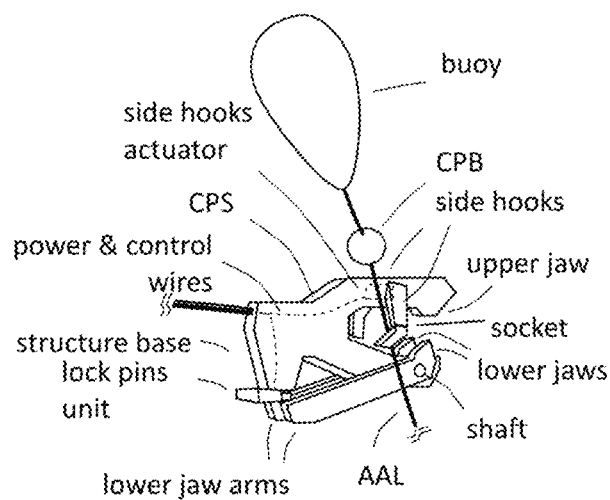
FIG. 37 depicts the concept of the detachable coupling mechanism for the auxiliary anchoring system shown in FIG. 35.
Figure 37:
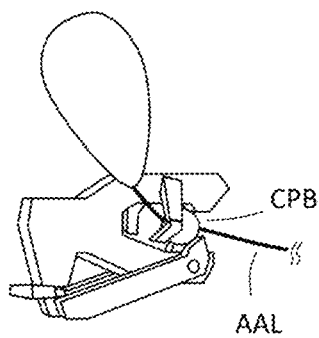
Figure 37:
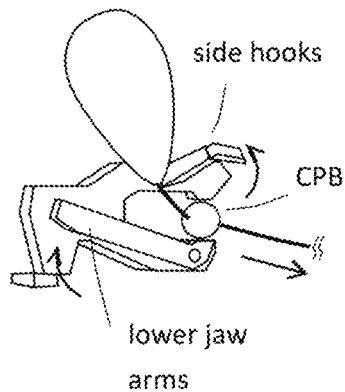

In accordance with an exemplary embodiment of the present disclosure, FIG. 37(a) depicts a design concept of the coupler mechanism CPS, showing one of the side hooks grabbing the anchor line. The side hooks can be rotated and are shown in the status of "ready to hook". The coupling socket is formed by the space confined by the two side hooks, two lower jaws and one upper jaw fixed to the structure base. The two lower jaws are rotatable and have long arms to the opposite side of the axis. When the lower jaw is not under any force the long arms rotate downward due to gravity and close the jaws. Electrically actuated pins lock the lower jaws from the ends of the long arms. The socket space is formed and its capacity to resist opening force is very large due to the large leverage ratio. As the pulling on the mooring line continues the mechanism CPS slides up the anchoring line until the coupler ball CPB falls into the socket space, which completes the coupling, as illustrated in FIG. 37(b). To disengage the coupling, the lock pin unit retracts the locking pins to allow the coupler ball to exit the socket under a pull from the anchor line. At the same time, the side hooks are rotated backwards to clear the way and guide the buoy that follows the ball to leave the coupling mechanism, as shown in FIG. 37(c).

Figure 38:
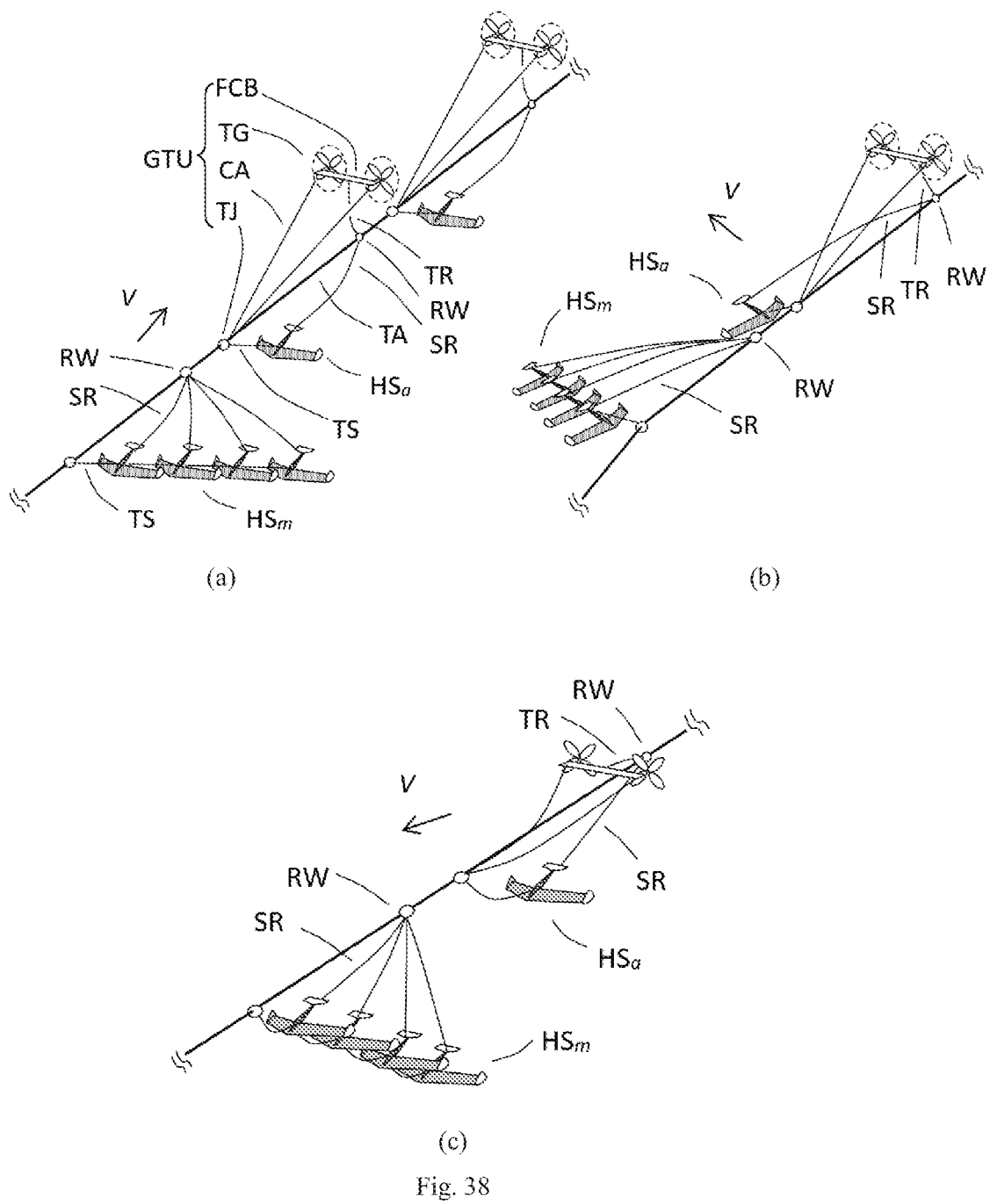
FIG. 38 depicts the configuration for preventing over rotation according to an embodiment of the present disclosure.
Figure 38:
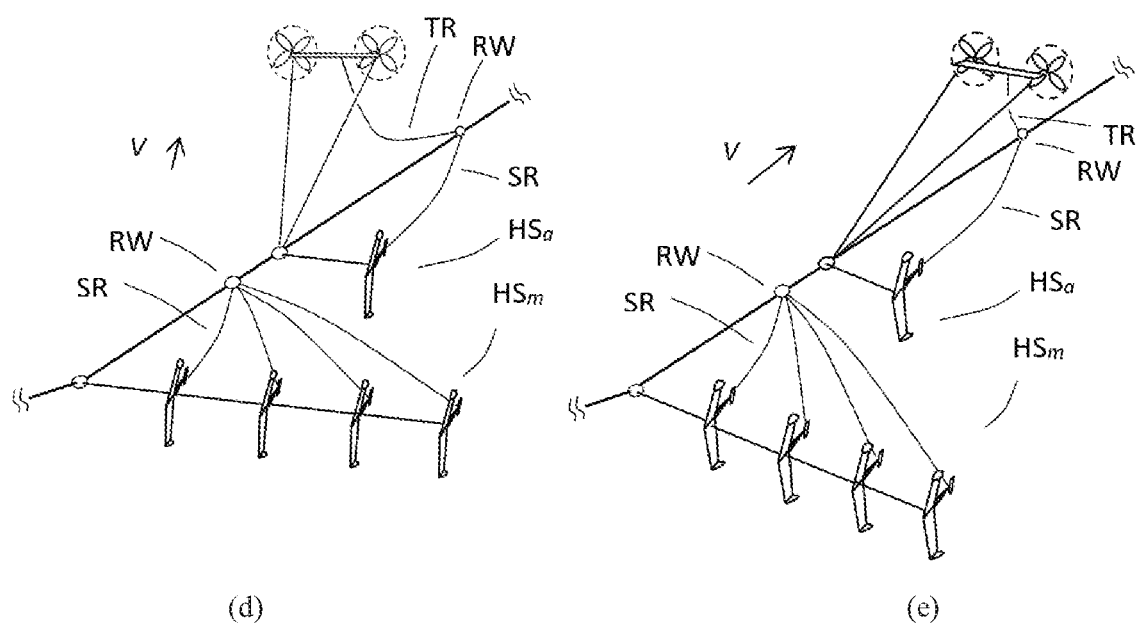
Figure 39:
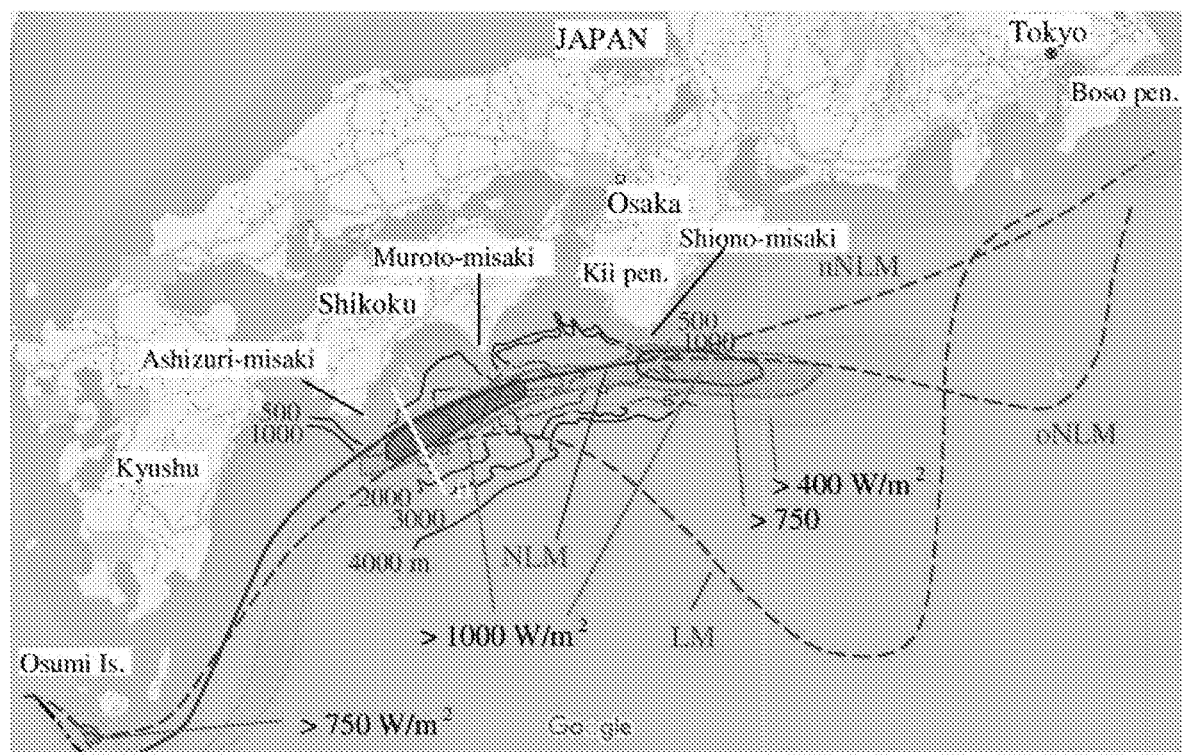
FIG. 39 depicts the characteristic flow paths and power density distribution of the Kuroshio south of Japan.

In the CSAM system design, the GTU is attached to the array tether by two mooring lines CA so that the GTU can follow the flow direction without interfering with the array tether TA. The GTU together with a front connecting board FCB is made to have neutral buoyancy and the front connecting board can also provide additional lift to raise the GTU above the array tether. The hydro sail HS is also attached to the array tether via a sail tether so that the sail is not positioned directly in front of the GTU and the wakes after the sail do not affect the power generating turbines. When the main tether TM and the array tether TA are anchored by the auxiliary anchors and are under the influence of a circular flow pattern, the movement of the GTUs and the hydro sails HS also need to be restricted to avoid rotations over 360 degree. In general, a restraining rigging system of winches RW and rigs (TR and SR) can be applied to pull on the GTUs (at the front center board) and the hydro sails (near the tail) to prevent over rotations, as depicted in FIG. 38. The electric winches adjust the lengths of the rigs under different conditions and flow directions, as illustrated in FIG. 38 (a)-(c). When the flow is from the front, the function of the rigs is less important, as illustrated in FIG. 38 (d)-(e).

System of Kuroshio Power Plants South of Japan

Figure 40:
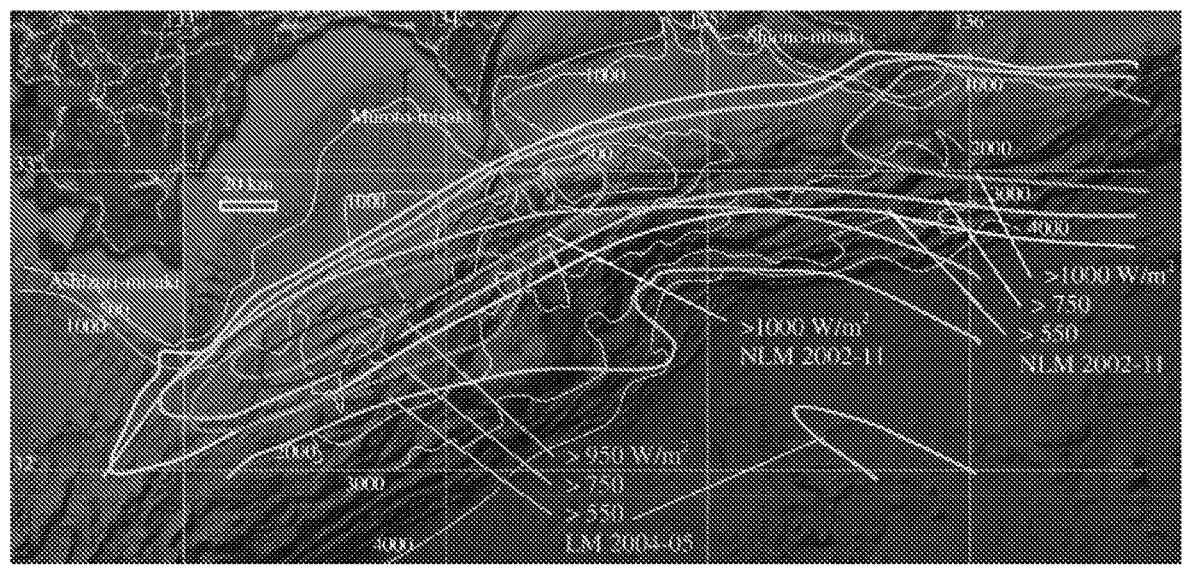
FIG. 40 depicts the distributions of averaged power densities of the Kuroshio south of Japan in the NLM and the LM periods during 2002-2011.
Figure 41:
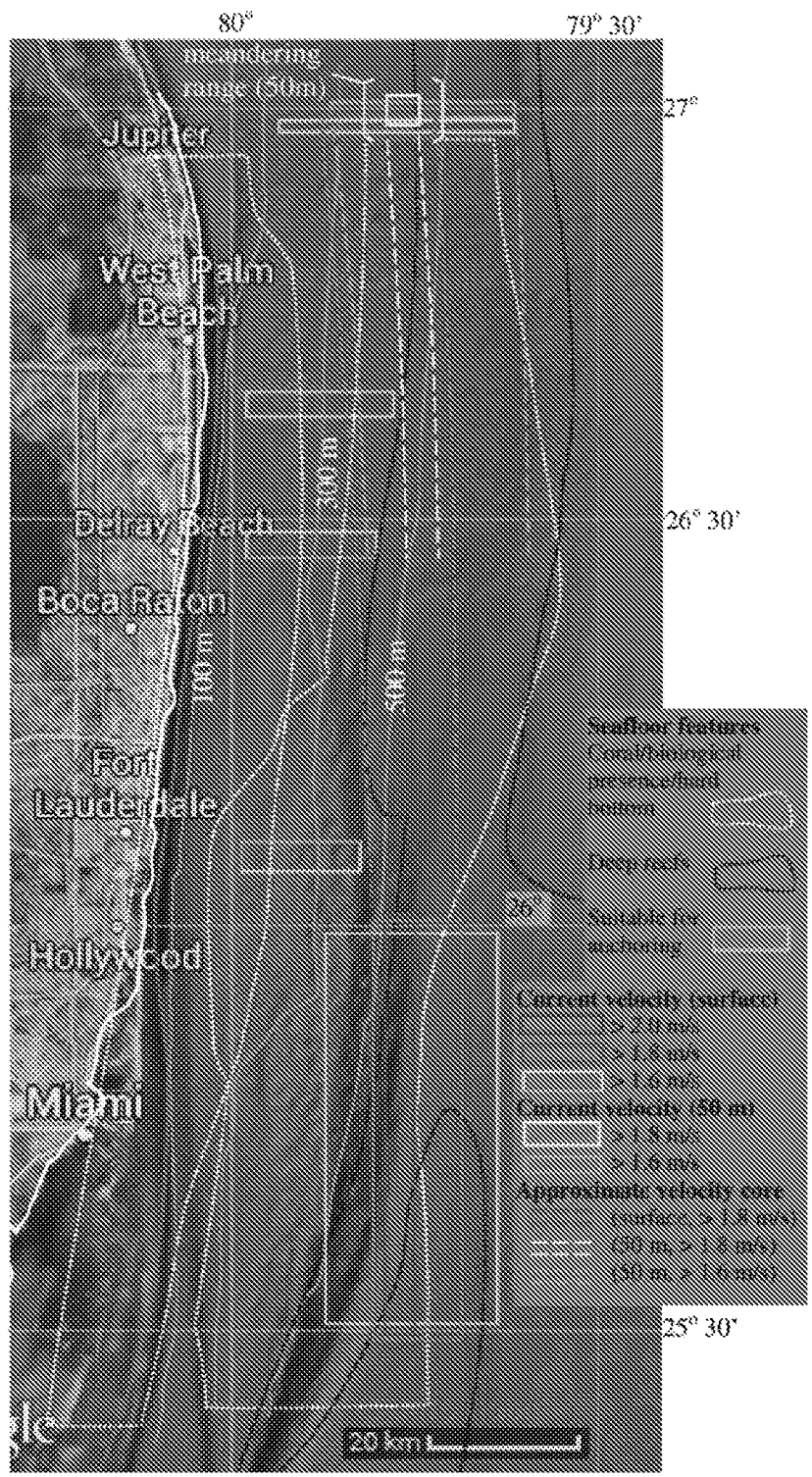
FIG. 41 shows averaged tracks of the Florida Current over topographic map of the Florida Straits marked with seafloor characteristics.
Figure 43:
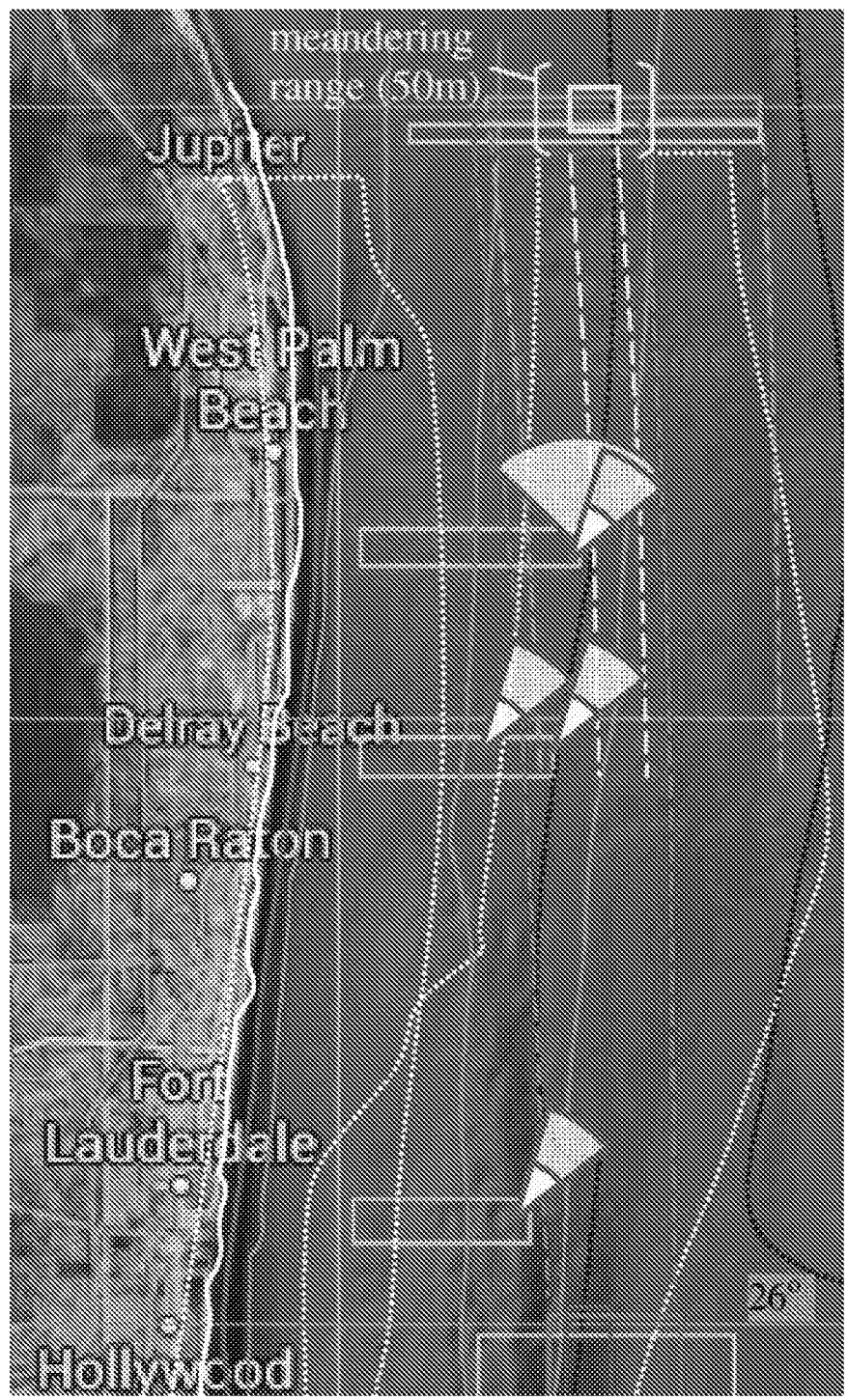
FIG. 43 shows accessing and tracking the core of the Florida Current from preferred anchoring zones by using this invention.
Figure 44:
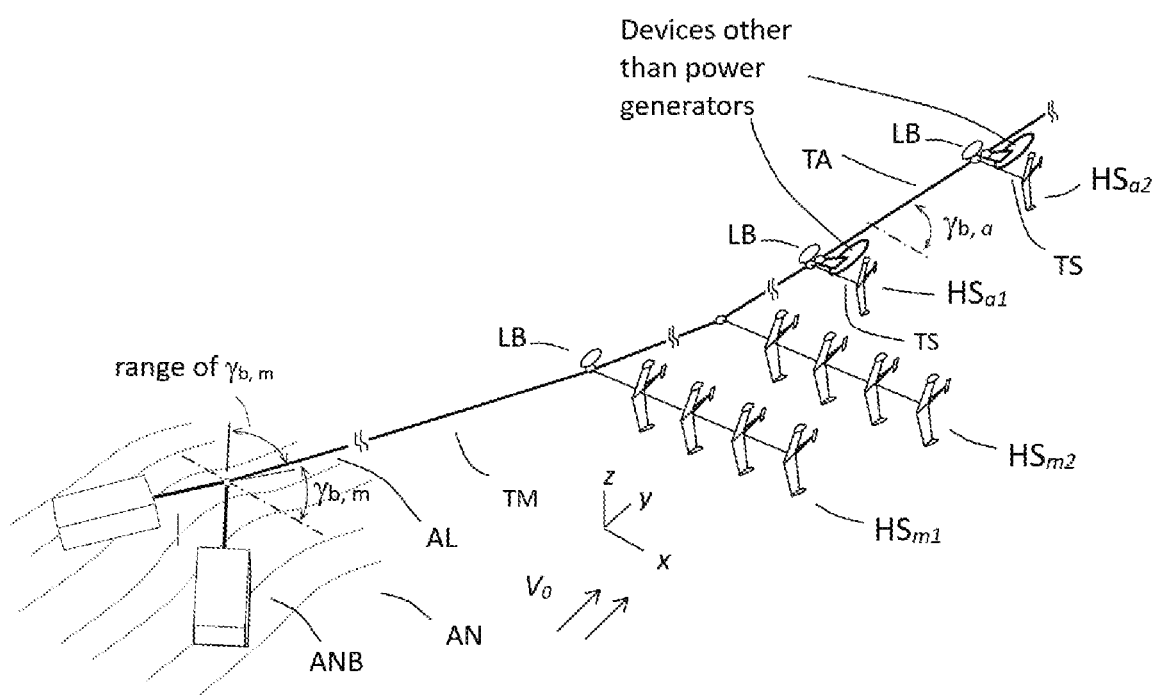
FIG. 44 depicts mooring devices other than power generating turbines by using this current invention.

FIG. 40 shows the distributions of averaged power densities of the Kuroshio south of Japan in the NLM and the LM periods during 2002-2011, based on simulation results from the ME Web GIS dataset (Marine Energy Web GIS Dataset, University of Tokyo and JAMSTEC (Japan Agency for Marine-Earth Science and Technology). Available online: www.todaiww3.k.u-tokyo.ac.jp/nedo_p/jp/webgis/], superimposed over a topographical map., It can be seen that under the NLM high power density bands there are large areas of seafloors with water depth less than 500-1000 m off Muroto-misaki and off Shionomisaki. If it were not for possible LM effects, these places can be good areas for power generators. With the CSAM and the extended lateral displacement technique proposed in this research, it becomes possible to design a system of ocean current power plants south of Japan that is capable of accommodate a possible large meander period to certain extent as a whole system. The concept is to deploy CSAM-based generator systems in ideal areas off all three capes for operations during the NLM periods, with the area off Ashizuri-misaki having extra anchoring points placed in the second highest power density bands (750-1000 W/m2) of the LM periods as "backup sites". In the event of a LM occurrence, systems from the off-Muroto-misaki area and the off-Shionomisaki area can be transferred to these backup sites and continue to generate power. In other words, during the "normal" NLM periods, we have three areas of power generation groups operating in highest possible flow power densities; while in a possible LM period, the power generation groups off the two eastern capes can relocate and operate in at least the second highest power densities, instead of being left in slow flows with no output. FIG. 43 illustrates the potential of the system in the Florida Current. The areas suitable for anchoring are on the edges of the zone of 1.6 m/s averaged current speed. The proposed system with 10 km main tether length can place the generators into the core of >1.8 m/s speed, which corresponds to >42% power capacity increase. Further, it allows tracking of core meandering almost all times.

Although the invention is mainly described in reference to applications in ocean or marine current power generation, it should be noted that this Cross-stream Active Mooring concept can also be applied to moor payloads other than power generating turbines. For examples, sensors such as sonars or flow velocity meters or underwater microphones can be the payloads. These devices can be position across a fluid flow, including either a river or a tidal current, and can be moved in the fluid by adjusting the hydro sail. A person skilled in the art will realize that the systems and methods for mooring a single power generating turbine unit or for a plurality of power generators described in this invention can be applied to moor other devices.

Besides marine current or a river, the invention can also be applied to a situation of relative fluid flow, such as deploying and towing a payload with a hydro sail from a traveling vessel in a body of water and using the traveling vessel as anchoring point.

Although the invention is mainly described using wing-shaped hydro sails as the means for utilizing the fluid flow to create a fluid dynamic force to laterally pull a tethered payload, a device of other shape or construction can also be used as long as a it creates a fluid dynamic lift in a flow. For example, an ellipsoid body or a flat plate with an angle of attack in a flow can generate a fluid dynamic lift. Therefore, in the broadest concept, the hydro sail can be any fluid dynamic lift generating device.

It should also be noted that there are ways other than using control surfaces (such as flaps) on wings to adjust the angle of attack of a hydro sail or a glider. One example is to pull and change lengths of selective strings in the rigging system (RS). This can cause change of magnitude of fluid dynamic lift force on the system. Such means of adjusting lift are known to persons skilled in the arts of wings or gliders.

It should also be noted that there are ways other than using ballast weights and buoys attached to ropes to adjust the center of mass of the hydro sail. One example is to use two bags connected by a tubing system with a pump to move waters (as ballast) and air (as buoy) around between the two bags.

It should also be noted that the invention includes some features especially suitable for, though not limited to, applications in certain geographical locations and these geographical related application concepts are also described in the arts for the first time. For example, in the Japan area, the southern Tosa ridges area with a depth between 500 to 1000 meters located southeast off Ashizuri-misaki between 32.2° N to 32.7° N and 133.2° E to 133.7° E appears to have relatively stable current flow paths during both the NLM and the LM periods according to decades of records. Undersea ridges in this area are roughly aligned with their slopes facing the flow direction of the Kuroshio and therefore can be good sites for the anchoring means of this invention. Similar situations can be said to the undersea ridges between Taitung and Green Island in the Taiwan area and to the Miami Terrace area in the Florida Currents.

While the means of specific embodiments in present disclosure has been described by reference drawings, numerous modifications and variations could be made thereto by those skilled in the art without departing from the scope and spirit of the disclosure set forth in the claims. The modifications and variations should in a range limited by the specification of the present disclosure.

What is claimed is:

1. A mooring system for deploying a payload in a fluid moving relative to the payload, capable of placing the payload to a target position laterally across moving path of the fluid from an anchoring point, comprising:
a main tether;
an anchor means attached to a first end of the main tether and fixed to the anchoring point; and a main sail means attached to a second end of the main tether and immersed in the fluid the main sail means comprising (i) a lift adjusting means, the lift adjusting means being capable of changing angle of attack of said main sail means, (ii) a center of mass adjusting means, the center of mass adjusting means being capable of changing location of center of mass of the main sail means;

wherein the payload is attached to the second end of the main tether; and the fluid moving relative to the main sail means creates a fluid dynamic lift force on the main sail means and the main sail means is posed such that the fluid dynamic lift force pulls the payload in a lateral direction with respect to the moving path of the fluid so that said main tether is deployed with an angle relative to direction of the moving path of the fluid on horizontal plane when viewed from top;

wherein the change of the angle of attack of the main sail means enables changes of magnitude of the fluid dynamic lift force and the change of the location of center of mass of the main sail means assists rolling of the main sail means and changing of direction of the pull on the payload, thereby enabling change of position of the payload with respect to the anchoring point.

2. The mooring system of claim 1, wherein the main sail means is attached to a multi-line joint on the main tether by a main sail tether to keep the main sail means at a distance from the payload to minimize effect of flow wakes behind the sail means on the payload.

3. The mooring system of claim 2, wherein the center of mass adjusting means comprises a number of adjustable ballast mechanisms on the main sail means, the adjustable ballast mechanism comprising a winch, a pulley and an endless rope attached with a ballast weight and a set of buoys.

4. The mooring system of claim 3, wherein the main sail means comprises
a fuselage;
a sail body comprising separate sail sections that can be assembled on location for ease of construction, each of the sail sections comprising a spar structure and a rib structure, the spar structure comprising a tensegrity structure, the rib structure comprising an inner frame and outer frames carrying shape of sail profile, the sail sections containing water in their interiors;
a rigging system connected to multiple locations distributed over the sail body and the fuselage so that tensions from the sail tether is distributed to over the sail body evenly;
the adjustable ballast mechanisms being arranged in interiors of the sail body and the fuselage.

5. The mooring system of claim 2 for power generation applications, wherein
the payload comprises at least one power generating turbine for conversion of fluid kinetic power.

6. The mooring system of claim 2, wherein
the payload comprises an array tether and a plurality of devices, each of the devices attached to a different location on the array tether.

7. The mooring system of claim 6, further comprising a plurality of array sail means, each of the array sail means attached to a different location on the array tether, the moving fluid over the array sail means creating fluid dynamic lift forces, the fluid dynamic lift forces pulling the devices in lateral directions with respect to the moving path of the fluid, thereby the main tether and the array tether can be deployed at different angles with respect to the path of the fluid by adjusting relative magnitudes of the lift force on the main sail means and the lift forces on the array sail means.

8. A mooring system for mooring a linear array of multiple flow kinetic power generators in a water flow, capable of deploying the array laterally across path of the water flow from an anchoring point such that the array forms a first deployment angle relative to path of the water flow on horizontal plane when viewed from top, comprising
an array tether, said multiple flow kinetic power generators are attached to and distributed successively along the array tether;
a main tether with a first end attached to an anchor means and a second end attached to said array tether;
a plurality of array sail means, each of the array sail means being attached to a different location on said array tether and immersed in said water flow, each said array sail means comprising a geometric shape capable of generating a hydrodynamic lift force in the water flow, the hydrodynamic force on the array sail means pulling the power generators in lateral directions with respect to path of the water flow, thereby the array tether with the power generators can be deployed with said first deployment angle relative to the path of the water flow on horizontal plane when viewed from top;
each said array sail means comprising a lift adjusting means such as control surfaces capable of changing angle of attack of the array sail means for adjusting magnitude of the hydrodynamic lift force on the array sail means thereby facilitating adjustment of said first deployment angle.

9. The mooring system of claim 8, wherein
each of the array sail means is attached to the array tether by a corresponding array sail tether so that the array sail means can be kept at a distance away from the power generators so that effect of flow wakes behind the array sail means on the generators is minimized.

10. The mooring system of claim 9, further comprising a plurality of main sail means for positioning the whole array of said power generators in the water flow;
said main sail means being immersed in the water flow and attached to said second end of said main tether by connections through a set of main sail tethers;
each said main sail comprising a geometric shape capable of generating a hydrodynamic lift force in the water flow, the hydrodynamic force generated on the main sails pulling the whole linear array of power generators in lateral directions with respect to the path of the water flow, thereby the main tether forming a second deployment angle relative to the path of the water flow on horizontal plane when viewed from top;
each of said main sail means comprising a lift adjusting means such as control surfaces capable of changing angle of attack of the main sail means for adjusting magnitude of the hydrodynamic lift force on the sail, thereby facilitating adjustment of said second deployment angle.

11. The mooring system of claim 10, wherein
each of the main sail means and the array sail means comprises a sail body and said sail body comprises separate sail sections that can be assembled on location for ease of construction, each of the sail sections comprising a spar structure and a rib structure, the rib structure comprising an inner frame and outer frames carrying shape of sail profile, the sail sections containing water in their interiors;
each of the main sail means and the array sail means comprises a rigging system that connects to multiple locations distributed over the corresponding sail body so that tensions from the corresponding sail tether is distributed to over the sail body evenly;

each of the main sail means and the array sail means further comprises a center of mass adjusting means to assist rolling and pitching of the sail means when necessary, the center of mass adjusting means comprising a number of adjustable ballast mechanisms, each of the adjustable ballast mechanism comprising a winch, a pulley and an endless rope attached with a ballast weight and a set of buoys.

12. The mooring system of claim 8, wherein the anchoring point is located on a slope facing the direction of the water flow;

the anchor means includes a deadweight anchor, the deadweight anchor comprising a plurality of anchor blocks that can be interlocked and stacked together to form a first group of large deadweight.

13. The mooring system of claim 12, wherein the deadweight anchor further comprises a second group of large deadweight comprising a plurality of interlocked anchor blocks, the second group of large deadweight being oriented with an angle with respect to the first group of large deadweight, the two groups of large deadweights jointly holding the main tether to accommodate variation of deployment angle of the linear array of power generators.

14. The mooring system of claim 8, wherein the anchoring point is located on a rock surface;

the anchor means includes a first deadweight anchor and a first notch structure made to the rock surface, the first deadweight anchor having a shape with a protrusion designed to match the first notch structure.

15. The mooring system of claim 14, wherein the anchor means further comprises a second deadweight anchor and a second notch structure made to the rock surface and oriented with an angle with respect to the first deadweight anchor, the first and second deadweight anchors jointly holding the main tether to accommodate variation of deployment angle of the main tether;

additional anchor blocks that can be interlocked and stacked together onto said first deadweight anchor and said second deadweight anchor in order to increase total anchor capacity.

16. The mooring system of claim 8, wherein the anchoring point is on a rock surface with a natural step structure;

the anchor means includes an anchor with a collapsible end for conforming to the natural step structure and maximizing contact area.

17. The mooring system of claim 8, further comprising an auxiliary anchor system for maintaining linear formation of the power generators and the array sail means attached on the array tether in situations of significant changes of flow direction, the auxiliary anchor system comprises a number of auxiliary mooring units distributed at different locations along the array tether, each of the auxiliary mooring units including an auxiliary anchor line with one end attached onto an auxiliary anchor on solid bottom surface beneath the water flow but with the other end suspended upward in water by a buoy;

a retractable auxiliary mooring line that can be lowered downward from the array tether; and a detachable coupling system connecting the auxiliary anchor line and the retractable auxiliary mooring line.

18. The mooring system of claim 17, further comprising a number of restraining rigging systems along the mooring system to prevent the array sails and the main sails and the power generating turbines from over rotating during periods of undesirable flow pattern, the restraining rigging system comprising a winch and rigs attached to the corresponding array sails and main sails and power generating turbines.

19. The mooring system of claim 8, wherein the anchor means includes an anchor fixed to the anchoring point;

an anchor line attached to the anchor;

an anchor coupler means with a first part and a second part that can be detached and reconnected, the first part being attached to the anchor line and the second part being attached to the first end of the main tether;

the mooring system further includes a number of additional sets of the anchor with the anchor line and the first part of the anchor coupler means, said additional sets being located at a number of additional corresponding anchoring points distributed over a distance, thereby extending allowable range of positioning of the linear array of power generators and array sail means.

20. The mooring system of claim 8, further comprising a lifting buoy attached to the second end of the main tether to balance forces in the vertical direction, the lifting buoy further comprising a buoyancy adjustment means to accommodate variations of flow drags.

21. A mooring method for deploying at least one flow kinetic power generator in a water flow, capable of placing the generator to a target position laterally across moving path of the water flow from a first anchoring point, including:

attaching a first anchor to a first end of a main tether and fixing the first anchor to the first anchoring point;

attaching the generator to a second end of the main tether;

attaching a fluid dynamic lift generating means to the second end of the main tether; and adjusting the fluid dynamic lift generating means to obtain a lift force from the water flow and make the lift force act in a lateral direction with respect to the flowing path of the water flow to pull the generator horizontally to the target position with said main tether deployed with an angle relative to direction of the path of the water flow on horizontal plane when viewed from top.

22. The mooring method of claim 21 wherein the water flow has a velocity core meandering and deviating with time and said adjusting the fluid dynamic lift generating means further includes a tracking method capable of placing the generator inside the meandering velocity core to capture maximum kinetic power most of time, said tracking method including:

(i) setting the target position as a moving target position inside the meandering velocity core;

(ii) constantly adjusting and changing the lift force of the fluid dynamic lift generating means to reposition the generator to the moving target position so that the generator is positioned inside the meandering velocity core most of the time.

23. The mooring method of claim 22, further including an extending method for extending lateral displacement range of the generator, said extending method including:

setting up a number of additional anchoring points distributed over a distance and fixing an additional anchor to each of the additional anchoring points;

transferring the main tether with the generator and the fluid dynamic lift generating means from the first anchoring point to one of the additional anchoring point by detaching the first end of the main tether from the first anchor and moving it to one of the additional anchoring points and attaching it to the additional anchor corresponding to the additional anchoring point; thereby extending range of positioning of the generator.

24. The mooring method of claim 23, further including towing and holding the generator and the fluid dynamic lift generating means at or near the second end of the main tether to relieve tension on the main tether using at least one powered vessel and moving the first end of the main tether using a second powered vessel during the step of transferring.

25. The mooring method of claim 23, said transferring the main tether with the generator and the fluid dynamic lift generating means further including towing at or near the first end and the second end of the main tether using a group of powered vessels for transferring over long distance.

* * * * *